US011765560B2

(12) United States Patent
Stapleford et al.

(10) Patent No.: US 11,765,560 B2
(45) Date of Patent: Sep. 19, 2023

(54) SYSTEMS, METHODS, AND DEVICES FOR REMOTE TRAP MONITORING

(71) Applicant: Pica Product Development, LLC, Derry, NH (US)

(72) Inventors: Scott Stapleford, Londonderry, NH (US); Richard Shevelow, Estero, FL (US); Phillip A. Pare, Derry, NH (US)

(73) Assignee: PICA Product Development, LLC, Derry, NH (US)

( * ) Notice: Subject to any disclaimer, the term of this patent is extended or adjusted under 35 U.S.C. 154(b) by 284 days.

(21) Appl. No.: 17/009,172

(22) Filed: Sep. 1, 2020

(65) Prior Publication Data

US 2020/0396574 A1 Dec. 17, 2020

Related U.S. Application Data

(63) Continuation of application No. 16/865,280, filed on May 1, 2020, now Pat. No. 10,798,541, which is a continuation-in-part of application No. 16/183,732, filed on Nov. 8, 2018, now Pat. No. 10,694,338.

(60) Provisional application No. 62/841,452, filed on May 1, 2019, provisional application No. 62/752,284, filed on Oct. 29, 2018, provisional application No. 62/582,508, filed on Nov. 7, 2017.

(51) Int. Cl.
*H04W 4/38* (2018.01)
*H04W 4/14* (2009.01)
*H04W 68/00* (2009.01)
*A01M 23/16* (2006.01)

(52) U.S. Cl.
CPC .............. *H04W 4/38* (2018.02); *A01M 23/16* (2013.01); *H04W 4/14* (2013.01); *H04W 68/005* (2013.01)

(58) Field of Classification Search
CPC ....... H04W 4/38; H04W 4/14; H04W 68/005; H04W 4/02; H04W 4/027; H04W 4/70; A01M 23/16
USPC ............................................... 455/456.1–457
See application file for complete search history.

(56) References Cited

U.S. PATENT DOCUMENTS

| 5,671,362 A | 9/1997 | Cowe et al. |
| 6,011,967 A | 1/2000 | Wieck |
| 6,281,799 B1 | 8/2001 | Lake et al. |
| 6,291,568 B1 | 9/2001 | Lussey |

(Continued)

FOREIGN PATENT DOCUMENTS

| CA | 2619212 A1 | 9/2008 |
| CA | 2814940 A1 | 4/2012 |

(Continued)

OTHER PUBLICATIONS

U.S. Appl. No. 62/582,633, filed May 9, 2019, Lazar.

(Continued)

*Primary Examiner* — Michael Y Mapa

(57) ABSTRACT

A trap monitoring apparatus, method and system includes an electronic monitoring device monitoring a trap for predetermined condition(s) based on received sensory input, the electronic monitoring device having a wireless transmitter that sends alert messages to a remote notification service based on receiving alerts from sensors, and further based on values of one or more operational parameters to determine whether to ignore sensed predetermined conditions, or to immediately notify or delay notifying a remote notification service.

11 Claims, 28 Drawing Sheets

(56) References Cited

U.S. PATENT DOCUMENTS

| | | |
|---|---|---|
| 6,313,748 B1 | 11/2001 | Lake |
| 6,415,544 B1 | 7/2002 | Leyerle et al. |
| 6,445,301 B1 | 9/2002 | Farrell et al. |
| 6,508,031 B1 | 1/2003 | Johnson et al. |
| 6,574,912 B1 | 6/2003 | Johnson |
| 6,792,395 B2 | 9/2004 | Roberts |
| 6,807,767 B1 | 10/2004 | Schade |
| 6,864,789 B2 | 3/2005 | Wolfe |
| 6,914,529 B2 | 7/2005 | Barber et al. |
| 6,937,156 B2 | 8/2005 | Gardner, Jr. et al. |
| 7,002,481 B1 | 2/2006 | Crane et al. |
| 7,026,942 B2 | 4/2006 | Cristofori et al. |
| 7,076,211 B2 | 7/2006 | Donner et al. |
| 7,212,129 B2 | 5/2007 | Barber et al. |
| 7,233,781 B2 | 6/2007 | Hunter et al. |
| 7,262,702 B2 | 8/2007 | Barber et al. |
| 7,342,504 B2 | 3/2008 | Crane et al. |
| 7,577,516 B2 | 8/2009 | Dobeck et al. |
| 7,626,508 B2 | 12/2009 | Kosuge et al. |
| 7,656,300 B2 | 2/2010 | Rønnau |
| 7,715,887 B2 | 5/2010 | Cloutier et al. |
| 7,768,413 B2 | 8/2010 | Kosuge et al. |
| 7,952,485 B2 | 5/2011 | Schechter et al. |
| 8,378,789 B2 | 2/2013 | Moore |
| 8,412,147 B2 | 4/2013 | Hunter et al. |
| 8,520,589 B2 | 8/2013 | Bhatt et al. |
| 8,599,010 B2 | 12/2013 | Bose et al. |
| 8,646,204 B2 | 2/2014 | Chiu |
| 8,676,377 B2 | 3/2014 | Siegel et al. |
| 8,711,785 B2 | 4/2014 | Gholmieh et al. |
| 8,797,168 B2 | 8/2014 | Tolley et al. |
| 8,830,071 B2 | 9/2014 | Borth et al. |
| 9,015,987 B2 | 4/2015 | Moran et al. |
| 9,026,147 B2 | 5/2015 | Galvin et al. |
| 9,070,268 B2 | 6/2015 | Monacos et al. |
| 9,159,211 B2 | 10/2015 | O'Brien et al. |
| 9,196,148 B1 | 11/2015 | Hutz |
| 9,226,481 B1 | 1/2016 | Paripati |
| 9,265,001 B1 | 2/2016 | Tannenbaum et al. |
| 9,341,014 B2 | 5/2016 | Oshima et al. |
| 9,380,775 B2 | 7/2016 | Frojmovics |
| 9,439,412 B2 | 9/2016 | Kittelson |
| 9,439,995 B2 | 9/2016 | Conroy et al. |
| 9,442,594 B2 | 9/2016 | Graham et al. |
| 9,460,448 B2 | 10/2016 | Felgate |
| 9,510,582 B2 | 12/2016 | David et al. |
| 9,534,958 B1 | 1/2017 | Lhamon et al. |
| 9,542,835 B2 | 1/2017 | Borth et al. |
| 9,547,973 B1 | 1/2017 | Hutz |
| 9,613,521 B2 | 4/2017 | Hunter et al. |
| 9,740,921 B2 | 8/2017 | McClure et al. |
| 9,750,239 B2 | 9/2017 | Vilinskis et al. |
| 9,767,230 B2 | 9/2017 | Kimchi et al. |
| 9,799,207 B1 | 10/2017 | Tavares |
| 9,911,095 B2 | 3/2018 | Mashburn et al. |
| 9,986,313 B2 | 5/2018 | Schwarzkopf et al. |
| 10,026,300 B1 | 7/2018 | Hutz |
| 10,049,341 B2 | 8/2018 | Jones et al. |
| 10,079,903 B2 | 9/2018 | Cunico et al. |
| 10,085,438 B1 | 10/2018 | Dismang |
| 10,111,416 B2 | 10/2018 | Rich et al. |
| 10,127,797 B2 | 11/2018 | Probin et al. |
| 10,152,035 B2 | 12/2018 | Reid et al. |
| 10,157,372 B2 | 12/2018 | Brailovskiy et al. |
| 10,192,194 B2 | 1/2019 | Bernhardt et al. |
| 10,325,241 B2 | 6/2019 | Haimi |
| 10,489,743 B2 | 11/2019 | Aepli |
| 2001/0033230 A1 | 10/2001 | Barber et al. |
| 2003/0058097 A1 | 3/2003 | Saltzstein et al. |
| 2003/0213161 A1 | 11/2003 | Gardner et al. |
| 2004/0090329 A1 | 5/2004 | Hitt |
| 2004/0100394 A1 | 5/2004 | Hitt |
| 2005/0014482 A1 | 1/2005 | Holland et al. |
| 2005/0097808 A1* | 5/2005 | Vorhies ............... A01M 23/20 43/61 |
| 2005/0151653 A1 | 7/2005 | Chan et al. |
| 2005/0162279 A1 | 7/2005 | Marshall et al. |
| 2006/0042153 A1 | 3/2006 | Bowerman |
| 2006/0240853 A1 | 10/2006 | Donner et al. |
| 2007/0030156 A1 | 2/2007 | Schlager et al. |
| 2007/0032830 A1 | 2/2007 | Bowers |
| 2008/0055094 A1 | 3/2008 | Barber et al. |
| 2008/0204253 A1 | 8/2008 | Cottee et al. |
| 2008/0210153 A1 | 9/2008 | Alvarado |
| 2009/0063193 A1* | 3/2009 | Barton ................... A61B 5/349 340/539.11 |
| 2009/0260276 A1 | 10/2009 | Kirsch et al. |
| 2010/0134301 A1* | 6/2010 | Borth ................... H04W 76/10 340/573.2 |
| 2010/0148956 A1 | 6/2010 | Song et al. |
| 2010/0176954 A1 | 7/2010 | Alvarado |
| 2010/0283610 A1 | 11/2010 | Wetzel et al. |
| 2011/0109460 A1 | 5/2011 | Lloyd et al. |
| 2011/0230160 A1 | 9/2011 | Felgate |
| 2011/0242043 A1 | 10/2011 | Yarvis et al. |
| 2011/0312286 A1 | 12/2011 | Lin et al. |
| 2012/0245969 A1 | 9/2012 | Campbell |
| 2013/0162443 A1 | 6/2013 | Oppenheimer et al. |
| 2013/0208575 A1 | 8/2013 | Sammut |
| 2014/0071276 A1 | 3/2014 | Seifer et al. |
| 2014/0085100 A1 | 3/2014 | Rich et al. |
| 2014/0087762 A1 | 3/2014 | Galvin et al. |
| 2014/0106677 A1 | 4/2014 | Altman |
| 2014/0118135 A1 | 5/2014 | O'Brien et al. |
| 2014/0253377 A1 | 9/2014 | Scalisi et al. |
| 2015/0290392 A1 | 10/2015 | Henderson et al. |
| 2015/0351336 A1 | 12/2015 | Gilbert et al. |
| 2016/0018800 A1 | 1/2016 | Gettings et al. |
| 2016/0048798 A1 | 2/2016 | Meyer et al. |
| 2016/0086475 A1 | 3/2016 | Rich et al. |
| 2016/0192865 A1 | 7/2016 | Datta et al. |
| 2016/0232322 A1* | 8/2016 | Mensinger ........... A61B 5/0004 |
| 2016/0240074 A1 | 8/2016 | Probin et al. |
| 2016/0269533 A1 | 9/2016 | Taylor et al. |
| 2016/0371952 A1 | 12/2016 | Felgate |
| 2016/0379176 A1 | 12/2016 | Brailovskiy et al. |
| 2017/0035042 A1 | 2/2017 | Ben-Dashan et al. |
| 2017/0111128 A1 | 4/2017 | Hammerschmidt et al. |
| 2017/0112116 A1 | 4/2017 | Ji et al. |
| 2017/0140632 A1 | 5/2017 | Klein et al. |
| 2017/0208426 A1 | 7/2017 | Komoni et al. |
| 2017/0215381 A1 | 8/2017 | Shen et al. |
| 2017/0231214 A1 | 8/2017 | Vaisblat et al. |
| 2017/0231215 A1 | 8/2017 | Barton |
| 2017/0318796 A1 | 11/2017 | Vaisblat et al. |
| 2017/0360026 A1 | 12/2017 | Zirkle et al. |
| 2017/0374437 A1 | 12/2017 | Schwarzkopf et al. |
| 2018/0006719 A1 | 1/2018 | Cress et al. |
| 2018/0033289 A1 | 2/2018 | Lee |
| 2018/0075596 A1 | 3/2018 | Fryshman |
| 2018/0096581 A1 | 4/2018 | Daly, Jr. |
| 2018/0199172 A1 | 7/2018 | Boily et al. |
| 2018/0199565 A1 | 7/2018 | Zosimadis |
| 2018/0217228 A1 | 8/2018 | Edge et al. |
| 2018/0235205 A1* | 8/2018 | Howard ............... A01M 31/002 |
| 2018/0249696 A1 | 9/2018 | Daly, Jr. et al. |
| 2018/0254905 A1 | 9/2018 | Chun |
| 2018/0279603 A1 | 10/2018 | Madl et al. |
| 2018/0295831 A1 | 10/2018 | Reid et al. |
| 2018/0299842 A1 | 10/2018 | Reid et al. |
| 2018/0301918 A1 | 10/2018 | Upo et al. |
| 2018/0322454 A1 | 11/2018 | Komoni |
| 2018/0338681 A1 | 11/2018 | Scherer et al. |
| 2018/0350227 A1 | 12/2018 | Komoni |
| 2019/0037829 A1 | 2/2019 | Laut et al. |
| 2019/0078930 A1 | 3/2019 | Ravulapati |
| 2019/0096058 A1 | 3/2019 | Fryshman |
| 2019/0111272 A1 | 4/2019 | Hochhalter |
| 2019/0121302 A1 | 4/2019 | Reid et al. |
| 2019/0141295 A1 | 5/2019 | Lazar |
| 2019/0200597 A1 | 7/2019 | Borth et al. |
| 2019/0230148 A1 | 7/2019 | Borlik |
| 2020/0005626 A1 | 1/2020 | Triventi et al. |

(56) References Cited

U.S. PATENT DOCUMENTS

| 2020/0029550 A1 | 1/2020 | Koziar et al. |
| 2020/0045932 A1 | 2/2020 | Knight et al. |
| 2020/0134812 A1 | 4/2020 | Fryshman |

FOREIGN PATENT DOCUMENTS

| CA | 2920216 A1 | 8/2016 |
| CN | 102413553 A | 4/2012 |
| CN | 102457932 A | 5/2012 |
| CN | 203799486 U | 8/2014 |
| CN | 105894760 A | 8/2016 |
| EP | 3059719 A1 | 8/2016 |
| EP | 3013141 B1 | 9/2019 |
| ES | 2691531 T3 | 11/2018 |
| RU | 179998 U1 | 5/2018 |
| WO | 0226033 A1 | 4/2002 |
| WO | 2002100170 A3 | 10/2003 |
| WO | 2007094974 A1 | 8/2007 |
| WO | 2008064033 A2 | 5/2008 |
| WO | 2010030346 A1 | 3/2010 |
| WO | 2017004701 A1 | 1/2017 |
| WO | 2017011916 A1 | 1/2017 |
| WO | 2017171281 A2 | 10/2017 |
| WO | 2018145880 A1 | 8/2018 |
| WO | 2019157536 A1 | 8/2019 |
| WO | 2019168855 A2 | 9/2019 |

OTHER PUBLICATIONS

Lloret et al., "A Wireless Sensor Network Deployment for Rural and Forest Fire Detection and Verification", Sensors 2009, Oct. 30, 2009, pp. 8722-8747, vol. 9, MDPI AG, Basel, Switzerland.

Mekki et al., "A comparative study of LPWAN technologies for large-scale IoT deployment", ICT Express, Mar. 2019, pp. 1-7, vol. 5, Issue 1, Korean Institute of Communications and Information Sciences (KICS), production and hosting by Elsevier B.V., https://www.sciencedirect.com/science/article/pii/S2405959517302953?via%3Dihub.

Petric et al., "Measurements, Performance and Analysis of LoRa Fabian, a real-world implementation of LPWAn", Personal, Indoor, and Mobile Radio Communications (PIMRC), 2016 IEEE 27th Annual International Symposium on Personal, Indoor, and Mobile Radio Communications, Sep. 2016, Valencia, Spain., https://hal-imt.archives-ouvertes.fr/hal-01331966.

Son et al., "A Design and Implementation of Forest-Fires Surveillance System based on Wireless Sensor Networks for South Korea Mountains", International Journal of Computer Science and Network Security, Sep. 2006, pp. 124-130, vol. 6 No. 9B, IJCSNS.org, Seoul, Korea.

Tim Urban, Everything You Should Know About Sound, Wait But Why, Mar. 9, 2019, https://waitbutwhy.com/2016/03/sound.html.

Yousef et al. "A low-cost LoRaWAN testbed for IoT: Implementation and measurements." Internet of Things (WF-IoT), 2018 IEEE 4th World Forum on. IEEE, 2018.

\* cited by examiner

| | Example |
|---|---|
| 371 Unit_ID | 12345 |
| 372 Unit_isActivated | 1 |
| 373 Unit_battery | 0 |
| 374 Unit_reset | 0 |
| 375 Unit_format | 0 |
| 376 Unit_Trigger | 0 |
| 377 Unit_Sensor1 | 1 |
| 378 Unit_Sensor2 | 1 |
| 379 Unit_SensorN | 0 |
| 380 Unit_Change | 0 |
| 381 Unit_Pause | 0 |
| 382 Unit_AutoPause | 0 |
| 383 Unit_AlertDelay | 0 |
| 384 Unit_AutoCheckIn | 720 |
| 385 Unit_currentFW | 1.0 |
| 386 Unit_updateFW | - |
| 387 Unit_location | - |
| 388 Unit_BSM | 3 |
| 389 Handle#1:DS#1 | owner@xmail.com:sendmail |
| 390 Handle#2:DS#2 | 123-456-7890:sendSMS |
| 391 Handle#m:DS#m | - |

SYSTEMS, METHODS, AND DEVICES FOR REMOTE TRAP MONITORING

CROSS-REFERENCE TO RELATED APPLICATIONS

This application is a continuation of U.S. patent application Ser. No. 16/865,280, filed on May 1, 2020, which is a continuation-in-part of U.S. patent application Ser. No. 16/183,732, filed Nov. 8, 2018 and issued on Jun. 23, 2020 as U.S. Pat. No. 10,694,338, which claims the benefit of U.S. Provisional Patent Application No. 62/582,508, filed Nov. 7, 2017 and of U.S. Provisional Patent Application No. 62/752,284, filed Oct. 29, 2018, each of which is incorporated by reference herein in its entirety. This application claims the benefit of U.S. Patent Application No. 62/841,452, filed May 1, 2019, which is incorporated by reference herein in its entirety.

BACKGROUND

The conventional method for monitoring the presence of an animal in a trap is to physically check the trap in person. Pest control companies and professional wildlife trappers often need to monitor multiple traps. Often these traps are located far away from where the person monitoring the trap lives or works, and/or from other traps being monitored concurrently. Additionally, such traps are often placed in ungroomed or natural areas that may be difficult to reach and/or require significant effort on the part of the person monitoring the trap. For various reasons, including regulatory requirements, ethics, and economics, it is important to remove captured animals from traps expeditiously. Accordingly, traps need to be checked regularly and frequently for the presence of an animal.

SUMMARY

Figure 1:
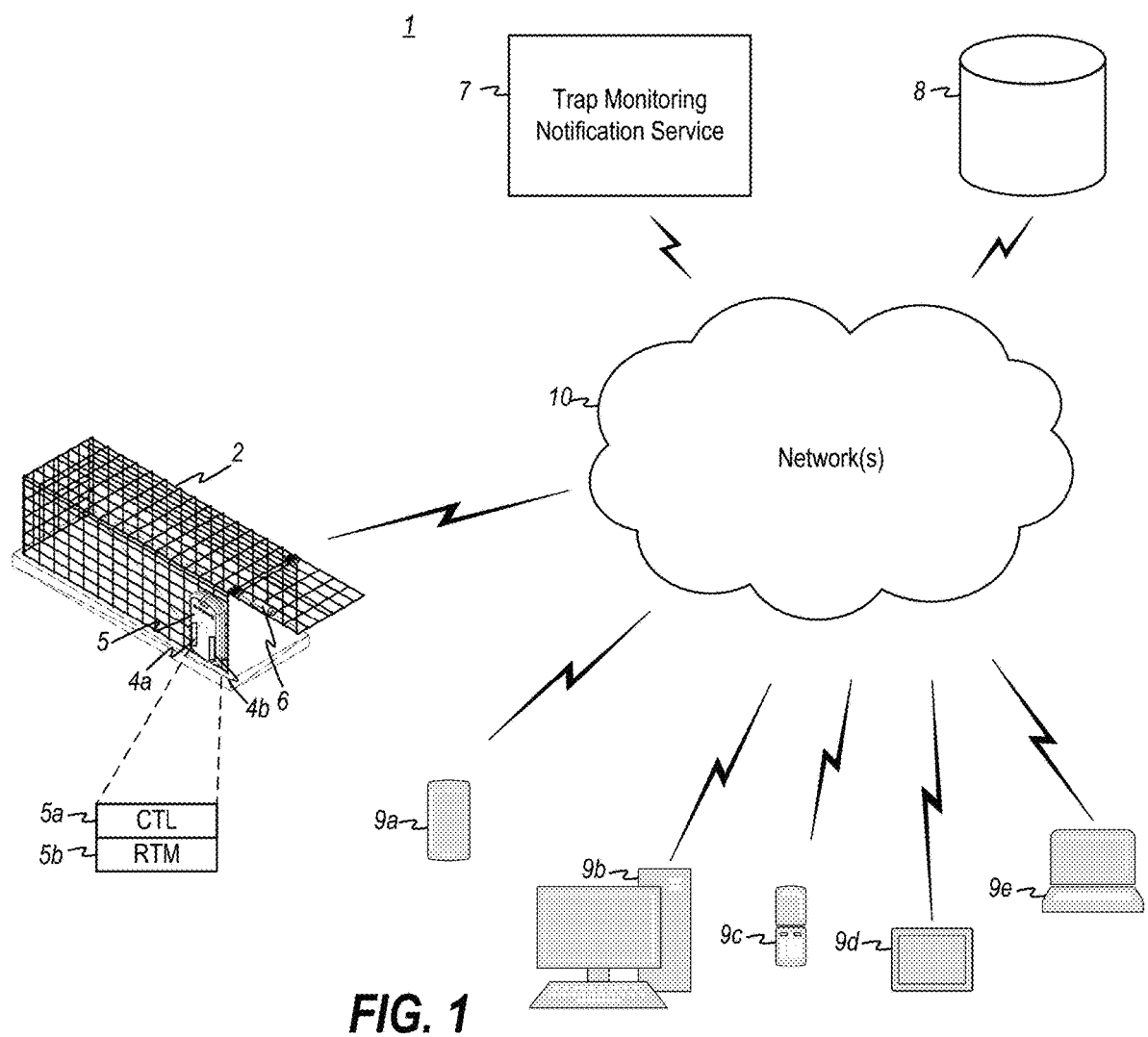
FIG. 1 is a system diagram of an exemplary environment implementing a remote trap monitoring system in accordance with an embodiment of the invention.

A trap monitoring apparatus, method and system includes an electronic monitoring device monitoring a trap for predetermined condition(s) based on received sensory input, the electronic monitoring device having a wireless transmitter that sends alert messages to a remote notification service based on receiving alerts from sensors, and further based on values of one or more operational parameters to determine whether to ignore sensed predetermined conditions, or to immediately notify or delay notifying a remote notification service.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring now to FIG. 1, a remote trap monitoring system 1 includes a trap 2, a sensor monitoring and transmission device (SMT) 5, one or more sensors 4, a communications network 10, a trap monitoring notification service 7 and one or more remote electronic user devices 9.

Figure 2A:
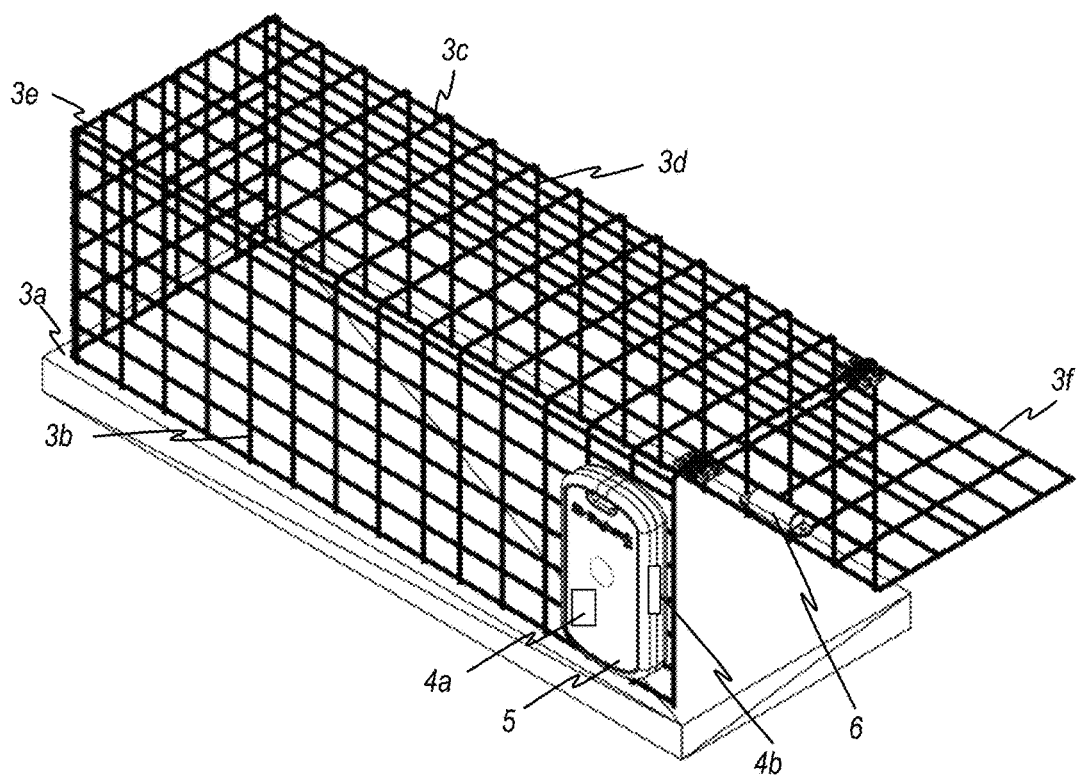
FIGS. 2A-2D are respective perspective views of an exemplary trap having a sensor monitoring and transmission device (SMT) attached in various positions thereto.
Figure 2B:
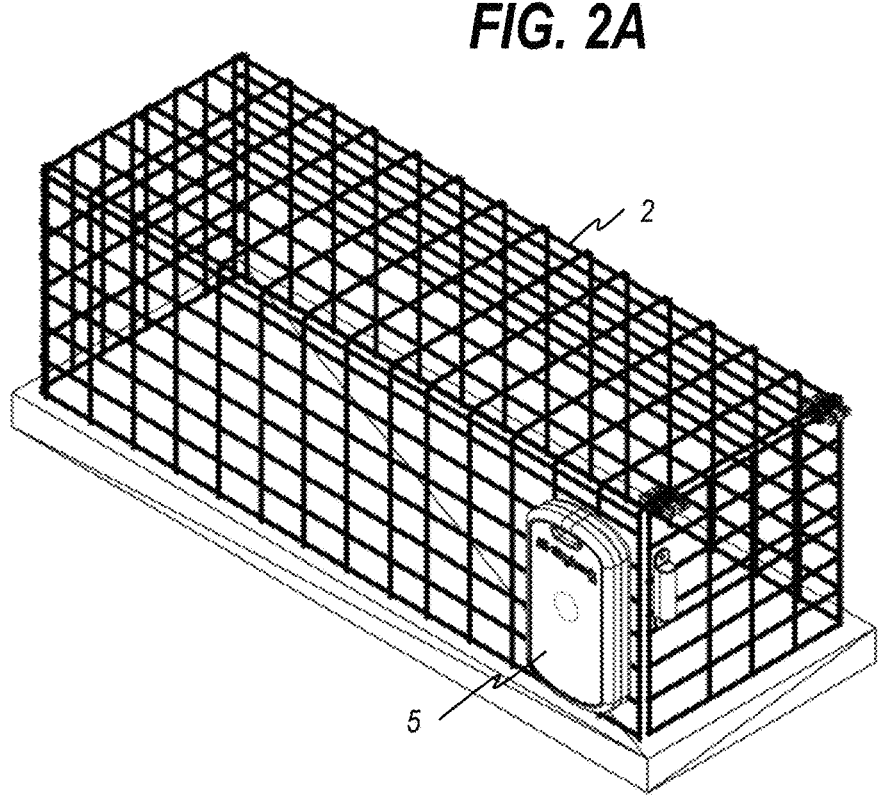

Referring to FIG. 2A, which depicts an example embodiment of trap 2 in greater detail, trap 2 includes a plurality of walls defining an entrance and an inner cavity. The walls include bottom wall 3a, first side wall 3b, top wall 3c, second side wall 3d, and rear wall 3e. A movable trapping member 3f (such as, but not limited to, a door) is positioned proximal to the entrance and is arranged to move from an open state in which movable trapping member 3f does not block the entrance and a closed state in which the movable trapping member 3f blocks the entrance to prevent exit from the cavity. FIG. 2A illustrates the movable trapping member 3f in an open state, and FIG. 2B illustrates the movable trapping member 3f in a closed state. Although not shown, the movable trapping member 3f is typically retained in the closed position by a retaining member until the retaining member is released, typically by a human. Although a certain type of trap is illustrated, other embodiments can include different types of traps and movable trapping member. Examples might include traps that have jaws that clamp on an animal or enclosures that surround an animal or devices for launching a net or other items designed to entangle an animal (e.g. a net).

Sensors 4 are integrated into, embedded within, or in remote communication with, the SMT 5 to detect various states of the trap and types of activity at the trap 2. The sensor(s) 4a, 4b (and optional additional sensors (not shown) may include a number of different types of sensors to support detection of the monitored trap states, trap activity types, and environmental conditions, and may include, by way of illustration and not limitation, any one or more, or combination of, an accelerometer, a microphone, a passive infrared (PIR) sensor, a range sensor, a strain gauge sensor, an electromagnetic switch (such as a reed switch or Hall effect sensor), a magnetic sensor, a camera, a charge sensor, a load sensor, a voltage sensor, a resistance sensor, a capacitance sensor, a thermo sensor, a temperature sensor, a humidity sensor, a flex sensor, a pressure sensor, a chemical composition sensor, an optical sensor, a UV Index sensor, a sound sensor, a wind sensor, a positioning sensor, a moisture sensor, etc. Alternative sensors may be used without departing from the spirit and scope of the inventive embodiments.

One state of significant interest to remote trap monitoring is the state of the moveable trapping member—that is, whether the movable trapping member 3f is in an open state or a closed state. The state of the movable trapping member may be detected using a sensor 4, which may be implemented using various types of sensors, such as, by way of illustration and not limitation, a proximity sensor, an accelerometer, a microphone, a passive infrared (PIR) sensor, a reed switch, a Hall effect sensor, a camera, an optical sensor, a flex sensor, a strain gauge, a range sensor, a capacitive load sensor, a pressure sensor, a load sensor, and a positioning sensor.

In an embodiment, the state (open or closed) of the movable trapping member 3f is detected using an electromagnetic sensor or switch (for example only and not limitation, a reed switch), shown as sensor 4b. The reed switch 4b comprises a one or more ferrous reeds encased in an environmentally sealed container that become magnetized when in proximity to a magnet 6. In a normally open type of reed switch, the switch is open when the reed switch 4b is not in proximity to the magnet 6; thus, placement of the magnet such that it comes into proximity of the reed switch only when the movable trapping member 3f is in the closed state allows the reed switch to positively indicate that the movable trapping member 3f is in the closed state only when the movable trapping member 3f is in fact in the closed state (i.e., the trap door is closed). Generally the closing of the trap door after the trap has been set indicates that an animal is trapped inside the trap. Other reed switch configurations could also be used. For example, the reed switch could be a normally closed switch whereby the detection circuit is programmed to equate the closed state of the movable trapping member 3f with the open state of the switch.

In an embodiment, the sensor 4b is integrated into the SMT 5. In an alternative embodiment, the sensor 4b is remote from the SMT 5 and is electrically connected by physical wire or local wireless signal transmission to the SMT 5. As shown in the embodiment of FIG. 2B, sensor 4b is integrated into the SMT 5, which is mounted in proximity to the entry of the trap. A magnet 6 is mounted to the movable member 3f, whereby when the movable trapping member 6f is in the open state (i.e., the door is open), the sensor does not activate the sensor 4b, and when the movable trapping member 6f is in the closed state (i.e., the door is closed), the sensor 4b is activated—that is, the sensor 4b and magnet 6 are aligned and in sufficient proximity to one another to activate (via the magnetic field) the reed switch 4b is magnetized by the magnet 6 when the movable trapping member 3f enters the closed state (i.e., the trap door closes). Alternatively, the magnet 6 may be mounted on the trap, and the sensor 4b mounted on the movable trapping member 3f.

In an alternative embodiment, the state of the movable trapping member 3f is detected using an alternative sensor, such as but not limited to an accelerometer, a PIR sensor, a range sensor, etc., shown as sensor 4a. Sensor 4a may be integrated into the SMT 5, or may be attached to the trap, remote from the SMT 5, but in wired or wireless communication with the SMT 5.

Figure 2C:
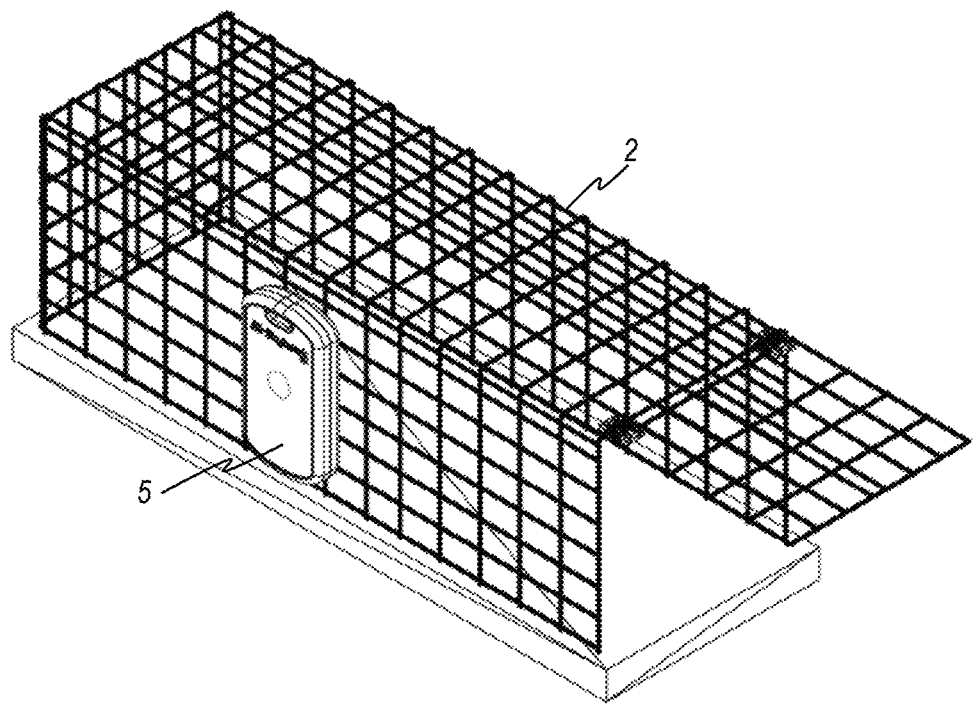
Figure 2D:
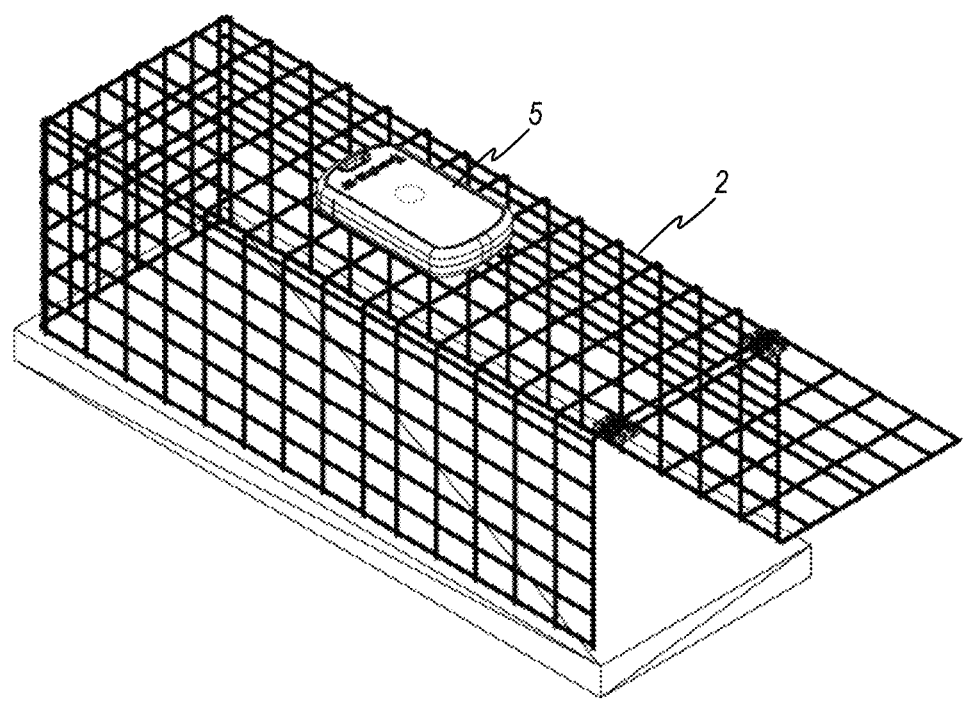

FIGS. 2C and 2D illustrate an SMT 5 attached to the trap 2 in various positions, such as on the side wall (FIG. 2C) and the top (FIG. 2D) of the trap 2. In these embodiments, the SMT 5 includes a sensor 4 embedded into the SMT 5 itself, which is capable of detecting one or more activity types and/or state(s) of the trap 2. For example, if at least one sensor 4a is an activity sensor such as but not limited to an accelerometer, a PIR sensor, a range sensor, etc., as discussed hereinafter, the state of the movable trap member 3f and various types of activities in connection with the trap 2 and/or an animal trapped in the trap 2, may be detected.

Returning to FIG. 1, the sensor monitoring and transmission (SMT) module includes at least a controller (CTL) 5a and a radio frequency (RF) transmission module (RTM) 5b. The sensor(s) 4a and/or 4b senses trap status and/or trap activity in connection with the remotely monitored trap 2. The controller 5a is responsive to sensor information from the sensor(s) 4a, 4b and generates trap event notification messages that are transmitted by the RTM 5b to a remote notification service 7, via one or more network(s) 10. The SMT 5 is registered with the notification service 7. In a preferred embodiment the notification service 7 is accessible via a packet data network (PDN) such as the Internet, but it is to be understood that the notification message may be transmitted from the SMT 5 and routed to the notification service 7 across multiple different networks having different physical and logical communication stacks/protocols, such as one or more different cellular networks and/or one or more different packet data networks.

The SMT 5 may be a standalone unit separate from the trap 2 that monitors the state of the trap remotely, or through contact with the trap 2 through physical attachment to the trap. The SMT 5 may alternatively be attached to, embedded in, integrated into or otherwise associated with the trap 2. The term "trap/SMT" herein refers to the combined unit of the trap and SMT, regardless of the form of the combination, so long as the SMT is able to detect monitored state information or activity in connection with the trap. In the embodiment shown in FIGS. 2A-2D, the SMT 5 is a separate standalone unit that is attached to existing ("legacy") trap units 2 via magnets, straps, Velcro, glue, epoxy, screws, hook(s), carabiner(s), ring(s), etc. In an alternative embodiment the SMT 5 is embedded and/or integrated into the trap 2 itself (not shown).

The trap monitoring notification service 7 stores registration information in a database 8. The registration information stored in the database 8 includes the device identifier for each trap 2/SMT 5 that is registered with the notification service 7, along with corresponding recipient and delivery service information associated therewith. In an embodiment, the database 8 stores the device ID of each registered device (SMT 5), along with, for each device ID, one or more delivery addresses and corresponding indications of electronic delivery services which are to be used to deliver a notification to the corresponding respective delivery addresses. Such a schema allows for notification to one or more notification recipients via various notification delivery mechanisms. For example, for a given registered device SMT 5, notification may be sent to one or more recipients via individual respective chosen notification methodologies (e.g., email, SMS text, in-app push notification, etc.) so that each notification recipient can receive notification via a respective preferred technology.

For example, for a given registered SMT 5, the notification service may be configured such that a notification is delivered via email to a particular user's (a "notification recipient" or simply "recipient") email address, via SMS text to a recipient's mobile phone number, and to a recipient's app executing on the recipient's smart phone (and addressed via the smart phone number or email address). A different registered SMT 5 (not shown) having a different device ID may be configured such that a notification is delivered, for example, only via SMS text to a different recipient's mobile phone number. The described registration schema contemplates the ability to allow the notification methodology for different registered devices to be individually configured such that notification recipient information and preferences can be specified on a device-by-device basis—that is, on a per trap/SMT module basis). In embodiments, users of the trap monitoring notification service 7 can select the notification delivery service(s) and corresponding notification recipients to be notified by the service, via a web-enabled app (see 311a in FIG. 10), a website portal or API. While it is contemplated that the notification service 7 supports user-configurable notification preferences, it is also within the scope of the invention that the notification delivery service(s) and notification recipients are predetermined by an administrator, and enterprise-level entity or other entity.

In operation, upon detection of a state change or detection of an activity type at the trap 2 (and potentially upon the detection of one or more additional environmental and/or the calculation of one or more conditions based on a calculated or state machine condition or state in the SMT 5), the controller 5a of the SMT 5 coordinates with the RTM 5b to send an alert, via one or more networks 10, to the notification service 7. Upon receiving an alert from the SMT 5, the notification service 7 determines the device ID of the SMT 5 from which the alert was sourced, identifies the delivery addresses and corresponding electronic notification delivery services by which notification recipients associated with the device ID are to be notified, and sends a notification to, preferably each of, the identified delivery addresses associated with the device ID via the identified corresponding delivery services. In this way, notification recipients of electronic messages accessed on remote devices 9 (such as but not limited to one or more smartphones 9a, computers 9b, cell phones 9c, tablets 9d, and/or laptops 9e, collectively 9) can be informed when monitored activity and environmental conditions occur with respect to the monitored trap 2.

The communications network(s) 10 may be any network or combination of networks that enables transmission of an alert from SMT 5 to the trap monitoring notification service 7, and further that enables the trap monitoring notification service 7 to transmit a notification message to the smart device(s) of the notification recipient(s) associated with the SMT 5. In various embodiments, the communications network may comprise one or more, or a combination of, wireless and/or wired networks, such as but not limited to Wide Area Networks (WANs), Local Area Networks (LANs), Wireless LANs (WLANs), Low Power Wide Area Networks (LPWANs), 3G, 4G and 5G cellular networks, Wi-Fi networks, satellite networks, wireless mesh networks (for example using a Zigbee standard protocol), Bluetooth, etc., and may thereby require use of, and (if required) translation between, various transport protocols, including by way of example and not limitation, TCP, TCP/IP, IP, Ethernet, Zigbee, Bluetooth, etc. In a preferred embodiment, the network(s) 10 comprises an LPWAN such as a 3GPP Long Term Evolution (LTE) CAT-M1 (or other enhanced Machine-Type Communication (eMTC) protocol, a Narrow-Band Internet of Things (NB-IoT) protocol, or an Extended coverage GSM IoT (EC-GSM-IoT) protocol, at least for direct communication between the network(s) 10 and the SMT 5.

Figure 3:
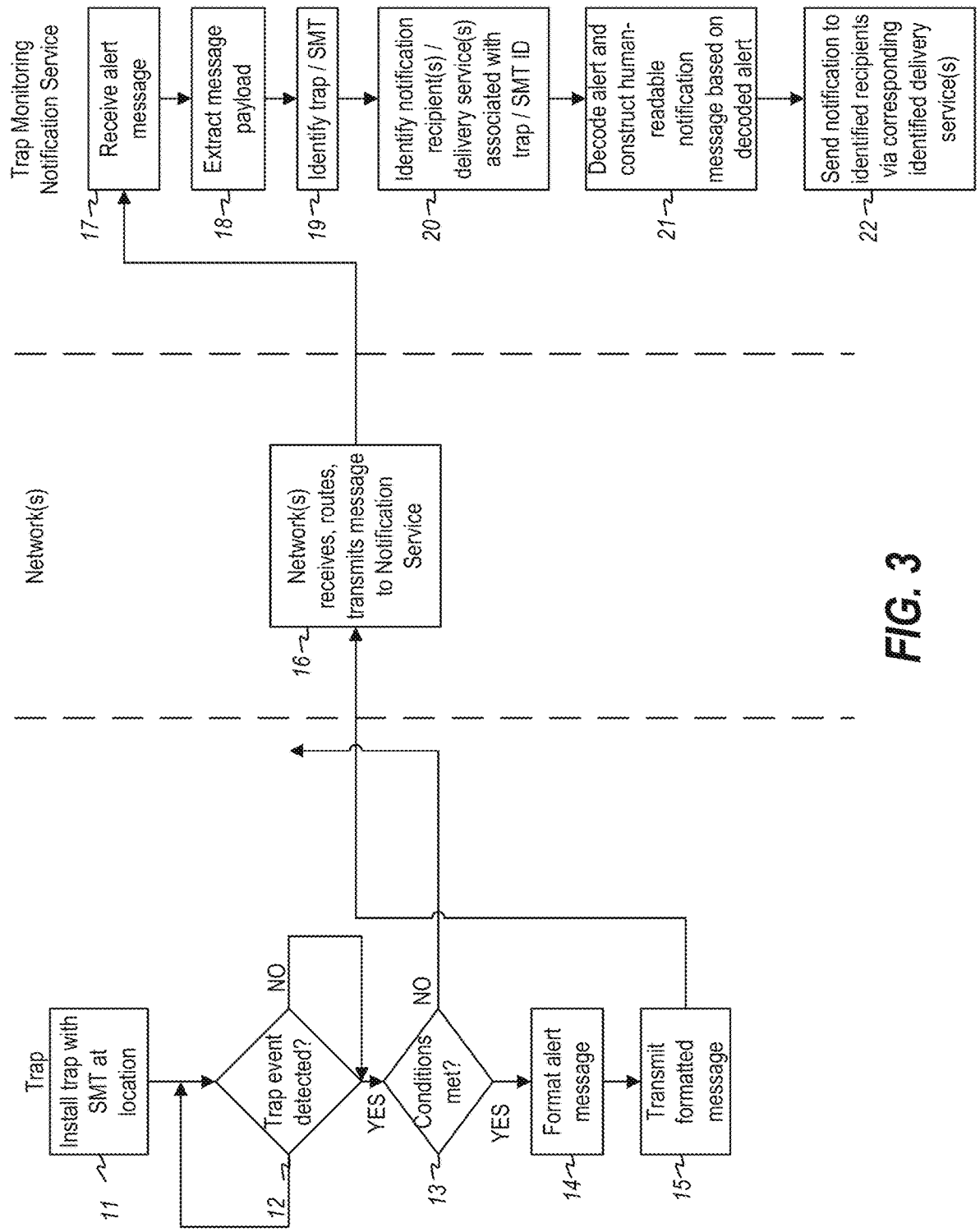
FIG. 3 is a flowchart illustrating an exemplary embodiment of a notification service method for notifying recipients of a change in state or detection of a monitored activity type at a trap.

FIG. 3 is a flowchart illustrating an exemplary embodiment of a notification service method for notifying recipients of a change in state or detection of a monitored activity type at a trap 2. According to the method 10, a trap 2 having an SMT 5 attached to, embedded in, integrated with or otherwise associated with, is installed at a location (step 11). When a monitored event or condition is detected by one of the sensor(s) 4, the SMT 5 detects or is otherwise notified of the monitored event or condition (step 12). Optionally, the controller performs pre-processing to determine whether predetermined conditions are met that warrant the sending of an alert to the notification service 7 (step 13). If the optional step is not implemented, or if in step 13 the predetermined conditions are found to be met, the SMT 5 formats an alert message (step 14) and transmits the alert message to the notification service 7 (step 15). In an embodiment, the SMT controller 5a formats an alert message that contains at least a device identifier (the device ID) of the trap 2 and/or SMT 5, and an alert code or other message that may be processed and decoded by the notification service 7 to determine an appropriate message to send when notifying notification recipients associated with the trap 2/SMT 5. In an embodiment, the controller 5a coordinates with the remote transmission module 5b to send the alert message to the notification service 7. In an embodiment, the RTM 5b transmits the alert message (using the appropriate network protocol), which is received by a remote receiver in a radio access network (included in network(s) 10), and may be further transmitted, routed, processed (step 16), and ultimately received (step 17) via the network(s) 6, processed and decoded by the notification service 7.

The notification service 7 receives the alert message, processes the message to extract the message payload (i.e., the substantive contents of the message) (step 18), and decodes the alert message to identify the trap 2/SMT 5 which sent the alert (step 19). The payload of the message contains the trap/SMT ID. The notification service 7 uses the trap/SMT ID to look up or otherwise identify one or a list of notification recipients who should receive a notification message and the corresponding delivery service(s) by which each recipient should be notified (e.g., text, email, voicemail, in-app notification, etc.) (step 20).

The extracted payload of the message also includes a code indicating a substantive alert condition, which may be any one of a number of monitored trap states and/or trap activity types, at the trap 2. In a preferred embodiment, as discussed hereinafter, the extracted payload may also include location information, such as current GPS coordinates of the trap 2. The notification service 7 decodes the code (and location information if available) and constructs a human readable message in the appropriate format of the delivery service(s) for each identified delivery service corresponding to each notification recipient (step 21). Delivery services may include such services such as a text (SMS) delivery service, an email delivery service, an in-app notification delivery service, a voicemail delivery service, or other type of delivery service that delivers content such as text, audio, video, images, app-push notifications, etc., to an end-user device. The format of the human-understandable message will depend on the particular delivery service. For example, an SMS delivery service requires a text message; an email message requires text or an attachment, a voicemail delivery service requires an audio file containing human-understandable audio content, an in-app notification delivery service may contain text, an image containing human-understandable message, an audio/video clip, a document, etc. If location information is available, either directly from the message itself or as information stored in the database 8 at the time the trap 2/SMT 5 was registered with the notification service 7, preferably the constructed notification message includes the location of the trap 2.

The notification service 7 then sends the constructed notification message(s) via the corresponding delivery service(s) to the notification recipient delivery address(es) for the identified notification recipient(s) associated with the identified SMT 5 (step 22).

Figure 4:
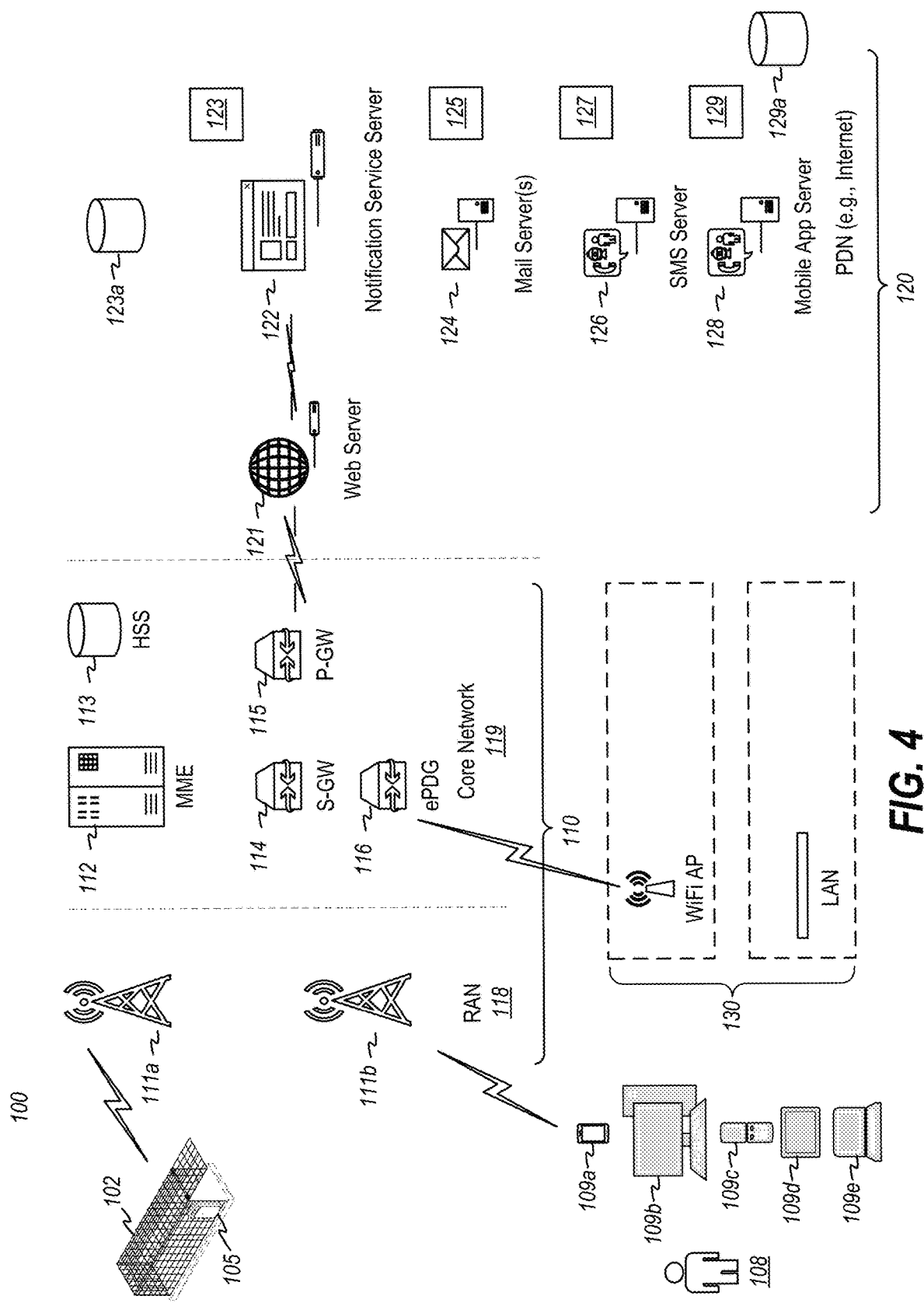
FIG. 4 is a system diagram illustrating an exemplary embodiment of a network environment implementing a remote trap monitoring system.

Turning now to FIG. 4, there is shown an exemplary embodiment of a network environment 100 implementing a remote trap monitoring system 100. System 100 is designed as a long-lasting low-power remote-access trap monitoring system that allows a trap 102 and SMT 105 to be installed in remote locations that may not have access to power and/or (reliable) WiFi for accessing the Internet 120, yet can still transmit alert messages to an Internet-connected Remote Trap Monitoring Notification Service 123. With these parameters in mind, power to the SMT 105 is therefore preferably supplied solely from a battery supply (or optionally a standalone power source such as a solar power supply), and the SMT 105 accesses the Internet 120 to communicate with the Notification Service 123 using a Low Power Wide Area Network (LPWAN). In an embodiment, the LPWAN is a low power cellular network (for example, a CAT-M1, CAT-NB1 or EGSM-IoT enabled network).

In the environment 100 shown in FIG. 4, trap 102 is placed in a location, along with SMT 105 and sensor(s) 4. In an embodiment, the sensor(s) 4 are integrated into the SMT 105, which is preferably attached directly to the trap 102. In an alternative embodiment, one or more sensor(s) 4 which the SMT 105 can remotely monitor are installed on, in or near the trap 102, in respective position(s) to accurately and appropriately monitor the state or conditions that they are intended to monitor. For example, if one sensor is a reed switch, it must be placed in a position that will enable a magnetic field when the movable trap member is in a closed state. As another example, if one sensor is an accelerometer from which the state of the movable trapping member and/or a monitored activity type can be detected, the accelerometer is attached, directly or indirectly, to the trap 2. Once the trap 2, SMT 105 and sensor(s) 4 are positioned and the SMT 105 is turned on and activated through the remote trap monitoring notification service 7, the SMT 105 monitors the sensor(s) 4 for sensor information. Sensor information may relate to one or more trap states, such as, by way of example and not limitation: trap door open (movable trapping member 3f in open state), trap door closed (movable trapping member 3f in closed state), trap upright, trap overturned on side/upside down/back, environmental temperature, other environmental conditions, etc. Sensor information may relate to one or more trap activity events, such as, by way of example and not limitation: trap door closed (movable trapping member 3f changed from open to closed state), trap vibration detected (indicating animal, human or environmental disturbance of trap), presence of animal in trap, size of animal in trap, type of animal in trap, precipitation (rain, sleet, snow) at trap, high wind at trap, movement of trap, etc. Movement may include vibrational movement which can occur when a human, animal, or environment interacts with trap 102. Movement may also include geo-locational movement which can occur when the trap 102 is physically moved from one location to another. Upon detection of movement, the SMT 105 may connect through a Low-Power Cellular Network 110 (shown as an LTE-M network) to the Internet, to send an alert message to the Remote Trap Monitoring Notification Service 123.

The Remote Trap Monitoring Notification Service 123 is connected to the Internet 123 by way of an Internet-enabled Notification Service server 122, a computer system comprising at least one central processing unit (CPU) executing program instructions stored in local or remote computer-readable memory. The Remote Trap Notification Service 123 may be a web-enabled service, which sends and receives incoming Internet communications via a Web Server 121.

The Notification Service server 122 passes the message to the Notification Service 123, which parses and decodes the alert message, creates a human-readable notification message that indicates the state or activity type associated with the alert message, and sends the notification message to the notification recipient(s) associated with the trap 102/SMT 105 that sent the alert message via the corresponding notification delivery services 125, 127, 129 associated with the notification recipient(s). The notification messages are sent by Internet-enabled services, such as an email service 125, an SMS text service 127, and an app push notification service 129. Such services connect to the Internet via servers 124, 126, 128, respectively, which route the notification message(s) to the device(s) 109 of the notification recipient(s) 108. The messages may be routed through the Internet to another network, such as a cellular network, a WiFi network, a LAN, etc. to reach the intended destination (i.e., an electronic device 109 capable of receiving the notification message(s) via the corresponding delivery service(s).

Figure 5:
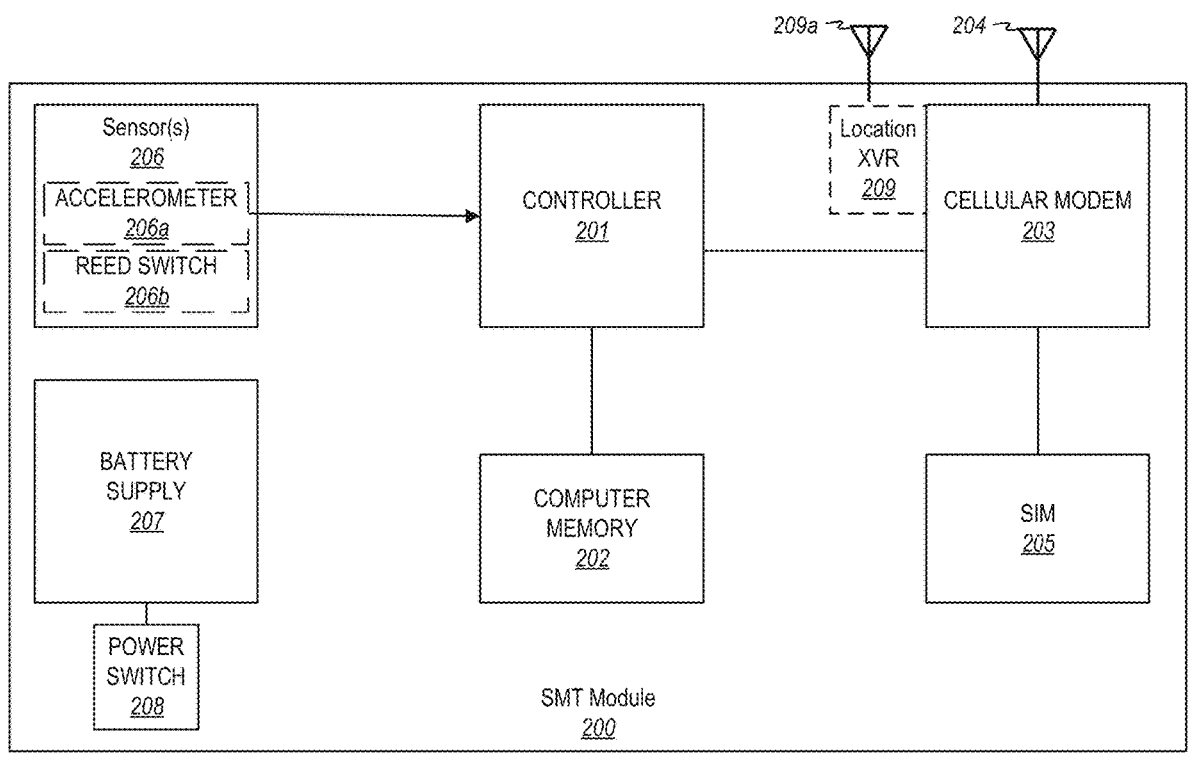
FIG. 5 is a schematic block diagram of an exemplary embodiment of an SMT.

Turning in more detail to SMT 5/105, FIG. 5 is a schematic block diagram of an exemplary embodiment 200 of SMT 105 (and/or SMT 5 in FIG. 1). As shown in FIG. 5, SMT 200 includes a controller 201, computer memory 202 which stores program instructions and data (including a unique serial number (SN) of the SMT 105 and/or trap 102), a cellular modem 203 which includes internal memory and stores an International Mobile Equipment Identifier (IMEI), an antenna 204, a Subscriber Identity Module (SIM) 205 that stores a unique Integrated Circuit Card Identifier (ICCID), optional sensor(s) 206, and a battery supply 207 which is electrically coupled to, and supplies power to, all the electronic components of the SMT 200.

The controller 201 may be a microprocessor, a computer processing unit (CPU), a microcontroller unit (MCU), or custom application specific integrated circuit (ASIC), or other integrated circuit (IC), or non-integrated circuitry, that is electrically coupled to (directly or indirectly), or has embedded therein, computer memory 202. Computer memory 202 comprises computer readable storage media, preferably in the form of one or more, or any combination, of Programmable Read-Only Memory (PROM, EPROM, EEPROM, flash EPROM), and/or Random Access Memory (RAM, DRAM, SRAM, SDRAM, etc.). Computer memory 202 stores program instructions executable by the controller 201 to perform one or more operative steps for implementing various aspects of the invention. The computer memory 202 further stores data which may be used by the controller 201 in its operations. The computer memory 202 may be integrated or embedded within the integrated circuit (IC) implementing the controller 201 or may be standalone memory IC(s) electrically coupled to the controller via one or more busses.

The cellular modem 203 is electronic circuitry typically fabricated in the form of an integrated circuit (IC) that contains the hardware and control functions for implementing the RF communication (the "cellular chip"). In particular, a typical cellular modem 203 contains a controller/CPU, integrated computer memory, signal encoding/decoding circuitry, a power amplifier, and a baseband processor which includes multiplexing/demultipexing, channel selection, carrier generation, and modulation circuitry. In an embodiment, the cellular modem 203 is responsive to telephone Attention (AT) commands for controlling the modem, and converts digital messages into RF transmission signal suitable for the network on which it is transmitted. For example, where the cellular modem 203 is implemented to connect to a Long Term Evolution enhanced Machine Type Communication (LTE-eMTC, or "LTE-M", GGPP Release 13 and 14) cellular network, the cellular modem 203 is configured to transmit signals on the antenna 204 according to an LTE-M or LTE-NB-IoT protocol. Where the cellular modem 203 is implemented to connect to a Global System for Mobile Communications (GSM) network, the cellular modem 203 may be configured to transmit signals on the antenna 204 according to an Extended Coverage GSM Internet of Things (EC-GSM-IoT) protocol. The cellular modem 203 is further configured to receive RF signals carrying messages from the Notification Service 107 (FIG. 3) and to convert the received signals into a digital format recognizable by the controller 201.

Optional sensor(s) 206 may comprise any sensor that can be used to detect activity and information related to the trap, an animal in the trap, and/or environmental conditions at the trap 2. For example, in an embodiment, sensor(s) 206 may comprise one or more movement detection sensors 206a that detect movement and/or vibration and generates at least one output signal based on detected movement/vibration. In an embodiment, the movement detection sensor 206a generates, on at least one output port (such as one or more wires, pins or pads), an output signal representative of a detected movement. In an embodiment, the movement detection sensor 206a is implemented using an electronic accelerometer, which measures acceleration and direction of acceleration in response to movement or vibration. Alternatively, the movement detection sensor 206a could comprise a GPS module (not shown) which receives positioning signals from a Global Positioning System and compares present location to recent past location to detect whether the SMT 200 has moved from its previous location. Where the sensor 206a includes a GPS module, the computer memory 202 may store initial and/or present location information, and further may store one or more additional location information acquired by the GPS module over a period of time. In an embodiment, the output signal of the sensor 206a may be a signal between two voltage rail values (e.g., for purposes of example only and not limitation a low rail value of 0V and a high rail value of 1.8-3.3 V) and the voltage level of the output signal is representative of the magnitude of acceleration/vibration. Additional signals may include the direction of acceleration. In an alternative embodiment, the output signal of the movement detection device 206a is a binary signal which is mapped in a first state (either low or high voltage) when no movement/acceleration is detected or when detected movement/acceleration is (at or) below a trigger threshold, and in a second state (voltage level being the opposite of the first state) when detected movement/acceleration is (at or) above the trigger (or a second trigger) threshold. If the sensor 206a is a GPS module, the signal may carry information including the GPS coordinates of the sensor 206a.

In an embodiment, the sensor(s) 206 comprise a trap door state detection sensor 206b, such as a reed switch, which operates as discussed previously.

In other embodiments, the sensor(s) 206 may include additional or different types of trap state, trap activity and environmental sensors, which may include without limitation a temperature sensor, a humidity sensor, an optical sensor, a sound sensor, a PIR sensor, a camera, a flex sensor, a movement sensor, a range sensor, a pressure sensor, a capacitive load sensor, etc.

Structurally, the controller 201 is electrically coupled to the sensor(s) 206 and the cellular modem 203. In an embodiment, the controller 201 is a microprocessor or microcontroller capable of receiving interrupt signals and processing interrupt service routines. In such embodiment, the controller 201 is coupled, directly or indirectly, to receive and process one or more signal(s) generated by the sensor(s) 206 and executes hardware logic or program instructions based on the received sensor signal(s). For example, in the case where the movement detection sensor 206a is an accelerometer which detects movement/acceleration at or above a predetermined threshold level, the accelerometer generates one or more output signal(s) indicating the condition. In an embodiment, the controller 201 comprises a microprocessor that is capable of processing an interrupt received on an interrupt input port (e.g., a pin or pad of the microprocessor). The accelerometer 206a generates a signal indicative of a level of sensed movement/vibration on an output port of the accelerometer 206a. The output port of the accelerometer 206a is electrically coupled (directly or indirectly) to an interrupt input port of the controller 201, and the signal present on the output port of the accelerometer 206a serves as an interrupt signal to the controller. When the output signal of the accelerometer 206 indicates that it is in a triggered state (indicating that the accelerometer has sensed movement/vibration/acceleration (at or) above a threshold magnitude), it outputs a signal level or value indicating the threshold has been met, which generates an interrupt at the controller 201. When the controller 201 receives the interrupt from the accelerometer 206a, it executes an interrupt service routine to perform several actions. In particular, the controller 201 may formulate an alert message and send commands to the cellular modem 203 to transmit the alert message indicating the presence of movement activity at the trap 2.

As another example, in the case where the trap door state detection sensor 206b is a reed switch, the reed switch generates an output signal indicating the state of the trap door (i.e., the movable trapping member 3f. In particular, an output port of the reed switch has a first voltage level if the reed switch is in an open state, and has a second voltage level if the reed switch is in a closed state. The output port of the reed switch 206b may be electrically coupled (directly or indirectly) to an interrupt input port of the controller 201, thereby effecting the state of the reed switch as an interrupt signal to the controller. When the controller receives the interrupt from the reed switch 206b, it executes an interrupt service routine to perform several actions. In particular, the controller 201 may formulate an alert message and send commands to the cellular modem 203 to transmit the alert message indicating the state of the trap door (i.e., the movable trapping member 3f).

The cellular modem 203 adheres to a predetermined transmission protocol stack, as predefined based on the protocol used for communicating with the cellular service to which the SMT 105 subscribes. As is required generally for cellular modems that need to deliver messages from a mobile device through a cellular network to a packet data network (e.g., the Internet), the cellular modem 203 includes circuitry and programming to encode an alert message generated by the controller 201, encapsulate the encoded message into one or more packets, and perform the signal processing required to adhere to the data transmission scheme(s) recognized and used by the cellular network 110 for data uplink (from SMT 105 to cellular network) and data downlink (from cellular network to SMT 105). For example, in an LTE-M enabled cellular network, the cellular modem preferably is capable of packetizing data in accordance with TCP/IP or UDP protocol, and includes hardware that transmits packet data according to a Single-Carrier Frequency Division Multiple Access (SC-FDMA), 15 KHz tone spacing, Turbo Code, 16 Quadrature Amplitude Modulation (QAM) modulation scheme, and receives data based on Orthogonal Frequency Division Multiple Access (OFDMA), 15 KHz tone spacing, Turbo Code, 16 QAM modulation scheme. Other types of cellular networks use different modulation schemes implemented in accordance with the standards promulgated by worldwide organizations such as 3$^{rd}$ Generation Partnership Project (3GPP), Institute of Electrical and Electronics Engineers (IEEE), and Global System for Mobile Communications (GSMA), and may alternatively be used as the gateway connection to a packet-switched data network (such as the Internet) for subsequent transmission of alert messages to the Notification Service 107.

As described previously, due to the design parameters for the SMT 105 having a stand-alone power supply 207, the SMT 105 is preferably implemented using ultra-low-power components. By way of example and not limitation, in an embodiment, the controller 201 comprises an ultra-low-power microcontroller unit (MCU) with integrated flash memory and an integrated EEPROM such as an STMicroeletronics STM8L151C8 IC, which consumes 200 uA in normal operating mode and less than 6 uA when placed in a low power mode.

Further, in an embodiment and by way of example and not limitation, the cellular modem 203 is implemented using a Quectel LPWA Module BG96, manufactured by Quectel Wireless Solutions Co., Ltd., headquartered in Shanghai, China. The Quectel BG96 Cat.M1/NB1 & EGPRS Module can transmit according to CAT-M1 or CAT-NB1 (NB IoT) protocols over existing LTE/Extended GPRS (EGPRS) networks, consuming only 10 uA in PSM mode and 190 mA when transmitting at 23 dBm. The Quectel BG96 is programmed to use CAT-M1 protocol when connecting to an LTE-M cellular network, and is programmed to use CAT-NB1 protocol when connecting to an NB-IoT enabled cellular network.

Further in an embodiment and by way of example and not limitation, the movement detection sensor 206 is preferably an ultra-low-power device such as Micro-Electro-Mechanical Systems (MEMS) accelerometer or MEMS microphone that is implemented using microfabricated miniaturized electro-mechanical elements (on the order of micro, femto and nano-meters) and which by design consume very low power. In an embodiment, the movement detection device 206 is implemented using a STMicroelectronics LIS2DE12, which is a 3-axis MEMS accelerometer characterized by ultra-low-power consumption down to 2 uA, and allows for programmable sensitivity. An accelerometer may be used as a movement detection device 206 by measuring the acceleration of multiple moving micro-parts, such as a diaphragm or other anchored movable micro-objects. The LIS2DE12 MEMS accelerometer is fabricated using micromachined silicon structures that are anchored at a few points and are free to move in the direction of acceleration. Sensing element(s) within the LIS2DE12 sense displacement of the silicon structures from their nominal positions resulting in a change in capacitance thereof and can be measured using charge integration in response to a voltage pulse applied to the capacitor structure. When an acceleration is applied to the sensor, the silicon structures displace from their nominal positions, which can be measured using a capacitive half-bridge. The change in capacitance is measured using charge integration in response to a voltage pulse applied to the capacitor. At steady state the nominal value of each of the capacitors is a few pF and when an acceleration is applied, the maximum variation of the capacitive load is in the fF range. The LIS2DE12 MEMs accelerometer can be programmed to generate an interrupt upon detection of different levels of acceleration (measured in g's). The LIS2DE12 provides full scales of ±2 g/±4 g/±8 g/±16 g and is capable of measuring accelerations with output data rates from 1 Hz to 5.3 kHz.

The movement detection device 206 may alternatively be implemented using a GPS module, described previously.

In an embodiment, the trap door state detection sensor 206b is a reed switch and is implemented using a CT10-1030-G1 manufactured by Coto Technology, and is configured in a normally open configuration to prevent battery drain when the trap door is open.

Further to the requirements of a limited battery power supply, the SMT 200 preferably implements several power conservation techniques, including employing a controller 201 and a cellular modem 203 that can each be placed in a Power Saving Mode (PSM) state, whereby features of the controller 201 and cellular modem 203 which draw higher power are shut down and/or placed in a sleep mode when the respective devices are placed in the PSM state. For example, the cellular modem 203 turns off power to the antenna 204 when in the PSM state. The selection of the cellular modem 203 must of course consider the network over which alert messages are to be transmitted to ensure that the cellular modem 203 is capable of transmitting according to the protocol required by the selected network. To conserve battery power, in a preferred embodiment the SMT 200 is implemented to communicate using a low-power signal over a LPWAN such as an LTE-CATM1, NB-IoT, or EC-GSM-IoT network, which specifies a transmission signal strength of 23 dBm.

The controller 201 may include several integrated devices; alternatively, peripheral devices can be connected to controller 201. For example, the controller 201 may have a clock (not shown) that is either integrated into the controller 201 itself or that is connected to controller via external pins. The clock may be used to send wakeup commands to controller when in PSM mode. In an embodiment, the SMT 105 may be wakened from PSM mode if a predefined amount of time passes between times connecting to the subscriber network 10 (this activity is called the "heartbeat" of the SMT). The wakeup commands can cause controller exit a power saving or sleep mode to perform periodic diagnostics or perform other functions. In an embodiment, the SMT 200 may be wakened from PSM mode if a predefined amount of time passes between times connecting to the subscriber network 10 (this activity is called the "heartbeat" of the SMT 200).

In a preferred embodiment, SMT 200 includes a battery supply 207 such as lithium iron disulfide or alkaline for non-rechargeable batteries, or nickel metal hydride or lithium polymer batteries for rechargeable batteries. In an embodiment, the SMT 200 may include an external charging system (not shown) to recharge the battery supply 207, such as an external power supply, a renewable energy source such as a solar cell, etc.

Figure 6:
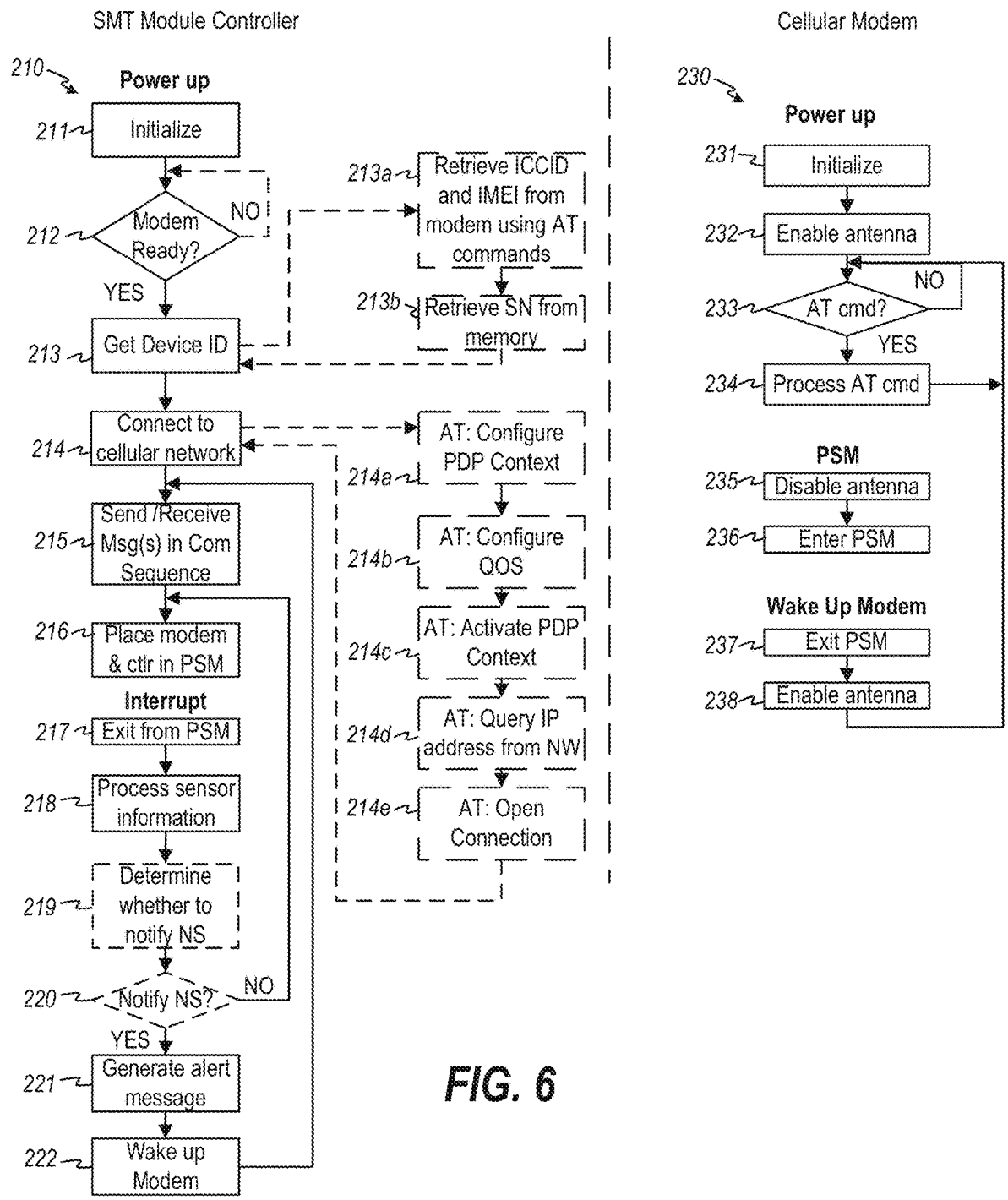
FIG. 6 is a flowchart illustrating an exemplary operation of the SMT.

FIG. 6 is a flowchart illustrating an exemplary operation 210 of the SMT 105. As shown, in operation, when the SMT 105 is powered on, for example by turning on a power switch 208, the controller 201 and cellular modem 203 both perform an initialization (steps 211 and 231). Once the controller 201 is initialized, it waits for the modem to be ready (step 212). In an embodiment, the controller 201 monitors the Ready status (typically the output state of a pin on the cellular modem chip) of the cellular modem 203. At first power up of the cellular modem 203, the cellular modem 203 performs an initialization (step 231), and enables the antenna 204 for signal transmission and/or reception (step 232). In an embodiment, once initialized, the modem is "ready", and signals this status by enabling the Ready pin on the modem. Once the cellular modem 203 is ready to transmit and/or receive, the controller 203 obtains the device identifier (step 213). In an embodiment, the device identifier comprises the serial number of the SMT 105. In alternate embodiments, the device ID may comprise alternative and/or additional identification information, such as but not limited to the ICCID, and the IMEI of the SMT 105 (or components thereof). In an embodiment, the ICCID is integrated into the SIM 205, and the controller 203 instructs the cellular modem 203 to access the SIM 205 to obtain the ICCID of the SIM 205 (step 213a). In an embodiment, the IMEI is programmed into an Electrically-Erasable Programmable Read-Only Memory (EEPROM) embedded in the cellular modem 203, and the controller 203 issues a command to the cellular modem 203 to obtain it (step 213a). In an embodiment, the manufacturer of the SMT 200 issues a unique serial number for each SMT at the time of manufacture, and stores it in a Programmable Read-Only Memory (PROM) or other memory 202, accessible and accessed by the controller 201 (step 213b).

Once the device ID is obtained, the controller 201 then instructs the cellular modem 203 to connect to the subscriber cellular network 110 (FIG. 3) (step 214). The cellular modem 203 is programmed to recognize various AT commands, which are commands to control communication using the modem 203. In an embodiment, the cellular modem 203 is configured with an embedded TCP/IP protocol stack, and the AT commands are translated into messages/responses, encapsulated into TCP/IP packets and transported over the cellular network 110 according to TCP/IP protocol. In an embodiment, the controller 201 instructs the cellular modem 203 to connect to the subscriber cellular network 110 by (1) configuring a Packet Data Protocol (PDP) Context with the network Access Point Name (APN), the subscriber name, password and authorization type (step 214a), (2) configuring the Quality of Service (QoS) settings (step 214b), (3) activating the PDP Context (step 214c), (4) querying the network for the IP address of the PDP context (step 214d), and (5) opening the connection (step 214e). Once the connection is open, the SMT 5 is able to send and/or receive requests, commands, responses and data (step 215) to/from the Notification Service 107. In an embodiment, the send/receive step 215 may include sending device status, alerts relating to received sensor information, location information, and communication acknowledgements to the Notification Service 107, and receiving communication acknowledgements, messages, or settings or firmware updates from the Notification Service 107.

In order to conserve power, the controller 201 is programmed to execute sequences of communication handshakes that comprise a series of requests (which may contain commands) and corresponding responses and/or acknowledgements for accomplishing sending messages to the cellular network service (such as a connect request to access the cellular network), sending messages to the Notification Service 107 (such as sending a sound detection alert message), and receiving one or more messages or data (such as handshake and application acknowledgements, device settings and updates, and firmware updates). These sequences are programmed into the program memory 202 used to instruct the actions of the controller. FIGS. 14-19 illustrate several example communication sequences, discussed hereinafter. The programming of the controller 201 according to predefined communication sequences enables a power saving mode technique, namely providing a way for the controller 201 to recognize that a communication sequence is complete, the completion of which is used by the controller 201 as a trigger to place the cellular modem 203 and itself into a Power Saving Mode (PSM) (step 216). In PSM, each of the controller 201 and cellular modem 203 turn off, or place in a low-power state, the features of their respective device that require higher power for operation. For example, the cellular modem 203 may disable the power to the antenna 204 (step 235) and then enter PSM (step 236) so that battery supply power is not consumed powering the antenna during periods when the controller 201 knows, by way of the programmed communication sequences, that it is not sending a message to, or expecting a message from, the network or notification service. For example, once the controller 201 completes a communication sequence (step 215) and instructs the cellular modem 203 and itself to enter PSM (step 216), it enters a very low power mode while awaiting an interrupt from any of the sensor(s) 206.

When an alert condition is sensed by any of the sensor(s) 206a, 206b, that sensor 206a, 206b generates a signal on its output port, which is coupled to an interrupt port on the controller 201, to interrupt the controller 201. When the controller 201 receives an interrupt, it exits from PSM (step 217) and processes information from the sensor(s) that generated the interrupt (step 218). In an embodiment, the controller 201 sends an alert message each time the controller is interrupted by a sensor, moving directly to step 221. In this embodiment, steps 219 and 220 are not implemented. In an alternative embodiment, the controller may first determine whether or not to send an alert message to the Notification Service (step 219). An example reason that the controller 201 may determine not to send an alert message may be that the SMT 105 has been placed in "Pause" mode, which is discussed in more detail hereinafter. If the controller 201 determines that it should not send an alert message (step 220), after processing the sensor information, the controller returns to PSM (step 216). Whether sending an alert message by default (i.e., not implementing steps 219 and 220) or by determination through additional processing (i.e., implementing steps 219 and 220), the controller 201 generates an alert message (step 221) and wakes up the cellular modem 203 (step 222). The controller 201 then executes a communication sequence appropriate to the particular message to be sent (step 215), executing a series of AT commands in cooperation with the cellular modem, in order to notify the Notification Service of the alert event. At the end of the communication sequence, the controller 201 then causes the SMT 200 and cellular modem to enter PSM once again (step 216).

When instructed to exit from PSM, the cellular modem 203 exits PSM (step 237) and enables its antenna (step 238). The cellular modem 203 then awaits AT commands from the controller 201 (step 233) and processes AT commands (step 234) in normal operating mode. During a Command Sequence (or at other times), the cellular modem may also receive commands, status and data from the notification service, which it passes to the SMT controller 201 for processing.

Returning to FIG. 4, in a preferred embodiment, the cellular network 110 is a Low Power Wide Area Network (LPWAN) transmission module that supports low-complexity, deep-coverage devices. By way of example and not limitation, exemplary LPWANs include LTE-M (including CAT-M1), NB-IOT and EC-GSM-IOT cellular networks. In an embodiment, the cellular network 110 is an LTE-M cellular network implemented in accordance with the Third Generation Partnership Project (3GPP) standards-based LPWAN technology, LTE-M (also known as LTE CAT-M1), which has a maximum channel bandwidth of 1.4 MHz, a maximum data rate of 1 Mbit/s, and operates in either full or half duplex mode (i.e., can transmit and receive simultaneously in full duplex mode, or can only transmit or receive at any given time in half duplex mode). In an alternative embodiment, the low power wide area network (LPWAN) could be implemented according to the Third Generation Partnership Project (3GPP) standards-based LPWAN technology, NB-IoT (also known as CAT-NB1 or CAT-M2), which has a maximum channel bandwidth of 180 kHz, a maximum data rate of 250 Kbit/s, and operates only in a half duplex mode. In another alternative implementation, the cellular network could be implemented according to the Global System for Mobile Communications Association (GSMA) standards-based LPWAN technology known as Extended Coverage Global System for Mobile (EC-GSM), (also called EC-GSM-IOT), which also operates in the licensed spectrum (on the 900 MHz and 1.8 GHz frequency bands) and implements EC-GSM protocols utilizing the existing GSM networks and GSM cellular to Internet infrastructure.

Some of the specification for each of the LTE CAT-M1, CAT-NB1 and EC-GSM-IoT standards are given in TABLE 1, illustrating that each type of network requires different hardware (to transmit on different frequencies, with different bandwidth, data rates and modulation schemes, and to achieve perform different variations of duplexing and power saving modes). The particular type of cellular network that may be used for transmission of an alert message between a given SMT 5 and the Notification Service 7 may depend on various factors, including availability of a given type of cellular network in the geographical region where the SMT is installed, whether the SMT is authorized to access an available cellular network, how much data and how quickly such data needs to be transmitted to the Notification Service, etc.

TABLE 1

|  | CAT-M1 | NBIoT | EC-GSM-IoT |
|---|---|---|---|
| Deployment | LTE | LTE | GSM |
| Coverage | 155.7 dB | 164 dB | 164 db, with 33 dBm power class, 154 dB with 23 dBm power class |
| Downlink | OFDMA, 15 KHz tone spacing Turbo Code 16 QAM 1Rx | OFDMA 15 KHz tone spacing 1Rx | TDMA/FDMA, GMSK and 8PSK, 1Rx |
| Uplink | SC-FDMA 15 KHz tone spacing Turbo code, 16QAM | SCFDMA 15 KHz tone spacing Turbo code | TDMA/FDMA, GMSK and 8PSK (optional) |
| Bandwidth | 1.08 MHz | 180 KHz | 200 kHz per channel, typical system bandwidth of 2.4 MHz |
| Peak rate (DL/UL) | DL and UL: 1 Mbps | DL: 50 kbps UL: 50 Kbps for multi-tone, 20 Kpbs for single tone | DL and UL: 70 kbps (GMSK) using 4 timeslots |
| Duplexing | FD & HD (type B), FDD & TDD | HD (type B), FDD | HD, FDD |
| Power saving | PSM, ext. I-DRX, [082] C-DRX | PSM, ext I-DRX, [083] C-DRX | PSM, ext. I-DRX |
| Power class | 23 dBm 20 dBm | 23 dBm | 33 dBm 23 dBm |

It is to be noted that commercial networks implemented in accordance with any of the LTE CAT-M1, CAT-NB1 and EC-GSM-IoT standards operate in the licensed spectrum of the radio-frequency spectrum (meaning that the frequency bands on which they operate are regulated by governmental regulatory bodies). Operation within the licensed spectrum requires operators to obtain a license or permit from a regulatory authority and to adhere to a set of technical, operational and behavioral rules, having the effect of potentially offering a higher quality of service (QOS) for delivery of communications between the SMT 5 and the notification service 7 than may otherwise be obtained using networks operating in the unlicensed spectrum. It may therefore be advantageous to use such an available cellular network to communicate SMT alert messages from the SMT 5 to the Notification Service 7. However, it is to be understood that in other embodiments, it may be suitable or advantageous to use a LPWA network operating in an unlicensed frequency band of the radiofrequency spectrum. Examples of such networks may include, but are not limited to, LoRa, SigFox, etc. Furthermore, while a preferred embodiment of the SMT is battery powered and therefore to conserve power connects to the Notification Service via a LPWAN, in alternative embodiments where power consumption is not at issue for the SMT, the SMT may be implemented using a transmission module that allows it to transmit its alert messages via any wireless or wired network (including, but not limited to, LPWANs, LANs, WANs, WiFi Access Points, etc.) using an appropriate corresponding transmission protocol. For example, if the SMT is not positioned in a remote location and has access to a Wi-Fi Access Point, the SMT could be configured to include a WiFi transmission module and to send its alert messages to the Notification Service by connecting to the Internet via a local WiFi Access Point. Similarly, if WiFi is not available but a cellular service (that is not an LPWAN) is available, the SMT 5 could include transmission module that can communicate with the available cellular service (which may not be an LPWAN) and could then transmit its alert messages via that cellular service.

In a preferred embodiment shown in FIG. 4, the LPWAN implements the 3GPP LTE-M (CAT-M1) specification and protocol, which support devices characterized by low power transmission (max transmit power of 23 dBm), provides a low maximum system bandwidth (1.4 MHz), and allows a relatively low maximum peak data rate (1 Mbps). In this embodiment, the SMT 105 is configured to transmit alert messages over a radio access network (RAN) 118 that supports low power wide area network technologies. In the embodiment shown in FIG. 4, the radio access network 118 is a cellular LTE-M network operating in the licensed (i.e., regulated) spectrum. The LTE-M network operates over the same (or subset thereof) frequency bands as LTE) and implements 3GPP LTE-M specifications and protocols utilizing the existing LTE cellular infrastructure. The RAN 118 in the LTE cellular network includes what is referred to as the Evolved Universal Mobile Telecommunications System (E-UMTS) Terrestrial Radio Access Network (E-UTRAN), and a core all-IP network 119 referred to as the Evolved Packet Core (EPC). The E-UTRAN includes a network of cellular sites 111 (shown as 111a, 111b) providing areas of network coverage arranged in geographical "cells" across areas of Earth. Each cellular site includes at least one antenna mounted on a cell tower, which is designed to transmit and/or receive signals on a designated LTE-M frequency band. Within a given cell, transmitted signals adhere to minimum signal strength specifications so as to cover at least the entire area of the geographical cell. In practice, each cellular tower has multiple antennas sending and receiving over multiple LTE/LTE-M frequency bands, and each antenna is tuned to receive and/or transmit signals on various frequencies and in different directions. Each antenna is connected by wire or fiber optic cable to a base station (which in the LTE/LTE-M RAN is referred to as an Evolved Node B, eNodeB, or eNB). The base station, or eNB, is the primary interface for connecting subscribing user equipment devices (UEs) to other devices and services serviced by the particular LTE/LTE-M network service provider (often called the "carrier", such as commercial providers Verizon, AT&T, etc.). The base station is also the primary interface for connecting subscribing devices via networks of other providers (such as routing calls to UEs who subscribe to a different carrier than the sending UE, and to devices, machines and services on other networks (such as other RANs, packet switched and packet data networks). The eNB manages the radio interface between user equipment (UE) devices (such as mobile and/or remote LTE and LTE-M enabled devices) and the core network (referred to as the Evolved Packet Core (EPC)) which connects and routes messages between remote UEs subscribing to the LTE/LTE-M cellular network and UEs and other devices on networks of other carriers or packet data networks such as the Internet.

Referring again to FIG. 4, the radio access network (RAN) 118 provides connection between LTE-enabled devices and the core network 119. The core network 119, or EPC, is an all-IP (Internet Protocol) network that manages the interconnection of calls and data flow between devices connected to the RAN 118, to one another and to other networks 130 and/or packet data networks (PDNs) 120 and resources connected to the core network 119. The core network 119 forms the central control of the cellular network 110. Among other functions, the core network 119 manages authentication of user equipment (UE) (such as SMT 105 and other UE such as cellular enabled mobile devices) requesting access to the cellular network 110, voice/data call and message control/switching/routing, allocating resources to meet subscriber quality of service levels, and setting up data traffic tunnels (known as bearers) between authenticated UEs to packet data network (PDN) gateways 115 for transfer of user traffic between the UEs and PDNs (such as the Internet 120).

In the LTE-M network, the core network (EPC) 119 includes a Mobility Management Entity (MME) 112, a Home Subscriber Server (HSS) 113, a Serving Gateway (S-GW) 114, a Packet Data Network Gateway (P-GW) 115. The MME 112 operates as the main control entity for the LTE radio access network (E-UTRAN) (which, in an LTE/LTE-M network, implements the RAN 118). The MME 112, with the assistance of a UE-connecting eNB 111, and a Home Subscriber Server (HSS) 113 that hosts network subscriber information, manages authentication of devices requesting access to the network 110. The MME 112 also manages control plane (Non-Access Stratum (NAS)) signaling, including mobility management, session management, and setup of tunnels, or "bearers" that carry user plane traffic. The MME 112 communicates with eNBs 111a, 111b, (and others not shown) in the radio access network 118 via the LTE S1-MME interface, while eNBs communicate with UEs via the LTE-Uu interface. When a UE requests access to the network, the eNB with greatest signal strength (usually the eNB nearest the requesting UE), along with both the UE and the MME serving the eNB, coordinate with each other to perform mutual authentication. In LTE networks, both LTE-enabled UEs and the LTE network follow well-known pre-defined LTE authentication protocols to ensure, from the UE's point of view, that the UE is accessing the network it thinks it is accessing and, from the network's point of view, that the UE has authorization to access the network and is who the UE says it is. The communication interfaces and protocols for LTE-M, including among others the LTE-UU, LTE-S1, LTE-S5 and SGi interfaces, are specified and published by 3GPP, available at www.3gpp.org.

When trap 102 (and more specifically, its SMT 105) is authenticated, the MME 112 sets up an IP connection (or "session") between the SMT 105 and a particular Packet Data Network (PDN) through which the Notification Service 107 is accessible. Profile information associated with the authenticated trap 102/SMT 105 is accessible through the Home Subscriber Server 113 (and/or a Profile Repository (not shown)), which stores default PDN IP address associated with the trap 102/SMT 105. The trap 102/SMT 105 can also specify a specific IP address during the access request. The MME 112 determines the IP address of the PDN of the trap 102/SMT 105 requesting connection, using the default IP address from the trap 102/SMT 105 profile information or from trap 102/SMT 105 request information. The trap 102/SMT 105 can have either a static IP address or may be dynamically assigned an IP address using standard Dynamic Host Configuration Protocol (DHCP) or other dynamic IP address allocation protocols. The session identifies the connection endpoint IP addresses, namely the IP address of the trap 102/SMT 105 and the IP address of the PDN (also called the Access Point Name (APN)) through which the trap 102/SMT 105 wishes to connect (presumably to use services).

Figure 7:
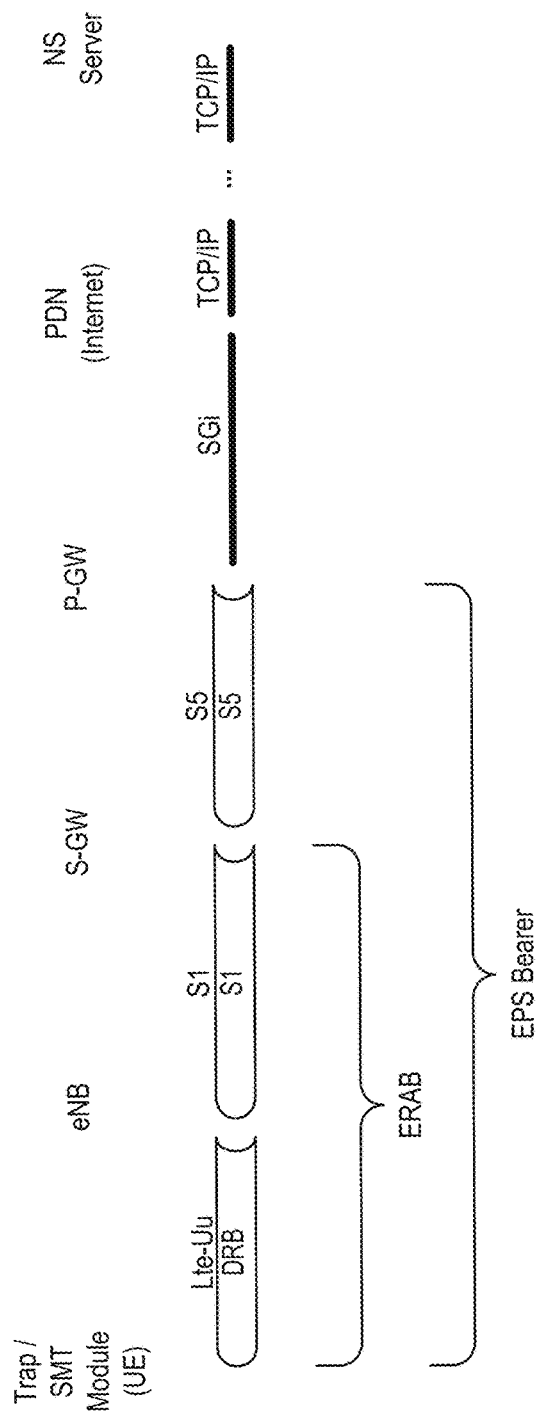
FIG. 7 is a diagram illustrating the bearers set up for a Long Term Evolution (LTE) cellular network connection.

In conjunction with setting up the session, the MME 112 also sets up a default Evolved Packet System (EPS) bearer, which is a tunnel through which IP packets are transferred through the LTE network 110 between the trap 102/SMT 105 and a PDN gateway (P-GW) that serves the destination PDN. With reference to FIG. 7, the default EPS bearer requires setting up of three different bearers due to the different communication interfaces between equipment located between the trap 102/SMT 105 (UE) and P-GW (including the eNB, the S-GW and the P-GW). In the UE-to-P-GW direction, data flows from the UE to an eNB 111 via a data radio bearer (DRB) using the LTE-Uu interface, then from the eNB to the S-GW via the S1 interface, then from the serving gateway (S-GW) to the PDN Gateway (P-GW) using the LTE S5 interface. Accordingly three different bearers are set up to accommodate the different interfaces, which include a DRB (i.e., data tunnel) to deliver user data traffic between the UE and eNB using the LTE-Uu interface, an S1 bearer to deliver user data traffic between the eNB and S-GW, and an S5 bearer to deliver user data traffic between the S-GW and P-GW. The MME coordinates with the eNB, the S-GW and P-GW to set up these bearers.

FIG. 4 details a small few cellular sites (eNBs) 111a, . . . , 111b, a single MME 112, S-GW 114 and P-GW 115, for the purposes of simplicity of illustration and explanation and not by way of limitation. It is to be understood that in practice, commercial LTE/LTE-M networks comprise many cellular sites 111, which may connect to several different MMEs, which are each connected to several S-GWs and P-GWs, serving different geographical locations of the overall cellular network. In an embodiment, the cellular network service provider through which SMTs gain access to the cellular network for subsequent transmission and receipt of messages over the Internet to and from the Notification Service is a $3^{rd}$-party commercial cellular network service provider that supports LTE-M, such as, by way of example only and not limitation, Verizon or AT&T.

LTE/LTE-M networks are all-IP networks, meaning that all user traffic is delivered by way of Internet Protocol (IP) packets. When an LTE-enabled UE, such as trap 102/SMT 105 connects to the network, it is assigned an IP address, a session is set up, and data traffic bearers are set up between the UE device and a PDN gateway P-GW. The IP address assigned to the trap 102/SMT 105 remains valid and the bearers remain connected until the device is detached from the network. That is, the session remains valid until the trap 102/SMT 105 is detached from the network. In the network system of FIG. 4, since the LTE-M network is an all-IP network, the SMT 105 uses the IP protocol for sending alert messages to the notification system 123. In particular, the SMT 105 encodes an alert message (called the message payload) and formulates it into at least one IP packet containing an IP header and the message payload.

Figure 8A:
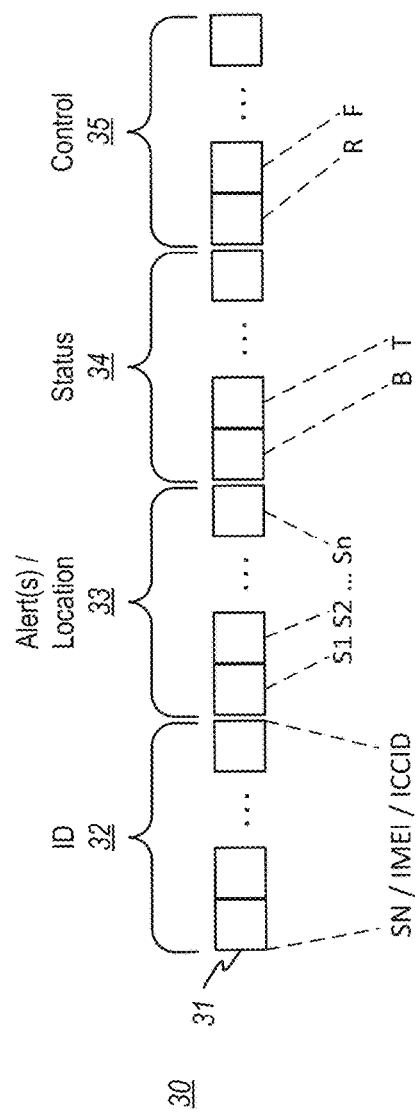
FIG. 8A illustrates an example format of a message payload.

FIG. 8A illustrates an example format of a message payload for purposes of illustration and not limitation. As illustrated, the message payload comprises one or more bytes 30 of bits 31. Groupings of the bits 31 correspond to encoded information. For example, one group 32 of bits 31 corresponds to encoded SMT identification (ID) information that uniquely identifies the SMT 105 to the Notification Service 123. In an embodiment, the ID group 32 comprises the serial number (SN) or an encoded version of the serial number of the SMT 105 or trap 102. It may further include or alternatively include additional device information such as the International Mobile Equipment Identifier (IMEI) and/or the Integrated Circuit Card Identifier (ICCID) of the SIM card or hardware embedded in the SMT 105.

Another group 33 of bits 31 corresponds to encoded alert information, which comprises a plurality of bits having values that may be encoded to represent one or more event(s) corresponding to one or more respective monitored event occurrences at the SMT 105 (or trap 102). For example, by way of illustration and not limitation, the Alert group 33 may include a bit S1 corresponding to a first sensor monitoring the occurrence of a first event, a second bit S2 corresponding to a second sensor monitoring the occurrence of a second event, and so on, monitoring up to n events. As a non-limiting example, the alert group 33 may comprise one or more individual bits corresponding to detected events including, without limitation: a Trap Door Closed event, a Trap Movement event, and a Low Battery event. The alert group 33 may comprise different and/or additional bits to represent various other detected events and/or change in states(s) of additional monitored conditions. In a more further detailed example, and with reference to FIG. 8A, bit S1 may represent the state of the occurrence of a "Trap Door Closed" event, which when true (for example, set to a predefined value such as "1"), indicates that the movable trapping member 3f of the monitored trap 102 has changed to the closed state. Further in the more detailed example, the bit S2 may represent the state of the occurrence of a "Trap Movement" event detected at the trap 102/SMT 105. Other bits may represent the occurrence of other events monitored by additional sensors. Furthermore, the Alert group 33 may include dedicated bits corresponding to location information related to the movement, such as but not limited to current GPS coordinates, most recent prior GPS coordinates, GPS coordinates of initial location of the trap 102, etc.

In the message payload 30, another group 34 of bits 31 corresponds to encoded status information. For example, a bit B may represent the state of a battery low condition, while a bit T may represent an alert trigger state indicating whether or not an alert condition was detected by one or more sensors. Further in the message payload 30, a group 35 of bits 31 may correspond to encoded control information. In the illustrative embodiment, control bits may be used to hold the connection open between the SMT 300 and the Notification Service 123 in order to perform certain maintenance actions or actions that require 2-way cooperation with and/or acknowledgement between the SMT 300 and Notification Service 123. For example, again by way of illustration and not limitation, the Control group 34 may comprise a bit R which indicates to the Notification Service that the SMT 300 has been reset. The Control group 34 may further comprise a bit F indicating that the device has been formatted or updated with new firmware.

Figure 8B:
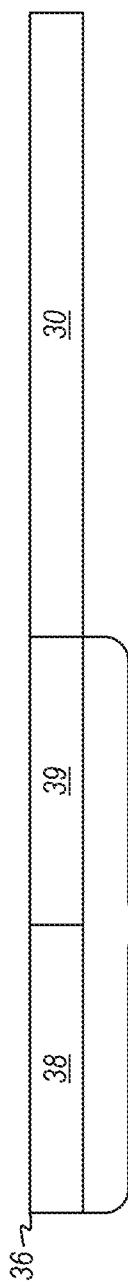
FIG. 8B illustrates the format of an IP packet transmitted from the SMT to the nearest cellular site.
Figure 8C:
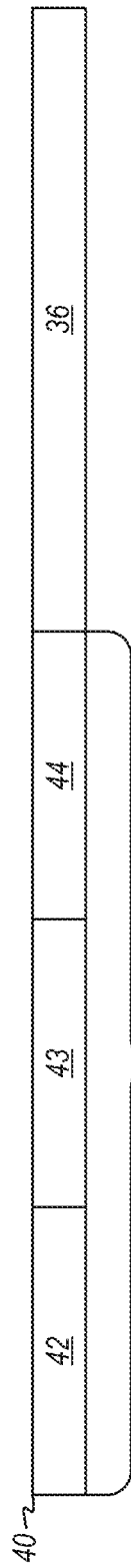
FIG. 8C illustrates the format of an S1 GTP IP packet.
Figure 8D:
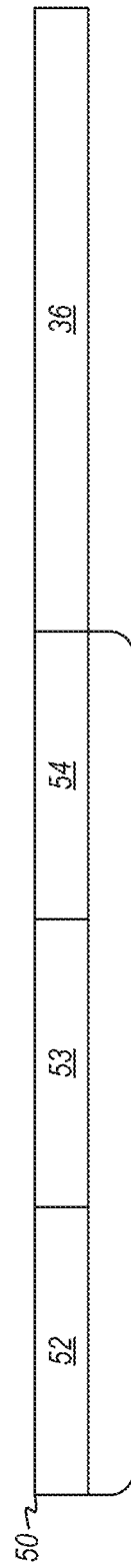
FIG. 8D illustrates the format of an S5 GTP packet.
Figure 8E:
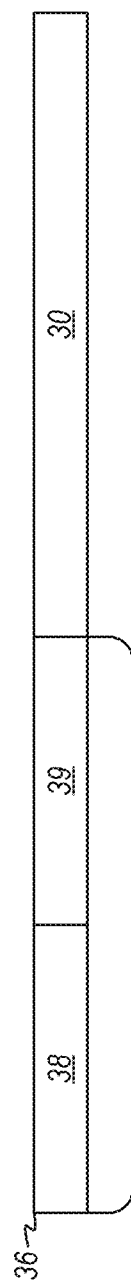
FIG. 8E illustrates an extracted IP packet.

FIG. 8B illustrates the format of an IP packet 36 transmitted from the SMT 105 of a trap 102 to the nearest eNB 111. As illustrated in FIG. 8B, the IP packet 36 includes an IP header 37 and the message payload 30. the IP header 37 includes a destination IP address 38 and a source IP address 39, where the destination IP address 38 is the IP address of the Internet-enabled Remote Trap Monitoring Notification Service 123 and the source IP address 39 is the IP address of the SMT 105. Using the LTE-Uu interface, the cellular modem of the SMT 105 transmits each IP packet to the nearest eNB 111*a* via the DRB bearer set up for that particular SMT 105. With reference to FIG. 8C, the receiving eNB 111*a* receives each IP packet 36 and encapsulates each received IP packet with an S1 interface General Packet Radio System (GPRS) Tunneling Protocol (S1 GTP) header 41 to formulate an S1 GTP IP packet 40. The S1 GTP header 41 includes at least the destination IP address 42 of the destination Serving Gateway (S-GW) 114, the source IP address 43 as the IP address of the sending eNB, and an S1 Tunnel Endpoint Identifier (S1 TEID)) 44. The eNB then transfers the S1 GTP IP packet(s) 40 to a Serving Gateway (S-GW) via the S1 bearer via the S1 interface. With reference to FIG. 8D, the destination Serving Gateway (S-GW) 114 strips the S1 GTP header 41 from each S1 GTP IP packet 40 and encapsulates the stripped IP packet 36 into an S5 GTP IP packet 50, including an S5 interface GTP (S5 GTP) header 51. The S5 GTP header 51 includes at least the destination IP address 52 of the destination Packet Data Network Gateway (P-GW) 115, the source IP address 53 as the IP address of the S-GW 114, and an S5 Tunnel Endpoint Identifier (S5 TEID)) 55. The S-GW 114 then transfers the S5 GTP IP packet(s) 50 to the appropriate PDN Gateway (P-GW) 115 via the S5 bearer. The receiving P-GW 115 strips the S5 GTP header 51 from each packet 50 to extract the encapsulated IP packet 36 (FIG. 8E) and transfers the packet(s) onto the Internet 120 PDN via an SGi interface. Once the IP packet is on the Internet, it is routed to the destination IP address 38 of the Remote Trap Monitoring Notification Service 123 through conventional IP and/or Ethernet routing using TCP/IP and DHCP.

Referring again to FIG. 4, the Remote Trap Monitoring Notification Service 123 is connected to the Internet 120 and is responsive to requests addressed to its IP address (and appropriate port(s) and API calls) via the Internet 120, and further can transmit responses to requests and may send out its own requests to other devices at IP addresses on, or reachable via, the Internet 120 (and potentially additionally through a cellular network 110 to mobile cellular devices). The Notification Service 123 is an application executing on a computer system that is accessible via a Notification Service Server 122 via a web server 121 connected to the Internet 120. The computer system may be the same computer system executing the Notification Service Server 122 or may be a separate computer system. In either case, the computer system may comprise at least one central processing unit executing Notification Service program instructions stored in local or remote computer-readable memory. The Notification Service 123 may be a web-enabled service. In particular, the web-enabled service may be an instance of a Notification Service application executing in the Cloud, such as an E2C instance running on an Amazon Web Services (AWS) cloud web hosting platform.

Figure 9:
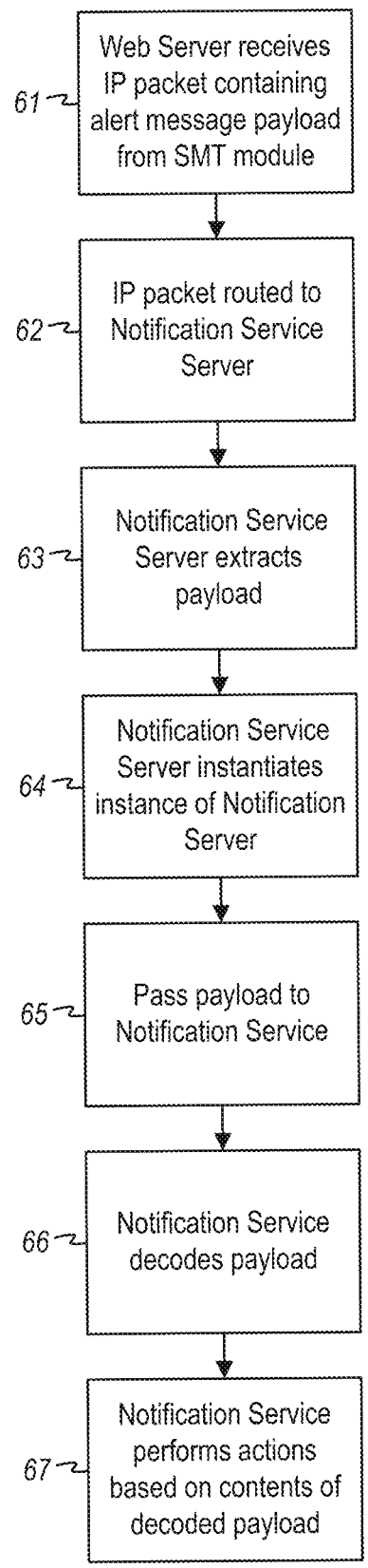
FIG. 9 is a flow diagram illustrating operation of an exemplary embodiment of a notification service.

FIG. 9 is a flow diagram illustrating operation of an exemplary embodiment of the Remote Trap Monitoring Notification Service 123. As a preliminary step, a message in the form of an IP packet 76 containing the destination IP address of the Notification Service Server 122 and a payload having the alert message contained therein is transmitted from the SMT 105 over the LTE-M network 110 to a P-GW 115 and then over the Internet 120 to Web Server 121. The Web Server receives the IP packet (step 61), and then routes it to the Notification Service server 122 (step 62). The Notification Service server 122 extracts the payload of the received IP packet (step 63), and instantiates an instance of the Notification Service 123 (step 64), passing the payload 76 to the Notification Service 123 (step 65), via a Notification Service API. The Notification Service 123 decodes the message payload 70 (step 66) and performs one or more actions based on the contents of the payload (step 67). In particular, the Notification Service 123 performs a series of appropriate steps according to predefined programming instructions. The Notification Service 123 performs one side of at least some of the Communication Sequence(s) executed in cooperation with the SMT 105 controller 201 as described in connection with step 215 of FIG. 6. For example, it performs the Notification Service steps outlined in the Command Sequences, detailed hereinafter.

In an embodiment, the Notification Service 123 is software hosted on a computer system, such as a computer operated by a Cloud computing provider. Preferably, the Notification Service 123 provides an Application Programming Interface (API) by which client devices can access the Notification Service 123. In an embodiment, the hosting computer system instantiates an instance of the Notification Service 123 upon receipt of a proper API call to the Notification Service 123. In other words, when a web browser running on a remote device 109 or other software or another system generates a Uniform Resource Locator (URL) request containing the correct IP address of the hosting computer, along with the correct path to the directory containing the executable of the Notification Service 123, and the API call is formatted correctly and contains valid parameters, the Notification Service server automatically instantiates an instance of the Notification Service 123. In an embodiment, the Notification Service 123 is hosted on a computer that is accessible via the Internet. For example, the Notification Service 123 may be a cloud-based service that is hosted on an Internet-connected server such as an Amazon Web Services (AWS) server, available from Amazon, Inc. In an alternative embodiment, the Notification Service 123 may be a service that runs on a computer connected to an internal network of a closed network system.

Figure 10:
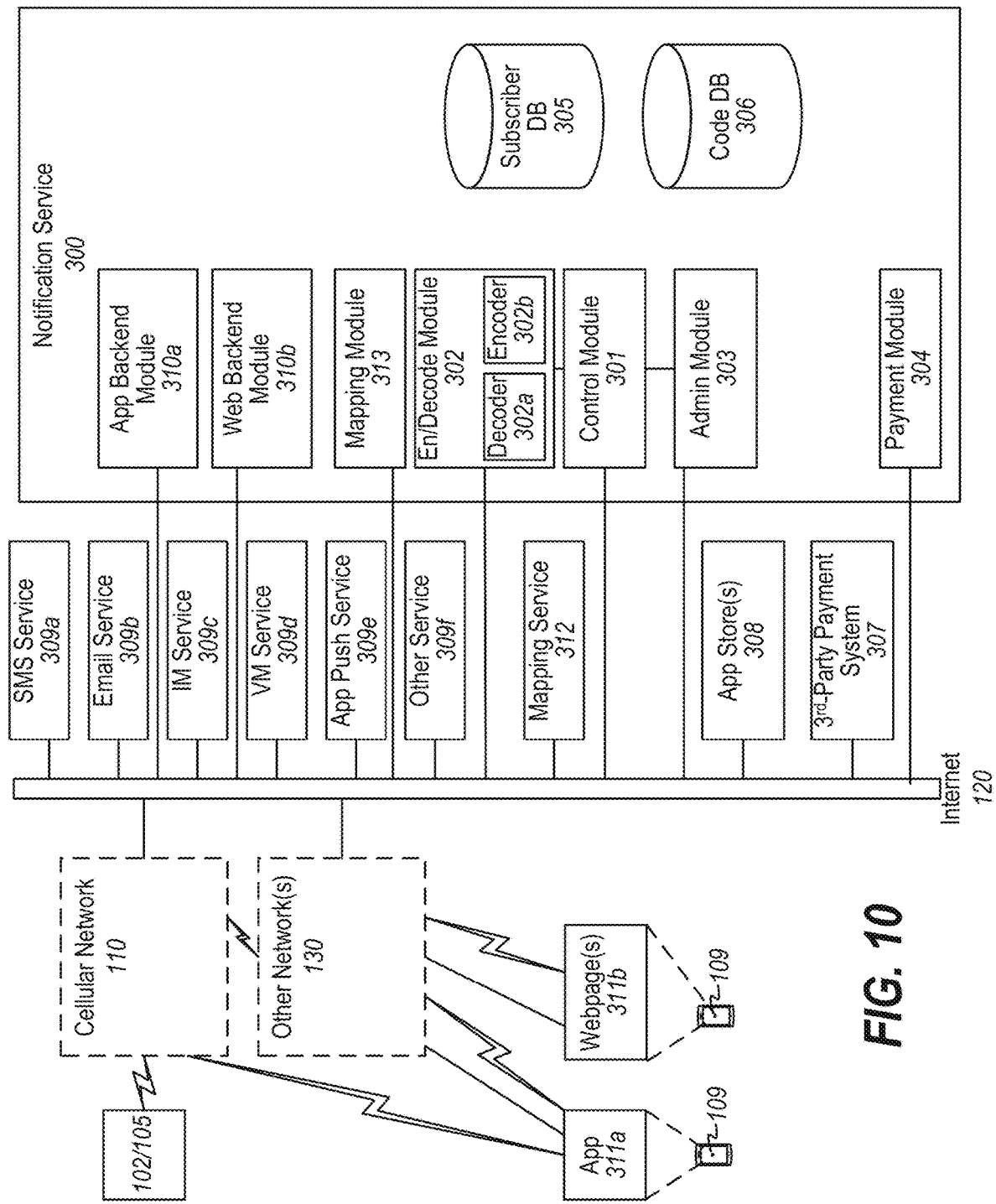
FIG. 10 is a network diagram of an exemplary embodiment of the architecture of a notification service.

FIG. 10 shows a more detailed diagram of the architecture of an embodiment 300 of Notification Service 123. As shown therein, the Notification Service 300 includes a central control module 301, an encode/decode module 302, an administrative (Admin) module 303, a payment module 304, an App Backend module 310, a Mapping Module 313, a subscriber database 305, and a code database 306. Each of the modules comprises computing resources and computer-readable storage memory. For example, each module may comprise a service or application or program comprising program instructions and executed by one or more processor(s) such as Central Processing Unit(s) (CPU), microprocessor(s), cloud computing resource(s) (such as an Amazon Web Service E2C instance(s)), etc. Each database 305 and 306 comprises computer-readable storage memory and may be implemented as a managed system (DBMS), local storage, Amazon Web Services S3 bucket(s), etc. The Notification Service 300 is connected to the Internet 120 through which it may communicate with one or more $3^{rd}$-party payment systems 307, App Store(s) 308, and services 309*a*-309*f* and 312.

The encode/decode module 302 (and specifically the decoder portion, or "decoder," 302*a* of the encode/decode module 302) decodes messages received from remote SMTs 105 that are routed to it from the trap 102/SMT 105 through the Internet 120 (for example, from the P-GW 115 of the cellular network 110). Decoded messages are passed from the encode/decode module 302 to the control module 301 whereby the control module 301 processes the decoded message in accordance with predefined instructions as set forth herein. In an embodiment, the decoder 302*a* decodes the message payload 30 to extract the device ID from the device ID field 32 of the message payload, which is used by the control module 301 to identify the SMT 105 that sent the message. Additionally, the decoder 302*a* may extract the contents of additional fields 33, 34, 35 from the message payload 30 to be used by the control module 301 to determine and execute the appropriate command sequence in connection with the message received from the SMT 105.

The encode/decode module 302 (and specifically the encode portion, or "encoder", 302*b* of the encode/decode module 302) also encodes messages and data to be sent from the Notification Service 300 to the trap 102/SMT 105. Specifically, the encoder 302*b* encodes into a packet payload information that is to be transmitted from the Notification Service to the SMT 105. The encoder 302*b* formats the packet payload in a format that is decodable by the trap 102/SMT 105, and then encapsulates the packet payload into one or more IP packets for routing to the SMT 105 via the Internet and cellular network 110.

The central control module 301 operates as the central controller for the notification service 300 and offers one or more Application Programming Interface(s) (APIs) to allow other modules, services and devices connected to the Internet to communicate with the Notification Service 300.

The Admin Module 303 may provide code management tools which allow an administrator to manage app and firmware versions, and deployment of app and/or firmware upgrades to electronic devices 109 and/or SMTs 105. In an embodiment, the Admin Module 303 may be configured to allow a vendor or manufacturer of a device that incorporates an SMT 105 to keep track of firmware versions of its respective devices in the field, and control deployment of firmware upgrades to such devices.

The code database 306 comprises computer-readable storage memory and stores one or more versions of firmware for the SMTs 105, one or more versions of apps for the App Store(s) 308, and other administrative data, program data, and information. For example, the code database 306 may include app code and various versions thereof of an app 311*a* that may be downloaded to an app store 308 and made available to subscribers to the Notification Service 300. For example, the notification service 300 may make available one or more apps such as an iOS app for Apple devices such as iPhones and iPads, and an Android app for Google Android devices. These apps may be made available through the Apple store or Google Play store. A subscriber may download an available app 311*a* from one of the stores 308 The apps may be downloaded and installed by an end user from one of the Apple store of the Google Play store to their end user electronic device. The app 311*a* communicates with the Notification Service 300 using conventional app technology such as made available through the electronic device operating system (such as iOS or Android).

The Admin Module 303 may also provide tools to allow an administrator to access profiles, account information and/or subscriber records of subscribers of the Notification Service 300. These tools may include graphical user interfaces, controls and/or methods for setting up subscriber accounts, creating subscriber records, and adding, activating, modifying, and/or removing subscriber profiles, subscriber accounts, and/or subscriber records. For example, the Admin Module 303 may include a Customer Support tool (not shown) that allows a customer service representative of the Notification Service to assist subscribers of the Notification Service, including allowing such customer service representative to add, remove, and/or modify information contained in a subscriber record 370 in the Subscriber database 305.

Figures 11, 12:
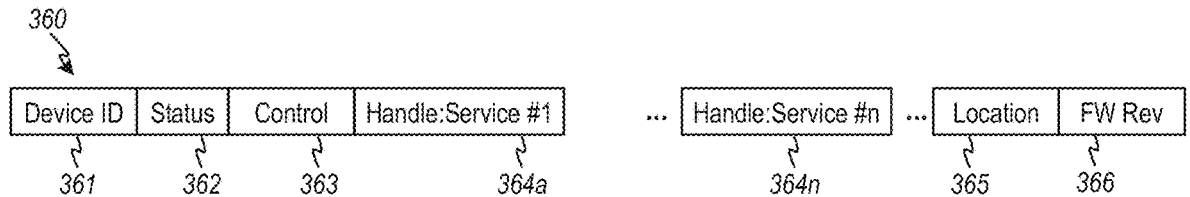
FIG. 11 is an operational flow diagram of exemplary steps performed by a notification service.
FIG. 12 is a format diagram of a record stored in a subscriber database.

FIG. 11 illustrates an example record 360 stored in the Subscriber Database 305. Each record 360 is associated with a registered SMT 105 and includes a plurality of fields 361, 362, . . . , 366 containing information about (1) the subscriber, (2) the respective SMT 105, and (3) notification service configuration(s). In an embodiment, each record 360 includes a field 361 containing a device identifier that uniquely identifies the registered device (i.e, the SMT 300 or trap 102). Each record 360 also includes field(s) 364*a*, . . . , 364*n*, that contain (either directly or indirectly using a pointer or indirect reference to) one or more notification recipient delivery service handles (username, phone number, user or device identifier, etc.) and corresponding delivery services (e.g., email, SMS text, in-app push notifications service) through which a message can be delivered to one or more person(s) corresponding to such handle(s). Each record 360 will also typically include additional fields, such as but not limited to status fields 362 indicating various status information about the SMT 105/trap 102, control fields 363 used to trigger certain remote maintenance and/or control configuration and behavior of the remote SMT 105. The record 360 may also include one or more location-related field(s) 365, which may include such location information as most recent GPS coordinates, user-identified location description (for example an ASCII text description of the location that reminds the user where the SMT 105 is located). The record 360 may further include one or more firmware version field(s) 366.

Generally at least one record 360 is stored for each SMT 105 that is monitored by the Remote Trap Monitoring Notification Service 300. A typical subscriber database 305 will store thousands or hundreds of thousands or more records, corresponding to unique SMTs 105 and/or devices associated with the SMTs 105.

FIG. 12 illustrates an example subscriber database record 370 with illustrative contents. As illustrated, the example subscriber database record 370 includes a plurality of fields 371, 372, . . . , 391. For example, subscriber database record may include an identifier field 317 indicating the identifier Unit_ID of the SMT 105 to which the record corresponds; an activation status indicator 372 indicating whether the SMT 105 is activated (i.e., subscribed to the Notification Service) (e.g., no=("0"), yes=("1")); a battery low status indicator 373 indicating whether the battery charge level is normal ("0") or low ("1"); a reset status indicator 374 indicating whether the SMT 105 has been reset (e.g., no= ("0"), yes=("1")); a trigger field 376 indicating whether one or more alert conditions have been sensed (e.g., no=("0"), yes=("1")); one or more sensor fields 377, 378, 379 indicating whether a corresponding sensor is installed and able to communicate with the SMT 105 (e.g., no=("0"), yes= ("1")); a Change field 380 indicating whether the notification service needs to communicate a configuration or other change of device settings to the SMT 105 (e.g., no=("0"), yes=("1")); a Pause indicator 381 indicating whether a user has set a Pause setting (e.g., no=("0"), yes=("1")); an AutoPause field 382 indicating timing information related to the Pause setting; an alert delay field 383 indicating timing information related to alert and notifications (e.g., an integer corresponding to number of minutes that alert notifications should be delayed before notifying notification service); a check-in field 384 indicating how often the SMT 105 is required to automatically check in with the notification service (e.g., an integer corresponding to number of minutes that should pass in the absence of a sensor alert before automatically checking in with the service); a current firmware field 385 indicating the version of firmware currently installed in the SMT 105; an update firmware field 386 indicating a version of firmware that the SMT 105 should be updated to; a location field 387 indicating the current location of the SMT 105; a battery saving mode field 388 indicating number of times an alert must be sensed before the SMT 105 sends an alert to the notification service (e.g., an integer); and one or more user handles and corresponding delivery service types 389, 390, 391 containing information about who and how to send alert messages to designated notification recipients.

The following example is provided for illustration: the Unit_ID field 371 contains a serial number 12345 which for purposes of this example, corresponds to a particular SMT 105. Continuing with the example, activation status indicator 372 is set to "1", indicating that the SMT 105 is activated (i.e., subscribed to the Notification Service). The battery low status indicator 373 is set to "0", indicating that the battery is sufficiently charged. The reset status indicator 374 is set to "0", indicating that the SMT 105 has not been reset. The format status indicator 375 is set to "0", indicating that the SMT 105 need not be reformatted or firmware updated. The trigger field 376 is set to "0", meaning that the sensors at the SMT 105 have not detected a monitored condition. Sensor 1 and Sensor 2 fields 377, 378 are each "1", indicating that corresponding sensors (e.g., 206a, 206b) are present and operating at the SMT 105. Sensor field SensorN 379 is "0" indicating that a corresponding sensor is not present and/or not operating at the SMT 105. The change status field 380 is set to "0", indicating that the notification service does not need to configure the control or operations of the SMT 105. The pause indicator 381 is set to "0", indicating that the unit is not paused. The AutoPause field 382 and AlertDelay fields 383 are each set to "0". The check-in field 384 is set to "720" indicating that the SMT 105 is required to automatically check in with the notification service after 720 minutes (12 hours) since it last checked in with the Notification Service (which may be due to an automatic check-in or due to a sensed alert condition). The current firmware field 385 is set to "1.0", indicating the firmware currently installed in the SMT 105 is Version 1.0. The update firmware field 386 is not set, indicating that the firmware version is the latest version; The location field 387 is not set, indicating that the location of the SMT 105 is either not be tracked, or is unknown. The battery saving mode field 388 is set to "3", indicating that the SMT 105 must sense an alert condition three times before it sends an alert message to the notification service.

In an embodiment, configuration settings that need to be sent to and set in the SMT 105 (such as Pause, Battery Saving Mode, Check-In and/or other settings) may be set in the subscriber database record associated with the SMT 105 via a user app or other web-based portal, yet such settings will not be propagated to the SMT 105 until the next time the SMT 105 checks in with, or sends an alert message to, the Notification Service 107. Similarly, for traps 102 with low power SMT units 105, a firmware upgrade may be deployed only after the SMT 105 first contacts the notification service 300. For reasons that are made more clear hereinafter, this protocol allows the SMT 105 to conserve battery power by entering into a low power mode until the occurrence of a predetermined sensed condition or the expiration of the check-in period. In other words, unlike conventional cellular devices, the SMT 105 does not have to wake up and listen for messages coming in from the network 110 every few seconds. In other embodiments the SMT 105 may be programmed to check in with the Notification Service 107 or SMT manufacturer on a timed schedule or through other control mechanisms to receive any firmware upgrades.

Referring again to FIG. 10, the Notification Service 300 may also include an App Backend Module 310a and/or a Web Backend Module 310b, which respectively operate as the interface between the Notification Service 300 and instances of end user Apps 311a or Web page(s) 311b displayed in a browser, executing on end users' electronic devices 109. Subscribers to the Notification Service 300 may interact with the Notification Service 300 via (1) a downloadable App 311a running on an Internet-enabled electronic device 109 (such as but not limited to a smartphone, a tablet or laptop, a desktop computer, a terminal connected to a server or other computer, etc., and/or (2) via one or more Web page(s) 311b running in a Web browser (not shown) executing on a computer system or mobile device. The app 311a may be downloaded to the user's device 109 from a device-accessible app store 308, such as the Apple App Store, Google Play, or other app stores through which apps can be selected and downloaded. Apps may be provisioned in the app stores 308 from the code database 306. The app 311a runs locally on the user's device and is supported by the App Backend Module 310a so as to effectuate communication, collection of user input, and display of information relating to the end user's account and subscriber devices (i.e., SMTs 200 registered to the subscriber account). Alternatively, a subscriber may access the Notification Service via a web portal such as a website that provides subscriber access and a graphical user interface (GUI) on one or more Web page(s) 311b displayed within in a web browser running on a computer or other electronic Internet-enabled device 109, and which that allows a subscriber to interact with the Notification Service via a Web Backend Module 310b. Hereinafter, the detailed description refers frequently to an app 311a or apps 311a. It is to be understood that the functionality described herein with respect to such app or apps 311a may alternatively or additionally be implemented as webpage(s) in communication with the Web Backend Module 310b.

The Control Module 301 provides an API through which user apps 311a can communicate with the Notification Service 300 and configure their user profile, notification recipient information, and the operational settings for their registered trap 102/SMT 105. Users connect to the Notification Service 300 through the app 311a running on their local device 109, which connects to the Internet directly through WiFi, a LAN (via Ethernet), and/or indirectly through a cellular or other network 130. Communication between the app 311a and control module 301 are routed using conventional TCP/IP over the Internet 120 and/or cellular networks. The app 311a provides prompts for the user, and radio buttons and/or other graphical user interface (GUI) widgets/controls to allow the user to configure settings for the SMT 105 and for the operation of the Notification Service 300. As an example, the app 311a may provide a GUI displaying a slider that allows a user to set the level of sensitivity of a sensor on the SMT. Changing the sensitivity level changes the sensitivity of a sensor to a type of event, and may result in more or fewer alert conditions sent to the SMT controller.

When a user or owner of a trap 102/SMT 105 subscribes to the Notification Service 300, the user enters the subscriber information, including subscriber details such as contact information, notification recipient information including delivery service handles and associated delivery services to use to notify notification recipients, and payment information. During registration with the Notification Service 300, the user may be required to submit a payment for subscribing to the services. Accordingly, the Notification Service 300 may also include a Payment Module 304. The Payment Module 304 may either manage payment from a subscriber directly, or may handle communication with a $3^{rd}$-party payment processing system 307 to process payments.

One of the main purposes of the Remote Trap Monitoring Notification Service 300 is to alert subscriber-designated notification recipients of activity at or status of traps 102/SMTs 105. To this end, the control module 301 is configured to receive an alert message (e.g., an IP packet containing the message payload 30) from an SMT 105, extract the payload (including the alert message) from the IP packet, extract the device ID from the payload, decode the alert message, and determine whether the alert requires generation of a notification to one or more notification recipients. If a notification is required, the control module 301 accesses the subscriber database 305 to retrieve the record 370 associated with the device ID, extract and identify the notification recipients, corresponding delivery handles and associated delivery services. The control module 301 then formats one or more message(s) appropriate to the particular delivery service(s) and sends the message(s) to the respective delivery service (s) via the Internet 120 and/or other networks 110, 130. Each delivery service includes an Internet-enabled delivery service running on computer systems or other hardware that is connected to, and accessible via, the Internet 120. For example, the Notification Service 300 may utilize the service(s) of one or more SMS text services 309a, one or more email services 309b such as SMTP services, one or more instant messaging services 309c, one or more text-to-voice or other voice mail messaging services 309d, one or more app push notification services 309e, and one or more other Internet-enabled messaging services 309f. Such services adhere to conventional TCP/IP protocols for passing messages thereto.

In an embodiment, the Encoder/Decoder module 302 in FIG. 10 is the initial point of entry to the Notification Service 300 of messages issued from SMTs 105 and is the exit point from the Notification Service 300 for messages going to SMTs 105. Each alert message contained in the payload of the IP packet 36 coming from an SMT 105 is in an encoded format, for example as discussed in connection with FIGS. 8A and 8E. The decoder 302a of the Encoder/Decoder module 302 extracts the message payload 30 from the IP packet 36 and decodes the message payload bits 31 into a format or other data usable by the control module 301. Based on the decoded information generated by the decoder 302, the control module 301 performs one or more actions, as described in connection with FIG. 13. Generally, an SMT 105 only contacts the Notification Service 300 for one of two reasons: (1) to alert the Notification Service of the occurrence of an event at the SMT 105, or, optionally, (2) to check in with the Notification Service 300 to let the Notification Service know the SMT 105 is still functioning and connected (alternatively referred to as a "heartbeat" function).

Figure 13:
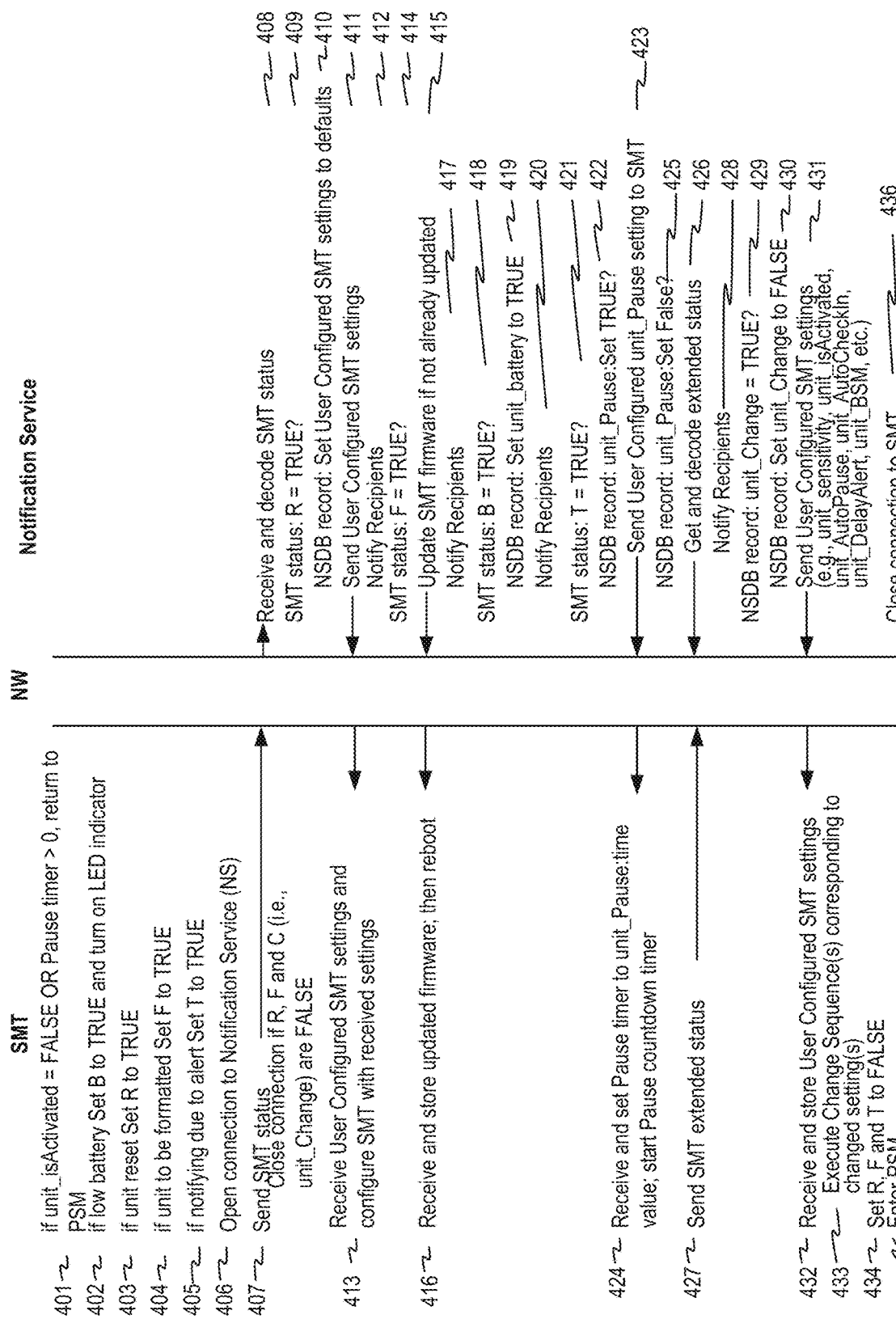
FIG. 13 is a communications interaction diagram illustrating an exemplary operational implementation of the communications between an SMT and a notification service.

FIG. 13 is a communications interaction diagram illustrating an examplary operational implementation of the actions of, and communications between, an SMT 105 (e.g., 200) and the Notification Service 300 that may ensue after the SMT 105 has been initialized, has established a connection to the cellular network (see steps 211-216 in FIG. 6), placed itself into power saving mode (PSM), and is awakened from PSM (step 217 of FIG. 6). FIG. 13 illustrates in more detail exemplary actions and inter-communications between an SMT 105 and notification service 300 upon the SMT controller 201 receiving a sensor-sourced interrupt, causing the SMT 200 to exit PSM, process the sensor information and, if determined, generate and send an alert message to the Notification Service 300 (see steps 217-222 and 215-216 of FIG. 6).

As shown in FIG. 13, when the SMT 105 wakes from PSM (step 217 of FIG. 6), it begins a general processing sequence. First, the SMT 105 may perform one or more optional preliminary checks (step 401) to see if it should continue further processing. For example, in an embodiment, the Notification Service may implement an activation/deactivation feature wherein an SMT 105 ignores alerts from sensors if it has not been activated through the Notification Service. In the illustrative embodiment, this feature is implemented by way of a field or bit (unit_isActivated) that is TRUE if the SMT 105 is an authorized active subscriber to the Notification Service 300, and is FALSE otherwise. The unit_isActivated field/bit 372 may be stored in the subscriber record 370 (FIG. 12) in the Notification Service database 305, and a local copy may be stored in the memory 202 of the SMT 200. The local copy of the unit_isActivated field 372 may be used by the SMT 200 to reduce or eliminate communications transactions between the SMT 200 and Notification Service 300 when an SMT 200 is not registered to a current subscriber account with the Notification Service 300. The unit_isActivated field 372 is set to TRUE when an SMT 105 becomes an authorized active subscriber to the Notification Service 300, and is set to FALSE when an SMT 105 no longer subscribes to the Notification Service 300. Returning to FIG. 13, if the SMT controller 201 determines that the SMT 105 is not a subscriber to the Notification Service 300, then no alert messages will be sent to the Notification Service 123, and the SMT 105 returns to PSM (step 401).

Another example of a preliminary check that may be performed in step 401 is determination of whether the SMT 200 has been placed in a "Pause" mode. As discussed hereinafter, the SMT 105 may implement a pause feature that allows a subscriber to pause all notifications for a certain amount of time, referred to herein as "Pause mode", whereby any alerts received during such time are ignored. In an embodiment, the SMT 105 controller 201 may check to see if a Pause timer at the SMT 200 is currently counting down, and if so, the controller 201 places the SMT 105 back into PSM and does not send a corresponding notification message to the Notification Service 300.

After performing preliminary checks (step 401), the SMT controller 201 then checks for a battery low status condition from a battery level sensor (not shown), and sets a Battery Low status bit "B" to TRUE if it detects that the battery low condition is met (step 402). The controller may additionally turn on a battery low indicator on the SMT, such as but not limited to turning on an LED (not shown), upon detection of the battery low condition.

A reset status bit "R", format status bit "F", and trigger status bit "T" may be set to TRUE depending on the reason that the SMT 200 came out of PSM (steps 403-405). For example, if a sensor triggered an interrupt on the controller upon detection of a predetermined condition, the interrupt service routine may set the "T" bit to TRUE. As another example, if an end user of the SMT 200 activates a Reset of the device, such as pushing a Reset button or interacting with the SMT 200 according to a predefined procedure for resetting the SMT 200, the controller 201 executes a Reset routine which sets the Reset bit "R" to TRUE. In another example, if the administrator of the Notification Service 300 determines that it needs to propagate a firmware update to the SMT 200, it may, on the next connection from the SMT 200, send a firmware update command to the SMT 200, which causes it to set the format bit "F" to TRUE, and keep the connection to the Notification Service 300 open to receive firmware from the Notification Service, as discussed in more detail hereinafter.

Once the status bits (B, R, F and T) are set to accurately reflect the corresponding conditional state of the SMT 200, the controller 201 opens a connection to the Notification Service (step 406). Upon confirmation/acknowledgement from the Notification Service 300 that the connection is open, the controller 201 sends the SMT 200 status to the Notification Service 300 (step 407). In an embodiment, the status is encapsulated in an alert message in a format such as described in connection with FIG. 8A.

The alert message containing the SMT status is transmitted from the SMT 200 to the Notification Service 300 via the cellular network 110 and Internet 120.

At the Notification Service 300, the Notification Service 300 receives and decodes the SMT status (step 408). It may then perform various actions based on the status of the bits, R, F, B and T. To this end, the Notification Service 300 checks if the Reset bit "R" is True (step 409). If True, this indicates that the SMT 200 has been reset and that the user configured settings at the SMT 200 should be reset to their default values. Accordingly, the Notification Service 300 resets the user configurable device settings in the Notification Service database record 370 associated with the SMT 200 to their default values (step 410), then sends a command to the SMT 200 to update its User Configurable settings to the default settings (step 411), and notifies the Notification Recipients associated with the SMT 200 that the device has been reset (step 412). At the SMT 200, the controller has held open the connection to the Notification Service because the Reset status is TRUE, and it receives the updated (default) User Configurable SMT settings and configures the SMT with the updated settings. (step 413).

Back at the Notification Service 300, the Notification Service 300 further checks the format status, and if the Format status is TRUE (bit F=TRUE) (step 414), the Notification Service 300 performs a firmware update routine (step 415). The firmware update routine is not shown in FIG. 13; however, the firmware update may generally include the steps of obtaining the version identifier of the currently installed firmware on the SMT 200 (i.e., the currentFW field 385), comparing the current firmware version to the version of firmware that it should be (the updateFW field 386), and if the currentFW field 385 does not match the updateFW field 386, then downloading the firmware identified by the updateFW field 386 to the SMT 300. There are various ways to check the firmware version of the SMT 200: one is to record/store the version of the currently installed firmware in the memory of the SMT 200 and implement a command sequence that allows the Notification Service 300 to request, and the SMT 200 to reply with, the value of the current FW version; an alternative method is to record the value of the currently installed SMT firmware version in a field (Unit_currentFW 385) of the record 370 associated with the SMT 200 that is stored in the Notification Service database 305. The FW download from the Notification Service 300 to SMT 200 typically involves a conventional send-receive-acknowledge (ACK)/no acknowledge (NAK) communication sequence via networks 110, 120 whereby the Notification Service 300 sends a series of block of bytes of FW data to the SMT 200, and the SMT 200 receives each the block of FW data, performs a checksum or other validation of the data, and replies with an ACK message if the block was successfully received and validated or a NAK message if the block was not successfully received or did not validate. As each block is successfully received, the SMT 200 stores the block in its memory 305, and once all blocks are successfully received, performs a self-programming routine to update its own firmware, and then reboots (step 416).

Once the firmware update is performed, the Notification Service sends a notification message to the notification recipients associated with the SMT 200 (step 417).

The Notification Service 300 also checks the Battery low status, bit B, which when TRUE indicates that the battery charge level is low (step 418). If the battery low status is TRUE, the Notification Service 300 updates the status (sets the Unit_battery field to TRUE) in the Notification Service database record 370 that is associated with the SMT 200 (step 419), and then sends a notification message indicating the battery low condition to the notification recipients associated with the SMT 200 (step 420).

The Notification Service 300 also checks the sensor alert ("Trigger" status), bit(s) T, which when TRUE indicates that a monitored alert condition occurred at one of the sensor(s) 206, which triggered the current alert message (step 421). In an embodiment, the Notification Service may implement a Pause feature, that allows a subscriber to pause all notifications for a certain amount of time. In such embodiment, prior to acting on a TRUE trigger status, the Notification Service 300 may first determine whether the user has set the Pause mode. In an embodiment, the user may configure the User Configurable SMT settings for the SMT 200 through user interface controls in the app 311a. One such control may be a Pause mode control that allows the user to "pause" notifications of trigger events going to notification recipients. In an embodiment, when the subscriber sets the pause mode, the user may set a time period during which notifications should not be sent to notification recipient(s). The app 311a acts on user input to the app 311a, and sets fields corresponding to user configurable SMT settings based on user selections and input collected via the app 311a. For example, when a user uses the app 311a to set the Pause mode for the SMT 200, the Notification Service 300 may update the Unit_Pause:Set field 381 in the Notification Service database record 370 associated with the SMT to TRUE. In this embodiment the Notification Service 300 checks the Unit_Pause field 381 to see if it has been activated (i.e., unit_Pause:Set is set to TRUE) (step 422), and if so, sends a command to the SMT 200 instructing the SMT 200 to enter Pause mode (step 423). This Pause mode command sequence may be accomplished in multiple different ways: one methodology is to include a Pause_length value (unit_Pause:length) corresponding to how long the SMT should remain in Pause mode. In such an embodiment, the SMT may start a countdown timer to count down the length of time indicated by the Pause_length value (step 424).

If the SMT 200 is not in Pause mode (step 425), for example, when unit_Pause:Set is FALSE, the reason for the Trigger is determined. In an embodiment, the Notification Service 300 may send a command (step 426) to the SMT 200 to send it extended trigger status data (step 427). Alternatively, the extended status data may be encapsulated in the message payload 30 itself. For example, if the SMT comprises a plurality of different sensors 206a, 206b (see FIG. 5), the status bits 34 may include additional bits indicating which of the sensors 206a, 206b originated the alert that triggered the alert message to the Notification Service 300. For each monitored sensor 206a, 206b, there may be a single bit that may be in one of two states, 0 or 1, indicating whether the alert was sourced by that respective sensor. Alternatively, or in addition, the status bits 34 may include a plurality of bits used to indicate received sensor information from one or more of the sensors 206*a*, 206*b*. If there is only one sensor 206, the T bit itself indicates that the alert came from the only sensor 206.

The Notification Service 300 decodes the Trigger status and extended status (if available) (step 426) to determine which sensor originated the alert, and notifies the notification recipient(s) of the event that generated the Trigger condition (step 428).

In the preferred embodiment, in order to conserve battery power, the SMT 200 does not listen for messages from the Notification Service. Instead, communication is initiated only by the SMT 200—that is, the Notification Service 300 cannot directly contact the SMT 200. This protocol allows the SMT 200 to remain in PSM unless interrupted by a sensor 206 detection of a sensor alert condition. Optionally, the SMT 200 may periodically send a "check-in" (alternatively referred to as a "heartbeat") message to the notification service 300 to report it is still operating as expected (i.e., it is still up and running and connected to the cellular network 110). Thus, the SMT 200 only contacts the Notification Service (1) when an alert condition occurs at the SMT 200; and/or (2) upon expiration of a heartbeat timer in order to send a check-in message.

As described previously, the subscriber to the Notification Service 300 may have the option of setting one or more SMT 200 settings to configure the behavior of the SMT 200. When a user applies a User Configurable SMT setting in the app 311*a*, the Notification Service 300 collects the information and stores the user setting information in one or more fields in the Notification Service database record 370 associated with the particular SMT 200. To indicate that there have been changes made to the User Configurable SMT settings, in an embodiment the Notification Service may set a "Change" bit or bits (Unit_Change field 380) in the Notification Service database record 370 associated with the particular SMT 200. Then the next time the SMT 200 connects to the Notification Service 300, the Notification Service 300 checks to the Unit_Change field 380 in the Notification Service database record 370 associated with the particular SMT 200 to determine whether it needs to apply any updated User Configurable SMT settings to the SMT 200 (step 429). If the Unit_Change field 380 indicates the User Configurable SMT settings need to be updated at the SMT 200, the Notification Service sends the updated User Configurable SMT settings to the SMT 200 (step 431) and resets the Unit_Change field 380 (step 430). The SMT 200 receives and updates the User Configurable SMT settings in the SMT 200 (step 432) and executes any command sequences corresponding to the updated settings (step 433), clears the R, F, and T status bits (step 434) and enters PSM (step 435). Meanwhile, the Notification Service 300 closes the connection to the SMT 200 (step 436).

SMT Settings and Configurations

The command sequences executed by the SMT 200 (in step 215 of FIG. 6) will depend on what user configurable features are implemented by the manufacturer of the SMT and how the user configures the user configurable SMT settings to set the operational behavior of the SMT 200. In various embodiments, the SMT 200 may be manufactured to implement one or more features, including, without limitation: a manual pause feature (hereinafter "Manual Pause") that allows a user of the SMT 200 to temporarily pause alert messages from the SMT 200 to the Notification Service 300; an automatic ramping notification delay feature (hereinafter "AutoPause" feature) that may be preprogrammed to automatically pause connection to the Notification Service 300 after sending a Trigger-sourced notification message to the Notification Service; an automatic check-in feature (hereinafter "Automatic Check-in") which allows a user set how often the SMT 200 should send a check-in message to the Notification Service 200 since its last communication (either an alert message or a check-in message) with the Notification Service; an alert delay feature (hereinafter "Alert Delay") which allows programming of the SMT 200 to delay sending of alert messages to the Notification Service 300 by a predetermined amount of time (and further configurable to ignore multiple alerts, or to record additional alerts and send as a batch of alerts upon expiration of the delay); a battery saving mode (hereinafter "Battery Saving Mode" or "BSM") which can automatically turn on after a predetermined number of alerts and once BSM is activated, operates to delay the transmission of alert notification messages to the Notification Service by a predefined amount of time.

Manual Pause

Figure 14A:
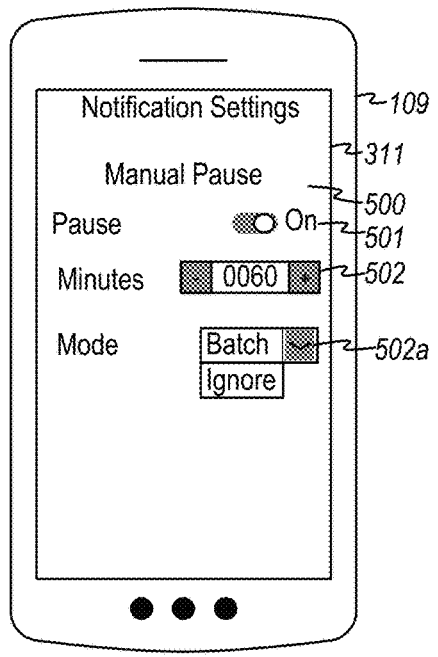
FIGS. 14A-14F are flowcharts illustrating an example implementation of a manual pause feature.

FIGS. 14A-14E depict an example implementation of a Manual Pause feature. FIG. 14A shows the App 311*a* executing in an end user's electronic device 109, displaying a Manual Pause feature user interface (UI) 500 that provides UI controls 501, 502 that allow a user to, respectively, turn on or off the Manual Pause feature and configure the Manual Pause Time setting(s). The Manual Pause UI 500 may also include a mode control 502*a*, which allows the user to control whether any sensor alerts received while the SMT 200 is in Pause mode are saved and sent to the Notification Service in a batch of messages the next time the SMT 200 connects to the Notification Service 300 ("Batch" mode), or whether sensor alerts received during an AutoPause interval are ignored and not sent to the Notification Service the next time the SMT 200 connects to the Notification Service 300 ("Ignore" mode).

Figure 14B:
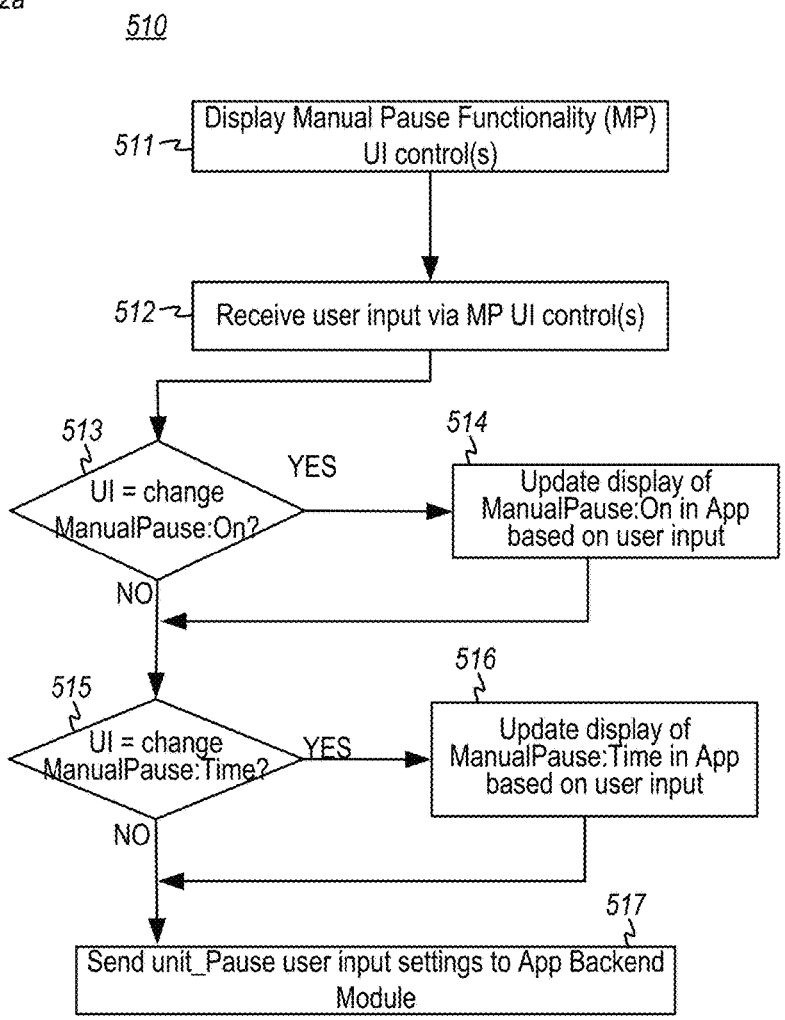

FIG. 14B shows a flowchart illustrating an example method 510 that may be executed in the App 311*a* running on the electronic device 109. As shown therein, the App 311*a* displays the Manual Pause Functionality 500 with various UI controls 501, 502 (step 511) for receiving user input (step 512). Upon receiving user input, the App 311*a* processes and decodes the user input to determine which UI control sourced the user input (steps 513, 515) and update the display of the respective control 501, 502 based on the decoded user input (steps 514, 516). The App 311*a* formats the collected changes into a message and sends the Manual Pause settings to the App Backend Module 310 (step 517).

Figure 14C:
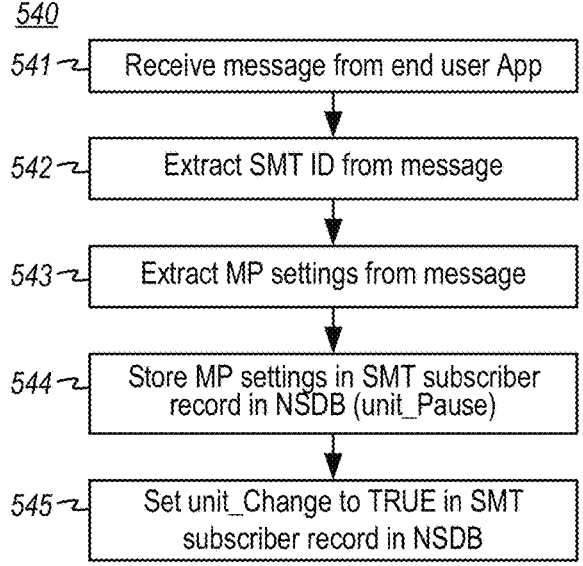

FIG. 14C illustrates an example embodiment of a method 540 that may be executed by the App Backend Module 310 communicating with the App 311*a* executing on the user's device 109. Upon receiving a message containing user configured Manual Pause settings from the App 311*a* (step 541), the App Backend Module 310 extracts from the received message the ID of the subscriber SMT 200 associated with the user of the App 311*a* (step 542) and the Manual Pause settings included in the message (step 543). The App Backend Module 310 processes, formats and stores the received Manual Pause settings into the unit_Pause field 381 in the Notification Service database 305 in the record 370 associated with the extracted subscriber SMT ID (step 544). The unit_Pause field 381 may include an on/off bit, unit_Pause: ON ("1"=ON, "0"=OFF) and a plurality of bits, unit_Pause:time, indicating a length of time in minutes (or other unit of time—e.g., second, hours, etc.). The App Backend Module 310 also sets the unit_Change field 380 in the record 370 associated with the extracted subscriber SMT ID to TRUE (step 545) to signal the Notification Service 300 to send the User Configurable SMT settings (including the Manual Pause settings in unit_Pause) to the SMT 200 the next time the SMT 200 connects to the Notification Service 300.

Figure 14E:
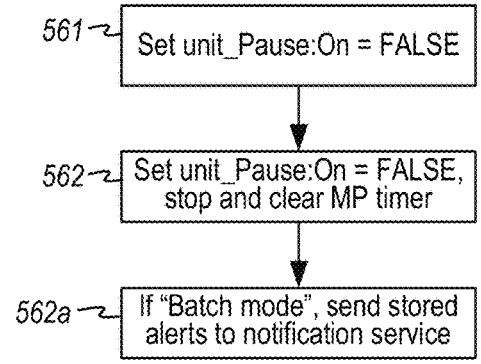

Alternatively, Manual Pause mode may be entered through predefined user input actions and/or electronic or mechanical actuations on the physical SMT 200 unit itself. In such an embodiment, actuation of the Pause actuation mechanism triggers a service routine, an example of which is shown in FIG. 14F, which comprises the step of determining whether the actuation mechanism is in the On state or the Off state (step 563). If the actuation mechanism in in the On state, the SMT 200 sets unit_Pause:On to TRUE, sets the MP timer to unit_Pause:Time, and starts the MP timer (step 564). If the actuation mechanism is set to the Off state, the SMT 200 sets unit_Pause:On to FALSE, and stops and clears the MP timer (step 565).

Figure 14D:
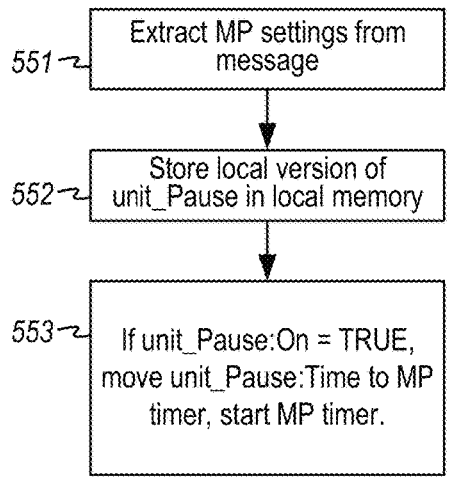
Figure 14F:
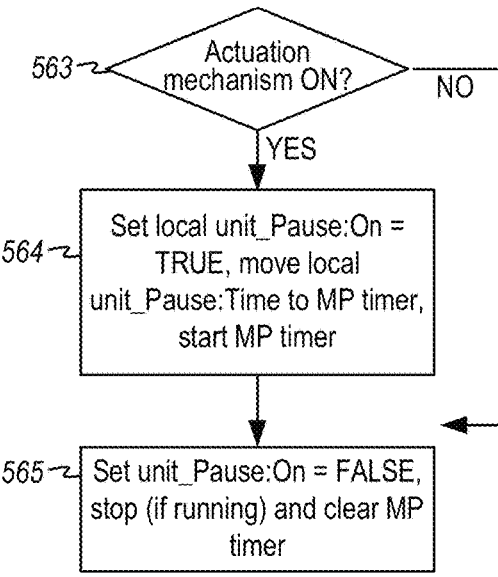

FIG. 14D illustrates an example embodiment of a method 550 that may be executed by the SMT 200 after connecting to the Notification Service 300 and receiving User Configurable SMT settings (including the Manual Pause settings in the unit_Pause field 381). Upon receiving the User Configurable SMT settings from the Notification Service 300 (for example, in step 413 of FIG. 13), the SMT 200 extracts the MP settings from the received message (step 551) and stores the extracted Manual Pause settings (or local representations of the settings) in local memory (step 552). The SMT 200 then sets the MP timer to unit_Pause:Time, and starts the MP timer (step 553).

Generally, once an SMT 200 enters the Pause mode, it will not send any alerts to the notification service 300 if an alert condition is sensed during the Pause period. Thus, once in Pause mode, the SMT 200 remains in Pause mode until expiration of the Pause period. In an embodiment, the SMT 200 may be programmed to make an exception for notification service check-in messages, wherein if a check-in timer expires (i.e., the SMT 200 has not communicated with the notification service by sending either an alert message or a check-in message to the notification service since the most recent communication with the notification service), the SMT 200 may still wake-up and send the check-in message to indicate to the Notification Service 300 that it is still operating. In an embodiment, if a check-in message is sent to the Notification Service 300 while the SMT 200 is in Pause mode, the check-in message will not send alert notification or alert status. In an alternative embodiment, the check-in message may include sensor alert status (but the Notification Service 200 preferably will not send notification messages to the designated notification recipients.

FIG. 14E illustrates an exemplary method 560 executed by the SMT 200 when the Manual Pause timer expires to exit the SMT 200 from the Pause state. As illustrated, the SMT 200 sets it local copy of the MP indicator to False (unit_Pause:On=FALSE) (step 561), and then, if not already stopped and cleared, stops and clears the MP timer (step 562). Finally, if the "Batch Mode" is enabled, SMT 200 sends stored sensor alert notifications to the Notification Service 300.

Automatic Pause

The AutoPause feature is an automatic notification delay with optional ramping that may be preprogrammed to automatically pause connection to the Notification Service 300 after sending a first or a predetermined few sensor-sourced alert message(s) to the Notification Service. In an embodiment, after sending the predetermined number of alert message(s), the SMT 200 enters the AutoPause mode, wherein it ceases to send further alert messages to the Notification Service for a programmed length of time or receiving a programmed number of additional sensor-sourced alerts from the same sensor(s) for the same alert condition(s). The AutoPause feature serves to (1) prevent draining of the battery source due to unnecessary transmission of alert messages due to the same sensor condition(s) after it has already notified the notification service, and (2) prevents the Notification Service from sending an excessive number of notification messages to designated notification recipients that contain no new information. In an embodiment, the pre-programmed time interval or required received number of additional sensor-sourced alerts between sending sensor-sourced notification messages to the Notification Service is gradually increased over time, or the more sensor-sourced triggers the SMT controller 201 receives from the the SMT sensor(s) for the same alert condition(s).

Figure 15A:
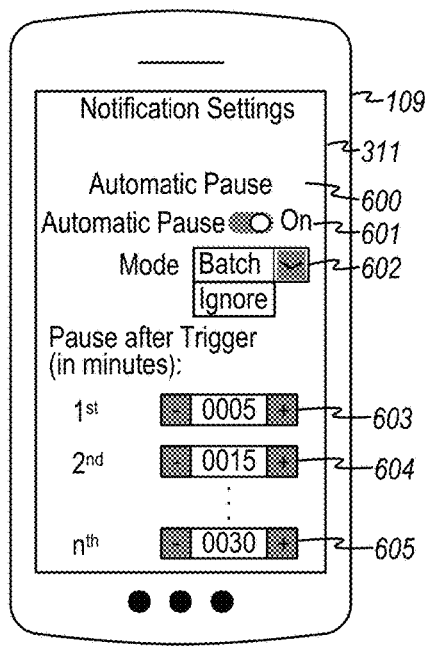
FIGS. 15A-15E are flowcharts illustrating an example implementation of an automatic pause feature.

In an embodiment, the AutoPause time interval or the required number of additional received sensor-sourced alerts between the SMT 200 sending sensor-sourced notification messages to the notification service 300 is preprogrammed by the manufacturer. In an embodiment, the AutoPause operational parameters are configurable by the user through a user interface, such as through App 311 executing on a user's electronic device 109, as illustrated in FIG. 15A. That is, in an embodiment, the preprogrammed AutoPause time intervals may be overridden by the user as a user configurable SMT setting, as discussed in connection with FIG. 13 (steps 429-433). In such embodiment, the Notification Service database record 370 (FIG. 12) includes a field 382 (unit_AutoPause), which may contain one or more bit(s) for turning the AutoPause feature on or off (unit_AutoPause:On), and one or more sets of a plurality of bits (unit_AutoPause:AP1 unit_AutoPause:AP2, . . . , unit_AutoPause:APn) for indicating one or more delay time intervals to delay sending a next sensor-sourced notification message from the same sensor(s) for the same alert condition(s). In an embodiment, the sets of bits AP1, AP2, APn represent a number of units of a predefined time unit. In an alternative embodiment, the sets of bits AP1, AP2, APn represent a count of sensor-source alerts received by the SMT 200, indicating for each interval how many sensor-sourced alerts must be received during an given interval before sending an alert message to the notification service.

FIGS. 15A-15E detail an example of a user-configurable feature referred to herein as an automatic pause, or "AutoPause" feature. FIG. 15A shows an example of an AutoPause setup user interface (UI) 600 that may be displayed on a display screen of a smart device 109 executing the App 311a. In the embodiment shown, the App 311a includes a control 601 that allows a user of the App 311a to turn the AutoPause feature on or off. In the embodiment shown, the control 601 comprises a slider which may be placed in one or the other of the On position or the Off position by sliding one's finger on the touchscreen of the smart device 109 on the control 601 in the direction of On or Off. Other embodiments may use a different UI control, such as, but not limited to, a radio button, a button, or any other UI control that allows a user to select an On or Off configuration for the AutoPause feature. In the embodiment shown, the slider is in the On position, indicating that the AutoPause feature is on, or is to be turned on if not already on.

The AutoPause UI 600 may also include a mode control 602, which allows the user to control whether any sensor alerts received by the SMT 200 during an AutoPause interval should be saved and sent to the Notification Service in a batch of messages the next time the SMT 200 connects to the Notification Service 300 ("Batch" mode), or whether any sensor alerts received during an AutoPause interval are ignored and not sent to the Notification Service the next time the SMT 200 connects to the Notification Service 300 ("Ignore" mode).

The AutoPause UI 600 also includes one or more control(s), 603, 604, 605 which allow a user to set the amount of time each of a first, second, and up to a number, n, of time intervals that the SMT 200 should delay between sending alert notifications. The AutoPause feature may be useful in a situation where multiple alert conditions occur in rapid succession due to activity at the SMT 200. In many situations, one or a few alert notifications to the Notification Service resulting in notification message(s) getting sent to the notification recipient(s) associated with the SMT subscriber account is sufficient to alert the individuals who need or want to know about the action without needing to receive the same alert notification multiple times. In other words, the Automatic Pause feature can serve both as a nuisance prevention feature as well as a battery saving technique (by reducing the number of cellular connections needing to be made to report the alert notifications).

In an embodiment, the SMT 200 is pre-programmed with an Automatic Pause feature that pauses sending of alert notifications to the Notification Service 300 after a predetermined number of alert notifications occur in rapid succession. For example, after receiving x number of sensor alerts with y minutes, the SMT 200 may be programmed to automatically enable the pre-programmed Automatic Pause feature. To illustrate the operation of one embodiment of the Automatic Pause feature, once x sensor alerts are received within y minutes, the Automatic Pause feature disables sending further alert notifications to the Notification Service for a number, F, minutes (e.g., the numeric value of field 603 set in the user app 311). After F minutes pass, on the next sensor alert, the SMT 200 will send an alert message to the Notification Service 300 notifying the Notification Service of the occurrence of the sensor alert (and optionally, a batch of received sensor alerts that occurred during the first timer interval that notifications from the SMT 200 to the Notification Service was paused). The Automatic Pause feature disables sending further alert notifications to the Notification Service for a number, S, minutes (e.g., the numeric value of field 604 set in the user app 311). After S minutes pass, on the next sensor alert, the SMT 200 will again send a notification message to the Notification Service notifying the Notification Service of the occurrence of the sensor alert (and optionally, a batch of received sensor alerts that occurred during the second timer interval that notifications from the SMT 200 to the Notification Service was paused. The AutoPause feature may continue in this manner for however many intervals that the programmed feature allows.

As an illustration, a first AutoPause time interval may be pre-programmed to be 5 minutes long (see field 603); a second AutoPause time interval may be pre-programmed to be 10 minutes long (see field 604); and a third AutoPause time interval may be pre-programmed to be 30 minutes long (see field 605). In this example, once the AutoPause feature becomes enabled (after receiving one or more sensor alerts from the sensors and sending corresponding one or more alert notifications to the Notification Service 300), the SMT 200 will cease sending notification messages for 5 minutes. Upon receiving another trigger after the expiration of the 5 minutes, the SMT 200 will send another notification message to the Notification Service 300, and then cease sending further notification messages for 10 minutes. After the expiration of the second time interval (i.e., 10 minutes pass), upon receiving another sensor alert that should trigger a notification message to the Notification Service 300, the SMT 200 will send another notification message to the Notification Service 300, and then cease sending further notification messages for 30 minutes. After the expiration of the third interval (or last preprogrammed time interval in this example), the AutoPause feature may be disabled and return to sending a notification message (and thereby connecting to the Notification Service) on each occurrence of a sensor alert.

In various embodiments, the Automatic Pause feature is preprogrammed by the manufacturer. In other embodiments, the Automatic Pause feature may be configurable by an end user. In an embodiment, as discussed in connection with FIG. 15A, the Automatic Pause feature may be configured by a user the App 311a.

Figure 15B:
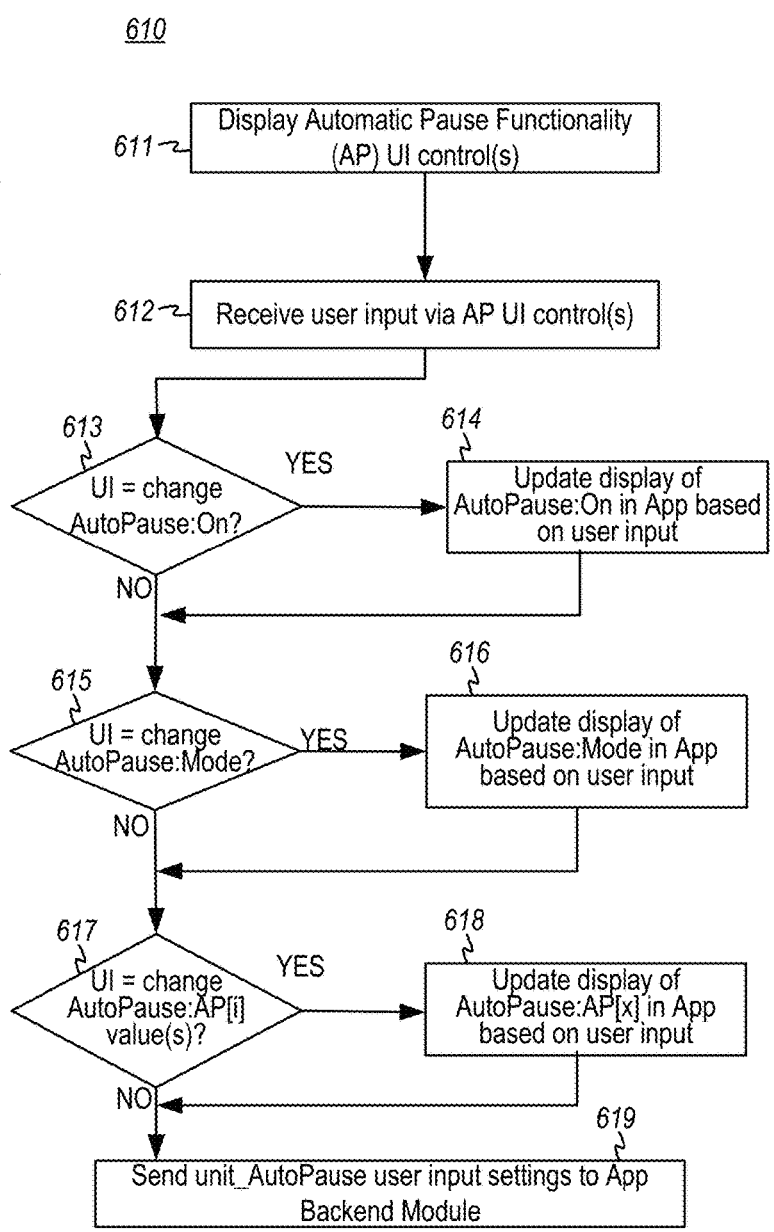

Turning now to FIG. 15B, there is shown therein a flowchart illustrating an example embodiment of a method 510 that may be executed by the App 311a to enable user configurable AutoPause settings. According to the method 610, the App 311a, and in particular the App 311a in conjunction with the Operating System of the electronic device 109, displays a user interface (UI) 600, including displaying Automatic Pause functionality controls for receiving user input (AP UI controls). Generally, the App 311a in conjunction with the Operating System of the device 109 displays UI controls 601-605 (step 611) and a central processing unit (CPU) executes listener code that "listens" or detects user input via, and associated with, the controls 601-605 to facilitate the receiving of pertinent user input by the App 311a (step 612). Once the user input is received, the App 311a processes the user input by determining what AP UI control 601, 602, 603, 604, or 605 was the source of the received user input and whether the state of the UI control was changed. For example, the user may turn the Automatic Pause feature on or off using the control 601. If the UI control 601 detects a change of the On or Off status control 601, the App updates the display of the UI control 601 based on the changed state. For example, if the AutoPause feature was originally set to Off and the user interacts with the UI control 601 to set the AutoPause feature to On, the App 311a updates the display of the UI control 601 to indicate that the AutoPause feature is now in the On state.

The App 311a executing on an end user's electronic device 109 includes computer-readable program instructions implemented to monitor user interaction with, and collect user input from, each of the UI controls 601-605. If the user changes the AP mode 602 control input from Batch mode to Ignore mode, the App 311a detects this condition (step 615) and updates the display of the Mode UI control 602 to reflect the changed state (step 616). Similarly, if the user changes the value of the Automatic Pause time interval inputs to any of the controls 603, 604, or 605, the App 311a detects the changed time interval (step 617) and updates the display of the Mode UI control 602 to reflect the changed time interval (step 618).

Once one or more updates to conditions or states are collected by the UI 600, the App 311a formats the collected changes into a message and sends the User Configurable AutoPause settings to the App Backend Module 310. User configured AutoPause settings are then sent to the App Backend Module (step 619).

Figure 15C:
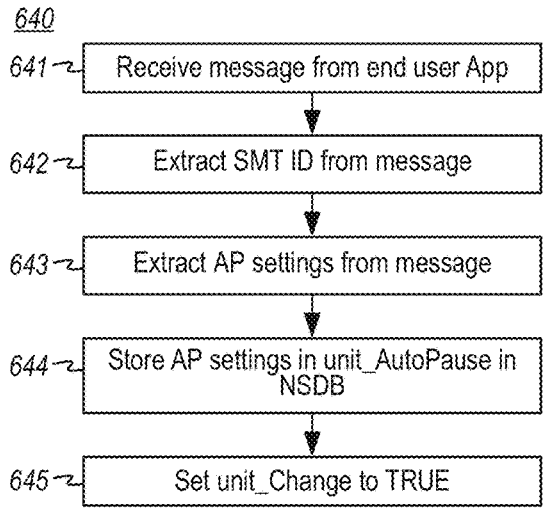

FIG. 15C illustrates an example embodiment of a method 640 that may be executed by the App Backend Module 310 communicating with the App 311a executing on the user's device 109. Upon receiving a message containing user configured AutoPause settings from the App 311a (step 641), the App Backend Module 310 extracts from the received message the ID of the subscriber SMT 200 associated with the user of the App 311a (step 642) and the AutoPause settings included in the message (step 643). The App Backend Module 310 processes, formats and stores the received AutoPause settings into the unit_AutoPause field 382 in the Notification Service database 305 in the record 370 (FIG. 12) associated with the extracted subscriber SMT ID (step 644). The App Backend Module 310 also sets the unit_Change field 380 in the record 370 associated with the extracted subscriber SMT ID to TRUE (step 645), which ultimately signals to the Notification Service 300 to send the User Configurable SMT settings (including the AutoPause settings in unit_AutoPause) to the SMT 200 the next time the SMT 200 connects to the Notification Service 300.

Figure 15D:
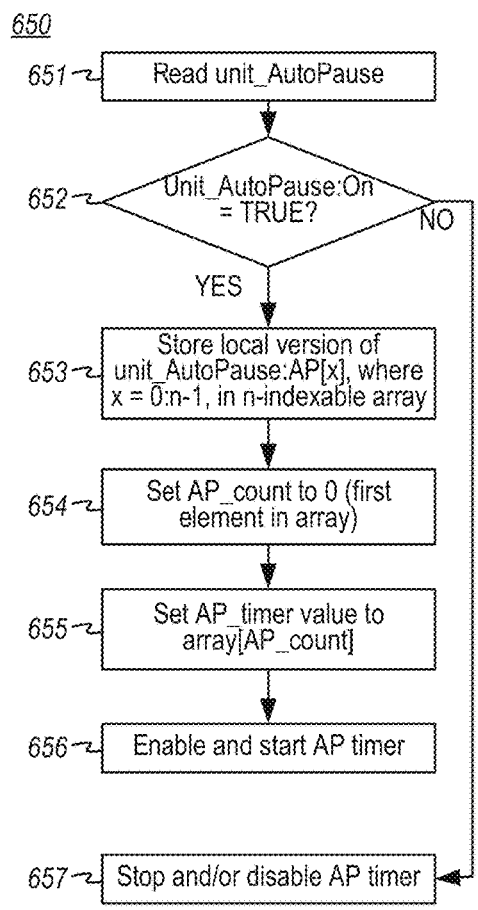

FIG. 15D illustrates an example embodiment of a method 650 that may be executed by the SMT 200 after connecting to the Notification Service 300 and receiving User Configurable SMT settings (including the AutoPause settings in unit_AutoPause). Upon receiving the User Configurable SMT settings from the Notification Service 300 (for example, in step 432 of FIG. 13), the SMT 200 reads and/or decodes the AutoPause settings from the received message (step 651) and determines whether AutoPause is or should be in the On state (e.g., unit_AutoPause:On=TRUE) (step 652). If AutoPause is not currently in the Off state, or was but should be actively turned off, the SMT 200 stops and/or disables the AutoPause timer (step 657). Otherwise, the SMT 200 stores the time interval values AP1, AP2, . . . , APn (shown in FIG. 15D as AP[x], wherein x=0:n−1) in local memory in an n-indexable array of AP time interval values (step 653). The SMT 200 initializes a timer counter variable, AP_count, to point to the value of the first index in the array (shown as 0) (step 654). The variable AP_timer indicating the amount of time the AP timer should count down is then set to the time value stored at the first element in the AP array (AP[AP_count]) (step 655). The SMT 200 then enables (if not already enabled) and starts the AP timer (step 656). In the example, the AP array stores n elements, which is indexed for purposes of ease of discussion as 0:n−1. In other embodiments, the array may be indexed as 1:n. The way the array is indexed impacts the management of consecutive times, as will be discussed in reference to FIG. 15E.

Figure 15E:
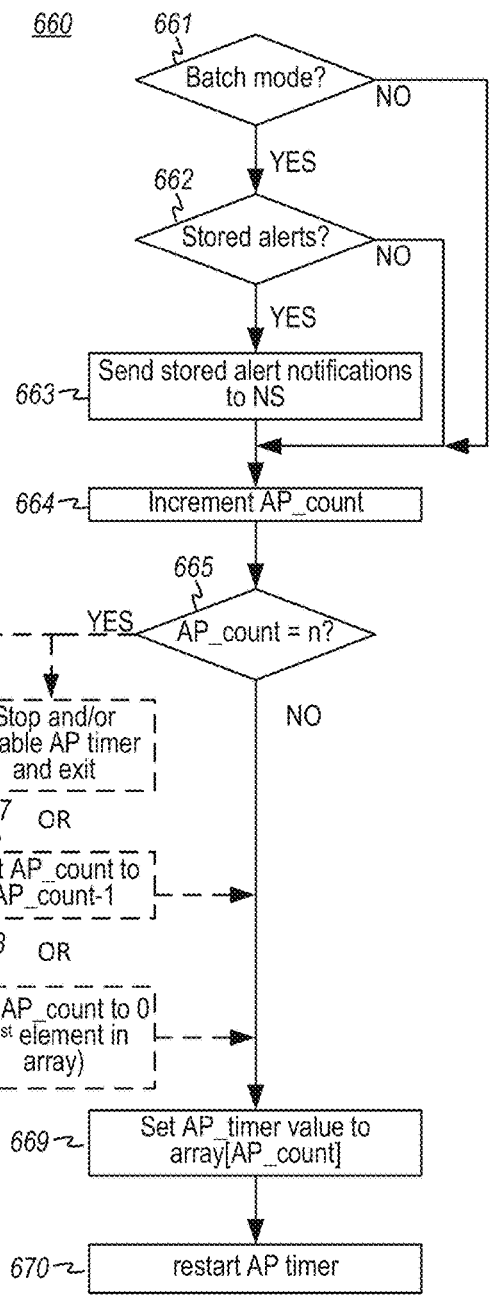

Turning to FIG. 15E, there is shown a flowchart illustrating an example method 660 of operation of the SMT 200 upon expiration of the AP timer. As shown therein, the method may first check the mode of the AP operation (as indicated in the SMT local representation of unit_AutoPause:Mode). In an embodiment, the Automatic Pause feature may operate in a Batch mode whereby all sensor alerts that occur during a pause interval of the AutoPause operation, are collected, saved, and sent as a batch to the Notification Service once the AutoPause time interval expires. In FIG. 15E, the SMT 200 timer service routine may check to see if the AutoPause functionality is set to the Batch mode (step 661). If it is, the SMT 200 checks to see if there are any stored sensor alerts (step 662), and if so, sends the stored alert notifications to the Notification Service 300 (step 663). Following these steps, or if it is determined in step 661 that the AP function is not in Batch mode or in step 662 that there are no stored alerts to send, the SMT 200 increments the AP_count variable (step 664) for accessing the next AP timer value in the AP array. The SMT 200 performs a check of AP_count to see if it exceeds the number of elements in the AP array (i.e., AP_count=n) (step 665). If so, the SMT 200 may perform one of several possible functions. In a first embodiment, the SMT 200 ends the AP function by disabling the AP timer and exits the service routine (step 666). In a second embodiment, the SMT 200 sets the AP_count variable to the value of the last AP array element (i.e., the last timer value) (step 667). In a third embodiment, the SMT 200 restarts the time intervals by setting the AP_count variable back to the first element in the AP array (step 668). The SMT 200 then sets AP_timer to the time value stored at the next element in the AP array (AP[AP_count]) (step 669), and the SMT 200 then restarts the AP timer (step 670).

Automatic Check-In

In an embodiment, the SMT 200 may implement an Automatic Check-in (or "heartbeat") feature, wherein the SMT 200 sends a status message to the Notification Service 123 according to a programmed schedule, especially in the absence of any intervening sensor-sourced alert notification. In an embodiment, the SMT 200 sends a status notification message to the Notification Service 300 in the event that the SMT 200 has not sent an alert notification to the Notification Service 300 within a predefined period of time. For example, the SMT 200 may be programmed to send a status notification message to the Notification Service if it has not sent any notification message (i.e., either a status notification message or an alert notification message) to the Notification Service within the last h hours (for example, the last 12 hours). The status notification message may be used to inform the Notification Service 123 that the SMT 200 is still operational and is able to communicate with the Notification Service 123. The Notification Service 123 may be programmed to expect a status message from the SMT 200 according to programmed check-in timing. For example, the SMT may send a status message once every 12 hours or more (or less if desired).

Compatible with the Automatic Check-in feature, the Notification Service 300 may be programmed to send a notification message to the notification recipients associated with a particular SMT 200 if the Notification Service 300 expects to receive a status notification message from the SMT 200 and does not receive such message within a defined time period after missing one or more expected status message(s). This Automatic Check-in feature enables notification recipients to know whether the SMT 200 is operational (i.e., it is powered on and in communication with the Notification Service 123), or whether an operational problem or a communication problem between the SMT 200 and Notification Service 123 exists. The device programmed check-in timing (or, "heartbeat" timing) can be set at a rate such that the SMT 200 checks in with the Notification Service 300 once every several hours, once a day, once ever few day(s), etc., or other (potentially user-configured) period of time. The Automatic Check-in feature provides the advantage of balancing power saving methodologies with the occasional need for the Notification Service 300 to communicate and deliver messages to the SMT 200. Unlike traditional pageable cellular devices (such as cellular phones) that need to be pageable in order to receive phone calls and that require such device to communicate with the phone service provider network every 1.2 seconds (to let the nearest tower know where the device is), the SMT 200 can set a check-in period to be a much longer period of time (e.g., on the order of multiple hours or days versus seconds for traditional cellular devices) to enable the SMT 200 to conserve power. The SMT 200 need only register with the network so that the network bearers associated with the SMT 200 are set up, and then go into a standby mode and need not connect to a cellular site or the notification service until the SMT 200 needs to send a message.

Figure 16A:
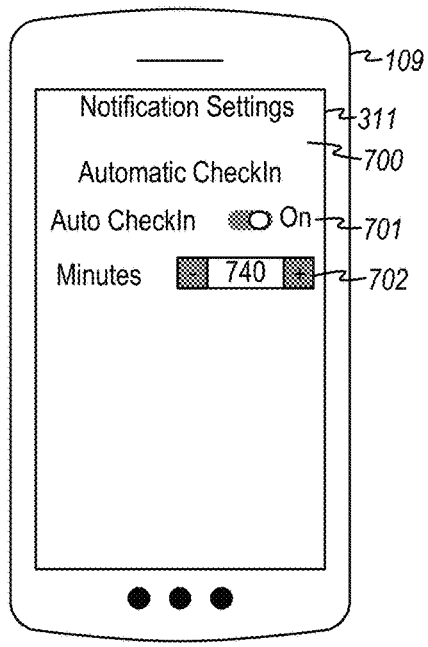
FIGS. 16A-16E are flowcharts illustrating an example implementation of an automatic check-in feature.
Figure 16B:
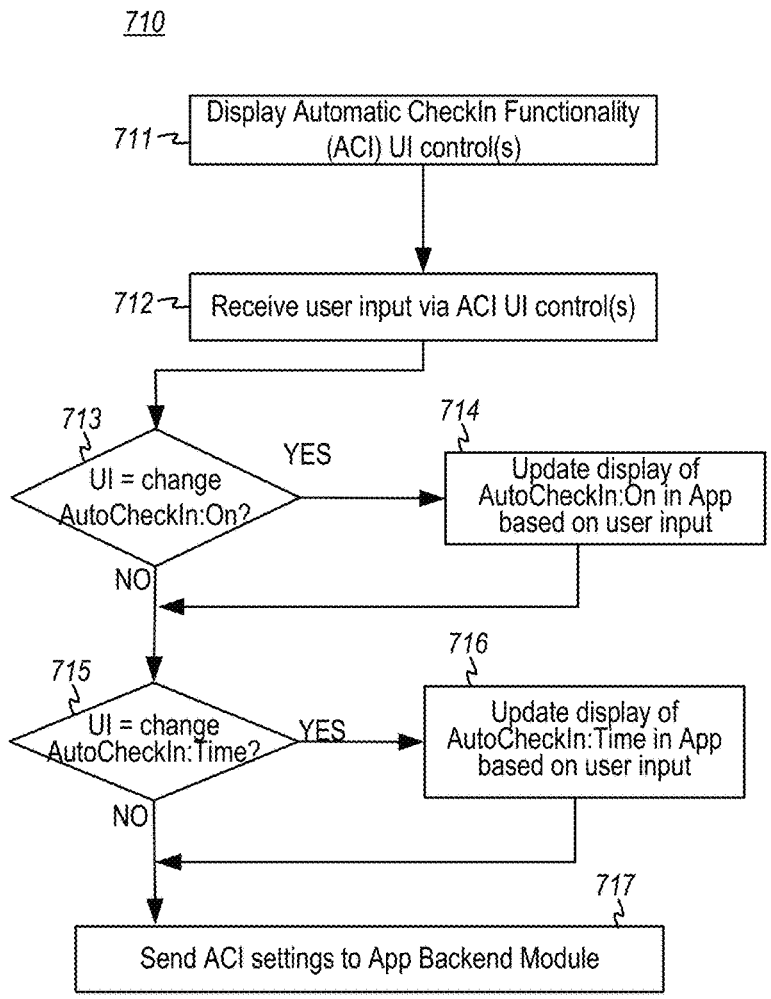

FIGS. 16A-16E depict an example implementation of an Automatic Check-in feature. FIG. 16A shows the App 311*a* executing in an end user's electronic device 109, displaying an Automatic Check user interface (UI) 700 that provides UI controls 701, 702 that allow a user to configure Automatic Check-in configuration settings. FIG. 16B shows a flowchart illustrating an example method 710 that may be executed in the App 311*a* running on the electronic device 109. As shown, the App 311*a* displays the Automatic Check-in (ACI) Functionality 700 with various UI controls 701, 702 (step 711) for receiving user input (step 712). Upon receiving user input, the App 311*a* processes and decodes the user input to determine which UI control sourced the user input (steps 713, 715) and update the display of the respective control 701, 702 based on the decoded user input (steps 714, 716). The App 311*a* formats the collected changes into a message and sends the User Configurable ACI settings to the App Backend Module 310. User configured AutoCheckIn settings are then sent to the App Backend Module (step 717).

Figure 16C:
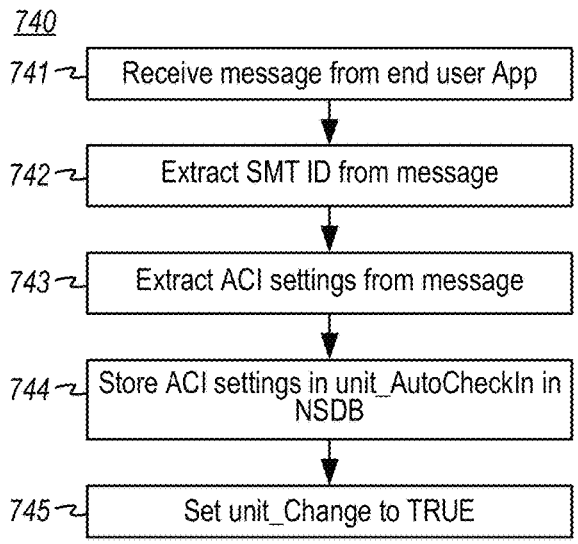

FIG. 16C illustrates an example embodiment of a method 740 that may be executed by the App Backend Module 310 communicating with the App 311*a* executing on the user's device 109. Upon receiving a message containing user configured AutoCheckIn settings from the App 311*a* (step 741), the App Backend Module 310 extracts from the received message the ID of the subscriber SMT 200 associated with the user of the App 311*a* (step 742) and the AutoCheckIn settings included in the message (step 743). The App Backend Module 310 processes, formats and stores the received AutoCheckIn settings (ACI settings) into the unit_AutoCheckIn field 382 in the Notification Service database 305 in the record 370 (FIG. 12) associated with the extracted subscriber SMT ID (step 744). The App Backend Module 310 also sets the unit_Change field 380 in the record 370 associated with the extracted subscriber SMT ID to TRUE (step 745) to signal the Notification Service 300 to send the User Configurable SMT settings (including the AutoCheckIn settings in unit_AutoCheckIn) to the SMT 200 the next time the SMT 200 connects to the Notification Service 300.

Figure 16D:
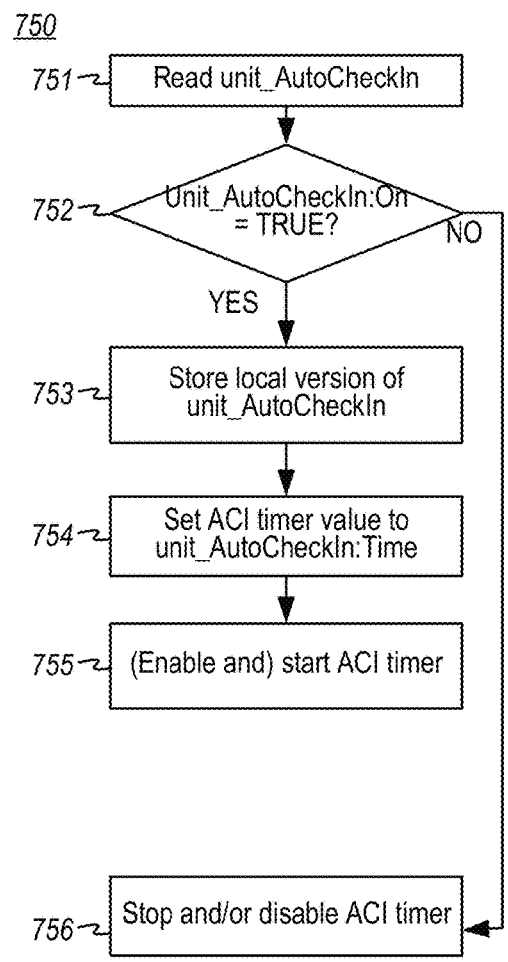

FIG. 16D illustrates an example embodiment of a method 750 that may be executed by the SMT 200 after connecting to the Notification Service 300 and receiving User Configurable SMT settings (including the AutoCheckIn settings in unit_AutoCheckIn). Upon receiving the User Configurable SMT settings from the Notification Service 300, the SMT 200 reads and/or decodes the AutoCheckIn settings from the received message (step 751) and determines whether AutoCheckIn is or should be in the On state (e.g., unit_AutoCheckIn:On=TRUE) (step 752). (In some embodiment(s), the On state is not configurable and AutoCheckIn is always On.) If AutoCheckIn is not currently in the Off state, or was but should be actively turned off, the SMT 200 stops and/or disables the AutoCheckIn timer (step 756). Otherwise, the SMT 200 stores the value of the unit_AutoCheckIn:Time (collected via UI control 702 in FIG. 16A) in local memory (step 753) and sets an AutoCheckIn (ACI) timer to count down a timer period equal to the time the user input via the UI control 702 (i.e., the value of unit_AutoCheckIn:Time) (step 754). The SMT 200 then enables (if not already enabled) and starts the ACI timer (step 755).

Figure 16E:
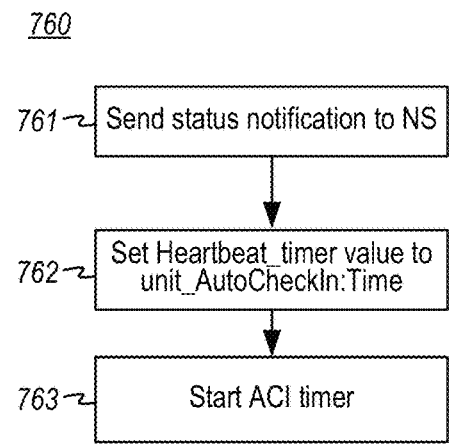

FIG. 16E shows an example method 760 of operation of the SMT 200 upon expiration of the ACI timer. As shown therein, the SMT 200 sends a status notification to the Notification Service 300 (step 761), then sets the value of the ACI timer to the time value indicated by unit_AutoCheckIn: Time (step 762) and restarts the ACI timer (step 753). In an embodiment, the ACI timer is also reset every time the SMT 200 sends an alert notification to the Notification Service 300.

Alert Delays

The SMT 200 and Notification Service 300 may together implement an Alert Delay feature which allows the SMT 200 to be programmed to delay sending of alert messages to the Notification Service 300 by a predetermined amount of time. In an embodiment, the Alert Delay feature allows selection of a Batch mode or an Ignore mode, discussed hereinafter. In an embodiment, the amount of delay time (or Alert Delay Time) is a user-configurable SMT setting. Alternatively, the Alert Delay Time may be pre-programmed by the manufacturer of the SMT and is not configurable by the user.

Figure 17A:
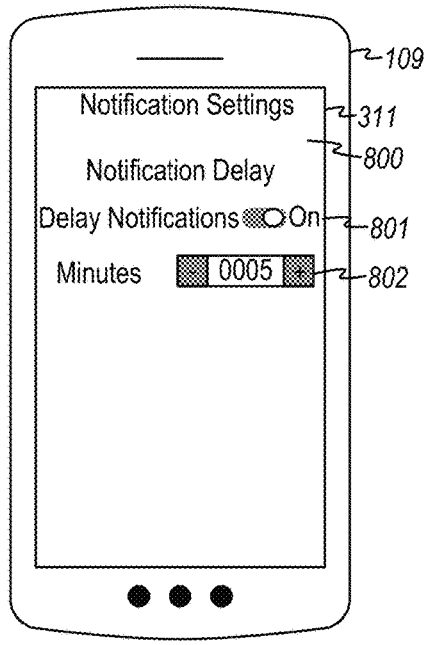
FIGS. 17A-17E are flowcharts illustrating an example implementation of an alert delay feature.
Figure 17B:
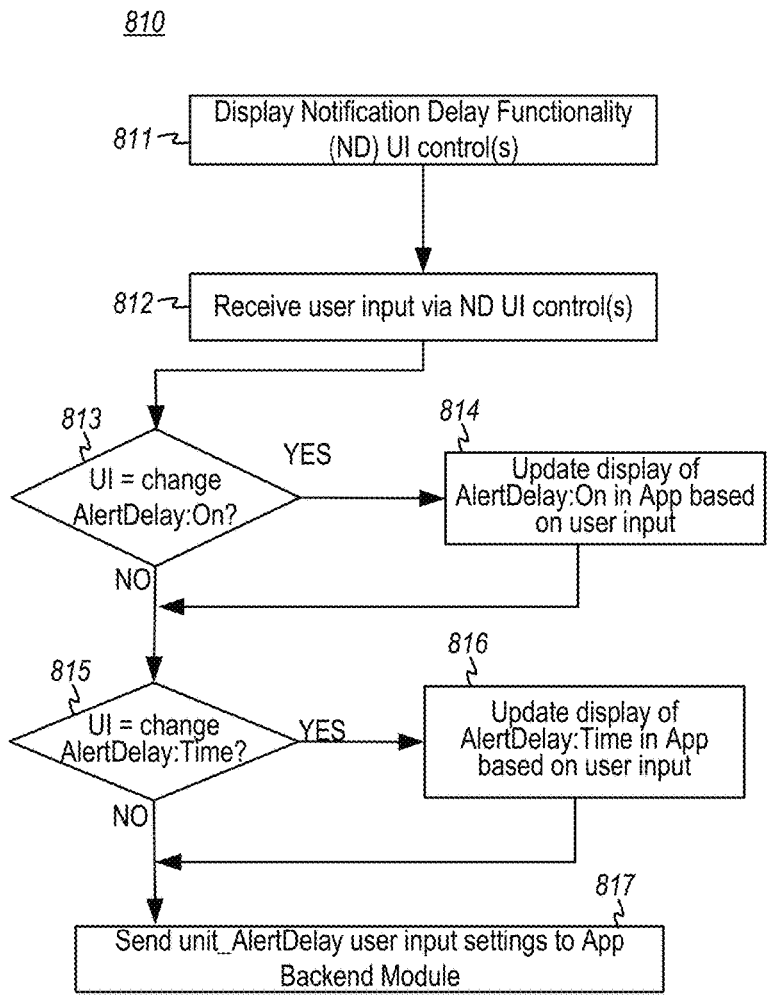

FIGS. 17A-17E depict an example implementation of a Alert Delay feature. FIG. 17A shows the App 311*a* executing in an end user's electronic device 109, displaying an Alert Delay feature user interface (UI) 800 that provides UI controls 801, 802 that allow a user to configure the Alert Delay Time setting(s). FIG. 17B shows a flowchart illustrating an example method 810 that may be executed in the App 311*a* running on the electronic device 109. As shown, the App 311*a* displays the Alert Delay UI 800 with various UI controls 801, 802 (step 811) for receiving user input (step 812). Upon receiving user input, the App 311*a* processes and decodes the user input to determine which UI control sourced the user input (steps 813, 815) and update the display of the respective control 801, 802 based on the decoded user input (steps 814, 816). The App 311*a* formats the collected changes into a message and sends the User Configurable Alert Delay settings to the App Backend Module 310. User configured Alert Delay settings are then sent to the App Backend Module (step 817).

Figure 17C:
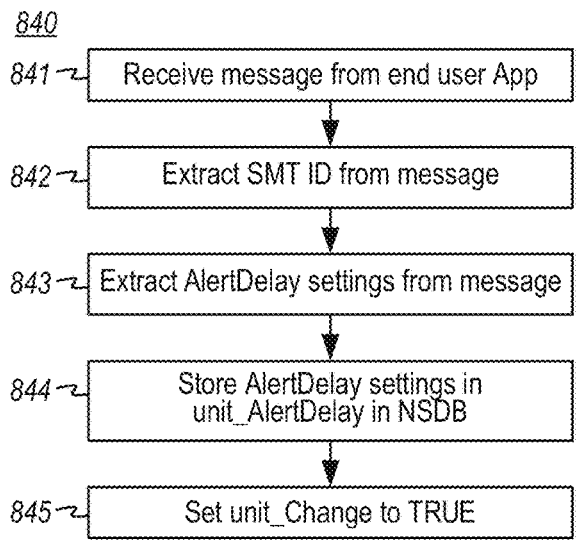

FIG. 17C illustrates an example embodiment of a method 840 that may be executed by the App Backend Module 310 communicating with the App 311*a* executing on the user's device 109. Upon receiving a message containing user configured Alert Delay settings from the App 311*a* (step 841), the App Backend Module 310 extracts from the received message the ID of the subscriber SMT 200 associated with the user of the App 311*a* (step 842) and the Alert Delay settings included in the message (step 843). The App Backend Module 310 processes, formats and stores the received Alert Delay settings into the unit_AlertDelay field 383 in the Notification Service database 305 in the record 370 associated with the extracted subscriber SMT ID (step 844). The App Backend Module 310 also sets the unit_Change field 380 in the record 370 associated with the extracted subscriber SMT ID to TRUE (step 845) to signal the Notification Service 300 to send the User Configurable SMT settings (including the Alert Delay settings in unit_AlertDelay) to the SMT 200 the next time the SMT 200 connects to the Notification Service 300.

Figure 17E:
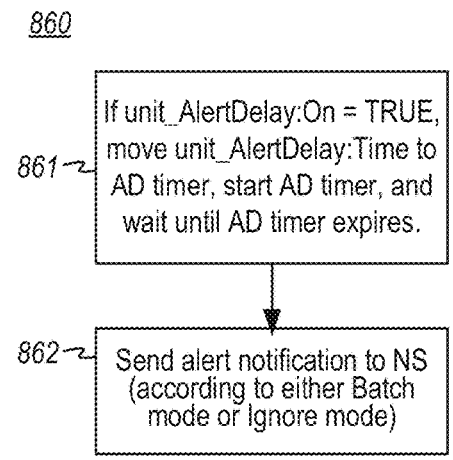
Figure 17D:
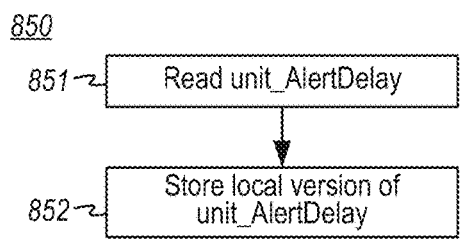

FIG. 17D illustrates an example embodiment of a method 850 that may be executed by the SMT 200 after connecting to the Notification Service 300 and receiving User Configurable SMT settings (including the Alert Delay settings in unit_AlertDelay). Upon receiving the User Configurable SMT settings from the Notification Service 300, the SMT 200 reads and/or decodes the Alert Delay settings from the received message (step 851) and locally stores the Alert Delay settings (step 852).

When the SMT 200 receives an alert notification, the SMT 200, as shown in the method 860 of FIG. 17E, first checks to see if the unit_AlertDelay:On is TRUE, and if so, moves unit_AlertDelay:Time to an Alert Delay (AD) timer, starts the AD timer, and wait until the AD timer expires (step 861). Upon expiration of the AD timer, the SMT 200 then sends the alert notification message to the Notification Service 300 (step 862), thereby effecting a transmission delay in notifying the Notification Service 300. While the ND timer is counting down, additional sensor alerts may either be ignored or batched and transmitted as a batch in step 862 (which may be implemented with controls and logic similar to respective controls 502a, 602 and respective logic 562a and 661-663 of respective FIGS. 14a and 14E, and FIGS. 15a and 15E).

Battery Saving Mode

The SMT 200 and Notification Service 300 may together implement a Battery Saving Mode (BSM) which can automatically turn on after a predetermined number of alerts and once BSM is activated, operates to delay the transmission of alert notification messages to the Notification Service by a predefined amount of time. In an embodiment, number of sensor alerts and/or the amount of notification delay time (or BSM time) are User Configurable SMT settings. Alternatively, the BSM settings may be pre-programmed by the manufacturer of the SMT and not configurable by the user.

Figure 18A:
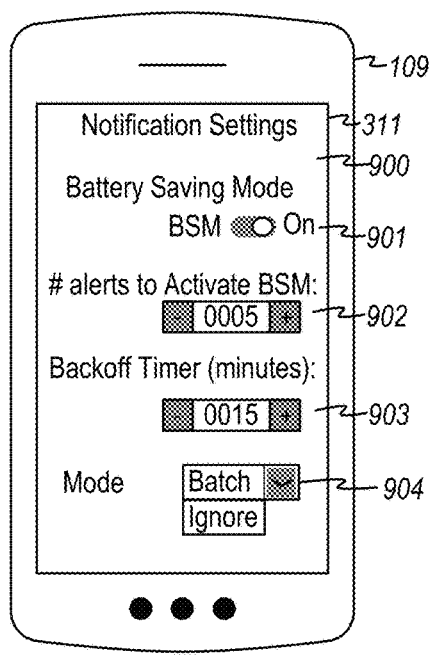
FIGS. 18A-18G are flowcharts illustrating an example implementation of a battery saving mode feature.
Figure 18B:
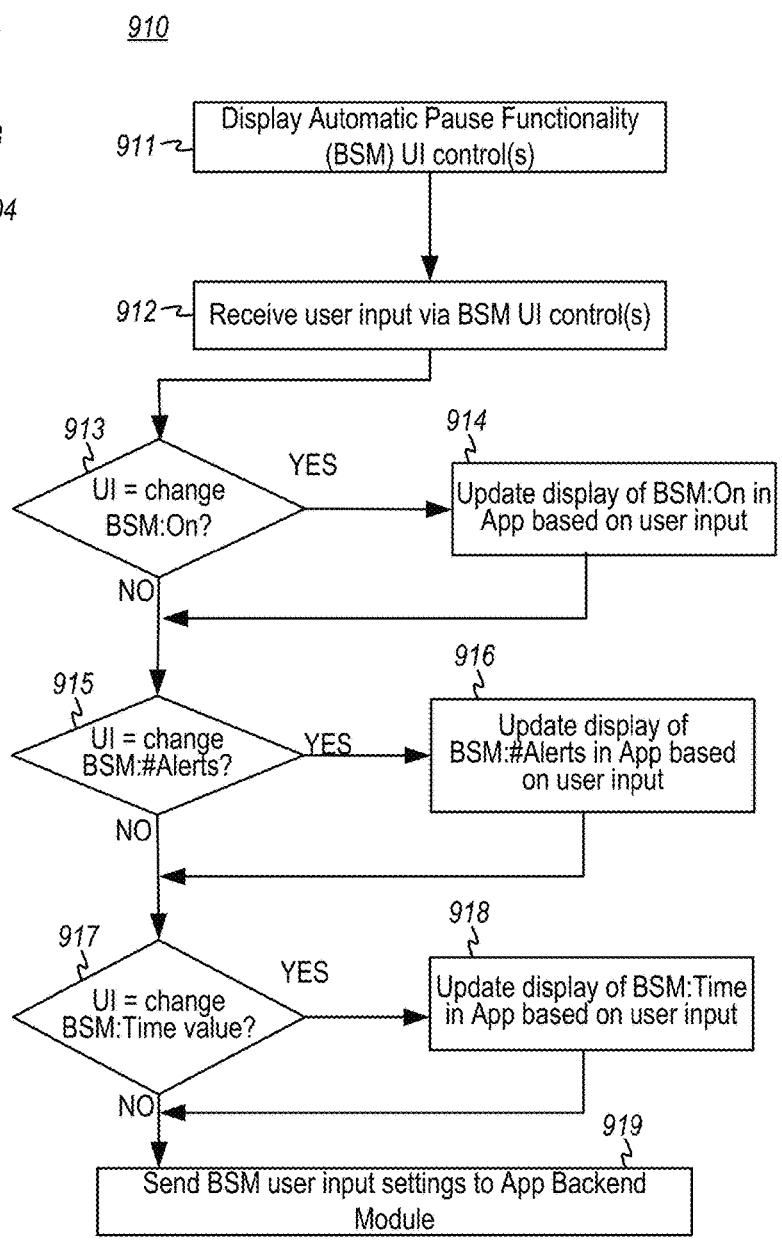

FIGS. 18A-18E depict an example implementation of a Battery Saving Mode feature. FIG. 18A shows the App 311a executing in an end user's electronic device 109, displaying a BSM user interface (UI) 900 that provides UI controls 901, 902, 903 that allow a user to configure the BSM setting(s). FIG. 18B shows a flowchart illustrating an example method 910 that may be executed in the App 311a running on the electronic device 109. As shown therein, the App 311a displays the BSM Functionality UI 900 with various UI controls 901, 902, 903 (step 911) for receiving user input (step 912). In an embodiment, the controls include BSM:On 901 corresponding to the control that allows the user to turn the BSM feature on or off, BSM:#Alerts 902 corresponding to the number of alerts that the SMT 200 must receive within a preprogrammed time period (e.g., 15 minutes) prior to activating BSM, and BSM:Time 903 corresponding to the amount of time that the SMT 200 should delay notifying the Notification Service 300 of the next alert should one or more sensor alerts be received by the SMT 200 during the delay period. The BSM UI 900 also includes a mode control 904 that allows a user to select whether to store subsequent alerts and send all to the Notification Service when the SMT 200 next connects to the Notification Service 300 at the expiration of the BSM:Time value ("Batch" mode), or to ignore alerts received during the delay period ("Ignore" mode). Upon receiving user input, the App 311a processes and decodes the user input to determine which UI control sourced the user input (steps 913, 915, 917) and update the display of the respective control 901, 902, 903 based on the decoded user input (steps 914, 916, 918). The App 311a formats the collected changes into a message and sends the User Configurable Alert Delay settings to the App Backend Module 310. User configured Alert Delay settings are then sent to the App Backend Module (step 919).

Figure 18C:
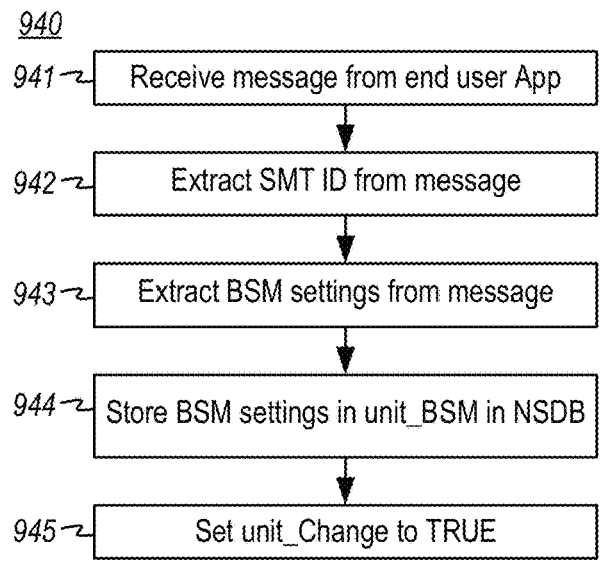

FIG. 18C illustrates an example embodiment of a method 840 that may be executed by the App Backend Module 310 communicating with the App 311a executing on the user's device 109. Upon receiving a message containing user configured BSM settings from the App 311a (step 941), the App Backend Module 310 extracts from the received message the ID of the subscriber SMT 200 associated with the user of the App 311a (step 942). The App Backend Module 310 processes, formats and stores the received BSM settings into the unit_BSM field 388 in the Notification Service database 305 in the record 370 associated with the extracted subscriber SMT ID (steps 943 and 944). The App Backend Module 310 also sets the unit_Change field 380 in the record 370 associated with the extracted subscriber SMT ID to TRUE (step 945) to signal the Notification Service 300 to send the User Configurable SMT settings (including the BSM settings in unit_BSM) to the SMT 200 the next time the SMT 200 connects to the Notification Service 300.

Figure 18E:
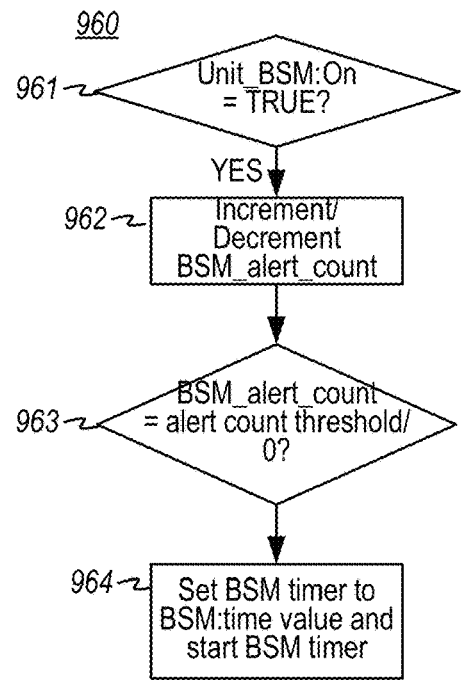
Figure 18D:
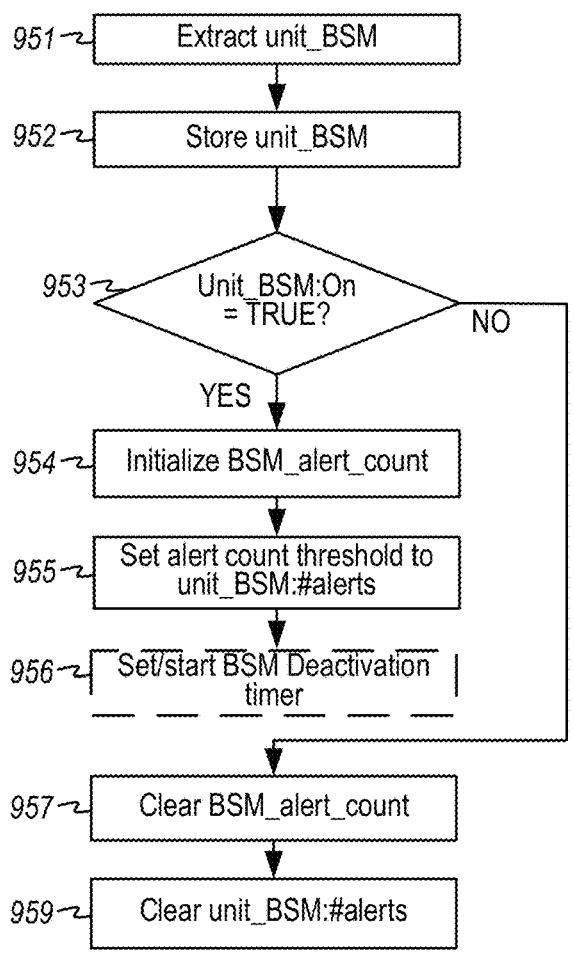

FIG. 18D depicts an example embodiment of a method 950 that may be executed by the SMT 200 after connecting to the Notification Service 300 and receiving User Configurable SMT settings (including the BSM settings in unit_BSM). Upon receiving the User Configurable SMT settings from the Notification Service 300, the SMT 200 extracts the BSM settings from the received message (step 951) and locally stores the BSM settings (step 952). The SMT 200 may check to see if the user has turned on the BSM feature (step 953) and if not, the SMT 200 does not execute the BSM feature, but may clear the local BSM variables (steps 956, 957). If the BSM feature has been turned on, the SMT 200 initializes an alert counter to zero (if counting up), or to the alert count BSM_alert_count if counting down (step 954) and, if counting up, sets the value of a count threshold variable, BSM_count_threshold, to the value of unit_BSM:alert_count (step 955).

FIG. 18E illustrates an example method 960 that the SMT 200 may perform upon receiving a sensor alert and prior to sending an alert notification to the Notification Service 300. As shown, the SMT 200 checks to see if the unit_BSM:On is TRUE (step 861), and if so, increments the BSM_alert_count variable if counting up, or decrements the BSM_alert_count if counting down (step 962). If counting up, and the value of the BSM_alert_count variable has reached (or exceeds) the alert count threshold value, or if counting down and the value of the BSM_alert_count has reached 0 (step 963), the SMT 200 sets a BSM timer value to the value of unit_BSM:Time, and then starts the BSM timer (step 964). The SMT 200 may continue operating as normally, including going into PSM until a sensor alert or the BSM timer (or Check-in timer) wakens it.

Figure 18F:
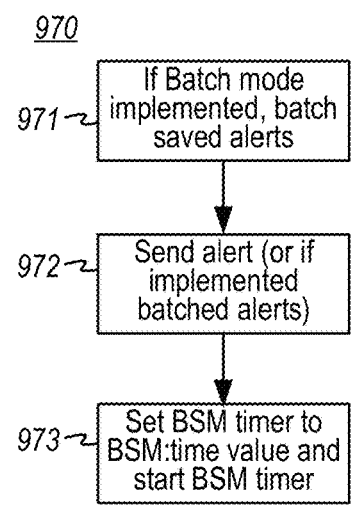
Figure 18G:

FIG. 18F shows a method 970 that the SMT 200 executes when the BSM timer expires. As illustrated, if Batch mode is True, the SMT 200 batches any saved alerts with the current sensor alert (step 971). The SMT 200 then sends the current alert (or, if Batch mode is True, sense the batched set of alerts) to the Notification Service 300 (step 972), sets the BSM timer to the BSM:time value and restarts the BSM timer (step 973).

Optionally, the BSM may be programmed to set a BSM deactivation timer (step 956 in FIG. 18D) in order to reset the BSM mode once every predefined time period. The BSM deactivation feature may be desirable to reset the SMT 200 to begin notifying the Notification Service 300 again on every sensor alert. An example use case may be that the SMT 200 is attached to a trap 2 that is being transported, but has for whatever reason not been powered off, causing a movement sensor to repeatedly send sensor alerts to the SMT controller 201. Once the trap 2 has arrived at a resting location, the sensor alerts cease due to lack of movement activity at the trap 2; further sensor alerts will typically indicate that "interesting" activity, or activity of interest to the subscriber of the Notification Service is occurring at the trap 2. In this example situation, the BSM may have been activated during transport, and unless BSM is deactivated once the trap is in its resting location, the Notification Service will receive only delayed sensor alerts going forward from the time the BSM was activated. Such situation may not be ideal to the subscriber of the Notification Service 300, since once a burst of activity has ended, the next burst of sensor alert activity may indicate a new cause for the activity—that is the new burst of activity may be unrelated to the previous burst of activity, and may of interest to the user. Such user may desire to be notified without delay when a new burst of activity begins. Accordingly, in a preferred embodiment, the SMT 200 is preprogrammed to deactivate BSM once every predefined interval of time (for example, once every 24 hours, once every 3 hours, or other time period that strives to meet the objective of balancing between over-notification due to a burst of activity at the trap, and timely notification when new activity is detected. To this end, when the SMT 200 sets up the BSM (steps 953-955 of FIG. 18D), the SMT 200 may also set a BSM Deactivation timer to the predefined interval of time, and then start the timer (step 956). Once the BSM Deactivation timer expires, the SMT 200 executes a service routine 980 whereby it clears the BSM_alert_count (step 981) to deactivate BSM so that it will send alert notification messages to the Notification Service on every sensor alert unless and until BSM is turned off or the number of alerts reaches the alert count threshold as set in BSM:#Alerts 902 during the BSM deactivation time interval as set in BSM:Time 903.

Figure 19:
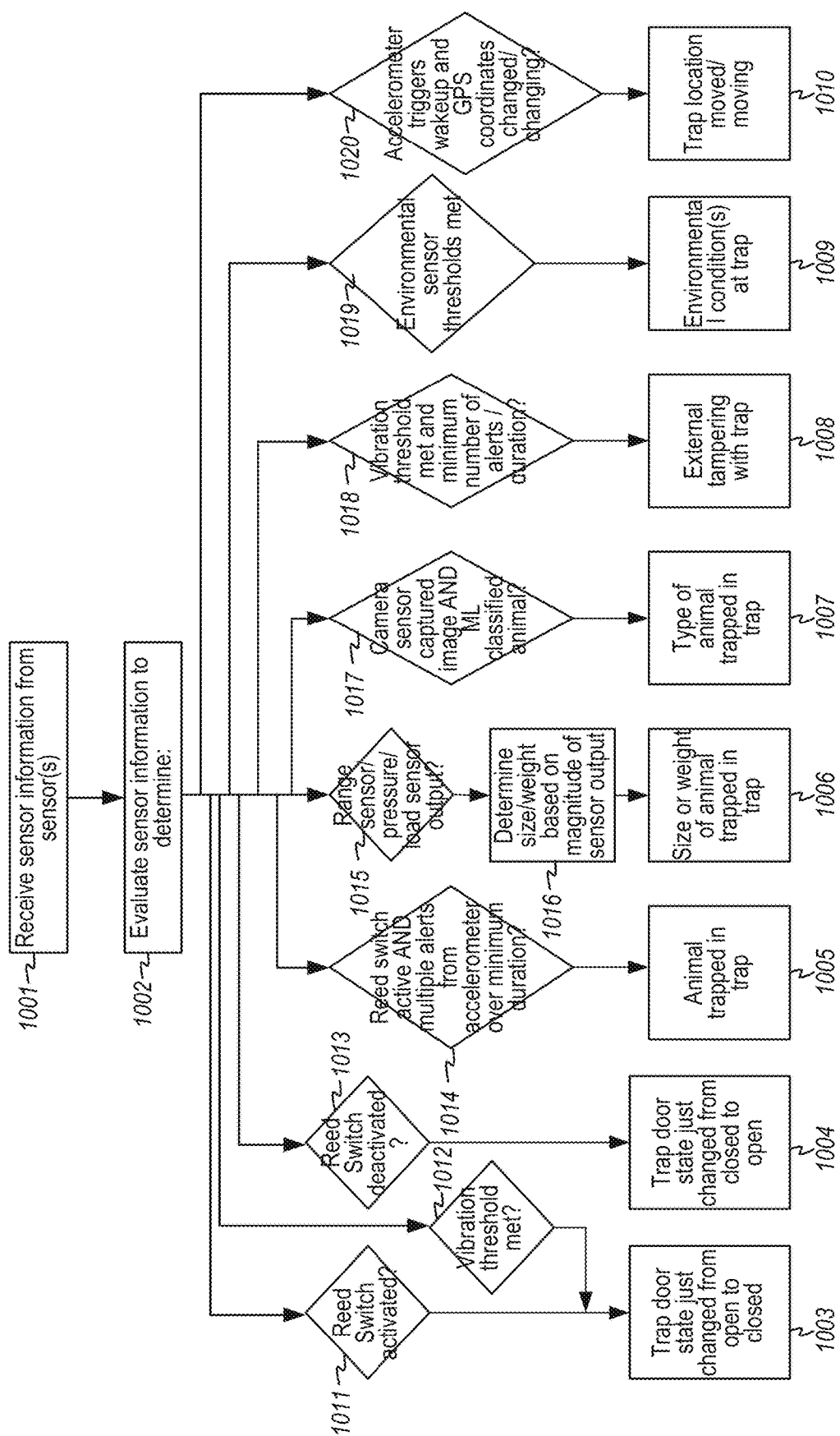
FIG. 19 is a flow diagram illustrating various activities that can be determined based on sensor alerts that the SMT receives from its sensors.

FIG. 19 is a flow diagram illustrating various activities that either the SMT 200 can determine based on sensor alerts it receives from sensor(s) 206. Alternatively, the notification service 300 can determine the various activities based on the sensor-sourced alert information it receives from alert messages from the SMT 200. As illustrated in FIG. 19, the method comprises receiving sensor information from or concerning the SMT sensor(s) 206 (or from sensor remote to the SMT, as discussed hereinafter) (step 1001), and evaluating the received sensor information to determine one or more types of activities or states (step 1002). The type of activities or states may include: a Trap Door Closed activity (i.e., the trap door recently changed from an open state to a closed state) (step 1003); a Trap Door Opened activity (i.e., the trap door recently changed from a closed state to an open state) (step 1004); an Animal Trapped state (i.e., an animal is detected as trapped in the trap 2) (step 1005); an Animal Size state (i.e., a determination of a size or weight of a trapped animal) (step 1006); an Animal Type state (i.e., a determination of a type of animal trapped in the trap) (step 1007); a Tamper Activity state (i.e., activity is detected at the trap that may not yet have amounted to trapping of an animal) (step 1008); one or more Environmental Condition Status(s) at the trap (i.e., temperature, humidity, detection of rain, snow, hail, wind, etc. at the trap) (step 1009); Location Change activity (i.e., change in geo-location of the trap) (step 1010). It is to be understood that the activities and states 1002-1010 are exemplary and not limiting to the spirit and scope of the invention.

To determine the activities or states, the controller 201, or the notification service 300 uses information detected by the sensors 206. Different and various sensors 206 may be implemented at the SMT 200 to detect all of the states. In an exemplary embodiment, the SMT 206 includes a reed switch 4b, an accelerometer 4a, a range sensor (not shown), a load sensor (not shown, such as a pressure sensor, a capacitive load sensor, etc.), a camera sensor, a GPS transceiver, and sensor(s) that sense environmental conditions of interest. The following determination methods are presented herein as exemplary and it is to be understood that many different state or activity determination methodologies can be implemented to detect the various states and activities of interest at the trap 2.

In an embodiment, SMT 206 determines presences of a Trap Door Closed activity (i.e., the trap door recently changed from an open state to a closed state) (step 1003) upon receiving an alert from the reed switch that the reed switch activated (i.e., sufficient magnetic field due to proximity of reed switch and magnet) (step 1011).

In an alternative embodiment, SMT 206 determines presences of a Trap Door Closed activity (i.e., the trap door recently changed from an open state to a closed state) (step 1003) upon receiving an alert from the accelerometer that it has detected vibration above a predetermined threshold (step 1012). The threshold may be set to a level that is met or exceeded upon the closing of the movable trapping member 3f, and that is above a level that normal weather or other vibrational movement would not reach the vibrational threshold. It is known that many snap traps or trigger-based traps cause a loud bang or experience a large force when such trap is triggered. For example, a load plate (not shown) may sit atop a door release mechanism (not shown) in the trap 2, and when an animal steps on the load plate, the door is may be pulled shut with a large force under the tension of a spring (not shown). Other trap mechanisms also typically close the trap on an animal with significant force in order to ensure the movable trapping member is caught by a catch mechanism to secure the trapping member in the closed position. Accordingly, in an embodiment, the SMT 200 may include an accelerometer or microphone that is triggered by a predetermined level of vibration or sound magnitude, and if so, the controller 201 may determine that the Closed Door Activity has occurred (step 1012 and 1003).

In an embodiment, SMT 206 determines presence of a Trap Door Opened activity (i.e., the trap door recently changed from a closed state to an open state) (step 1004) upon receiving an alert from the reed switch that the reed switch deactivated (i.e., the reed switch and magnet are no longer in proximity to one another) (step 1013).

In an embodiment, SMT 206 determines an Animal Trapped state (i.e., an animal is detected as trapped in the trap 2) (step 1005) upon receiving multiple alerts over a predetermined time duration after the Trap Door Closed activity is detected) (step 1014).

In an embodiment, SMT 206 determines an Animal Size state (i.e., a determination of a size or weight of a trapped animal) (step 1006) upon receiving an alert from a size or weight sensor (such as, but not limited to, one or more of a range sensor, a PIR sensor, a load sensor, a pressure sensor, etc.) (step 1015) and then based on the sensor signal (e.g., the magnitude represented by the signal), determining the size and/or weight of the animal in the trap (step 1016).

In an embodiment, SMT 206 determines an Animal Type state (i.e., a determination of a type of animal trapped in the trap) (step 1007) upon receiving an image of the animal in the trap (captured by, for example, a camera sensor) and processing the image with an image classifier (through, for example machine learning or other artificial intelligence or image processing) (step 1017) to classify the object in the image as one of a plurality of different animals (step 1007).

In an embodiment, SMT 206 determines a Tamper Activity state (i.e., activity is detected at the trap that may not yet have amounted to trapping of an animal) (step 1008) upon receiving a predetermined number of accelerometer alerts indicating detection of vibration above a predetermined threshold, the alerts received within a predetermined duration of time (step 1018).

In an embodiment, SMT 206 determines one or more Environmental Condition Status(s) at the trap (i.e., temperature, humidity, detection of rain, snow, hail, wind, etc. at the trap) (step 1009) upon receiving sensor alerts indicating detection of specific monitored environmental conditions by appropriate sensors that can detect such specific environmental conditions (step 1019). For example, a monitored condition may be temperature above a predetermined threshold, and the sensor may be a thermo-sensor that can generate an output signal indicating the temperature has met or exceeded the threshold.

In an embodiment, SMT 206 determines Location Change activity (i.e., change in geo-location of the trap) (step 1010) by enabling a GPS transceiver at the SMT (see 1100 in FIG. 20), recording the GPS coordinates, and comparing the recorded GPS coordinates to previously recorded GPS coordinates (step 1020), and determining that there has been Location Change activity if there is a difference in the presently recorded GPS coordinates and the previously recorded GPS coordinates (step 1010).

Referring again to FIG. 5, SMT 200 may include a location information transceiver 209 which receives location information from a satellite system such as GNSS or from another geolocation system such as a LoRa, cellular or WiFi network, and extracts location information such as longitude and latitude, GPS coordinates, or other labeled geolocation identifier(s). In an embodiment, the location information transceiver 209 comprises a GNSS transceiver which receives Global Positioning System (GPS) signals from the Global Navigational Satellite System and extracts the GPS coordinates. When location information is collected, the controller 201 may store the location information in the computer memory 202 and/or may compare it to previously stored location information to determine whether the trap 102 has moved from the location indicated by the previously stored location information. Thus, in an embodiment, the SMT 200 may include only the location information transceiver 209 and not the accelerometer 206a, while the movement detection device 206 may be a processor such as a CPU and programming instructions which implement the location comparison between a previously stored location value and a current location value based on the location information extracted from the location transceiver 209 via a transceiver antenna 209a. In an alternative embodiment, the SMT 200 includes both the accelerometer 206a and the location transceiver 209, whereby after the trap 102 is placed in a low power mode initial vibrational movement of the trap 102 is first detected by the accelerometer to alert and wake up the controller 201 to turn on full power mode to the controller 201, cellular modem 203 and location transceiver 209 to obtain current location information and send the current location information as part of the message payload when sending the alert message to the Notification Service 107. Thus, if and when the trap 102 is moved, the movement will trigger an alert message to the Notification Service 107, whereby the alert message will indicate not only that the SMT 105 of the trap 102 has detected movement of the trap 102, but also indication of current location information of the trap 102.

When location information 33 is included in the alert message 30, the control module 301 may pass the location information extracted from the message payload 30 to a mapping module 312. The mapping module 312 may combine the location information with a map image or map file or mapping information to generate a visual map image for display on a web page or in an app 311a, in order to provide a visual indicator indicating the location of the trap 102 on the map. In an embodiment, the end user app 311a displays the visual map with visual indicator of the location of the trap 102.

If the SMT 200 is not equipped with the location information transceiver 309, location information may be entered manually using the app 311a or a web portal (not shown) which allows the person installing the trap 102 in a location to enter labeled information (such as street address, location within building, manually determined location information, etc.). Alternatively, the person installing the trap 102 may use a GPS-enabled device such as their smartphone to determine location information. For example, the user of the app 311a on a smartphone can use native device code (for either IOS or Android or another device operating system) to obtain longitude and latitude. The end user typically must accept the use of location services for the feature to be enabled. Once the end user enables the feature they can then use a mapping service such as a "Google Maps" overlay which will send the longitude and latitude via an API which will then return and display the location on a map on the screen of the user's device. The end user may also choose to use Google Maps without an API call and set a "map pin" manually which can be stored in the subscriber database associated with the SMT 200 device ID to see the last known static location.

Figure 20:
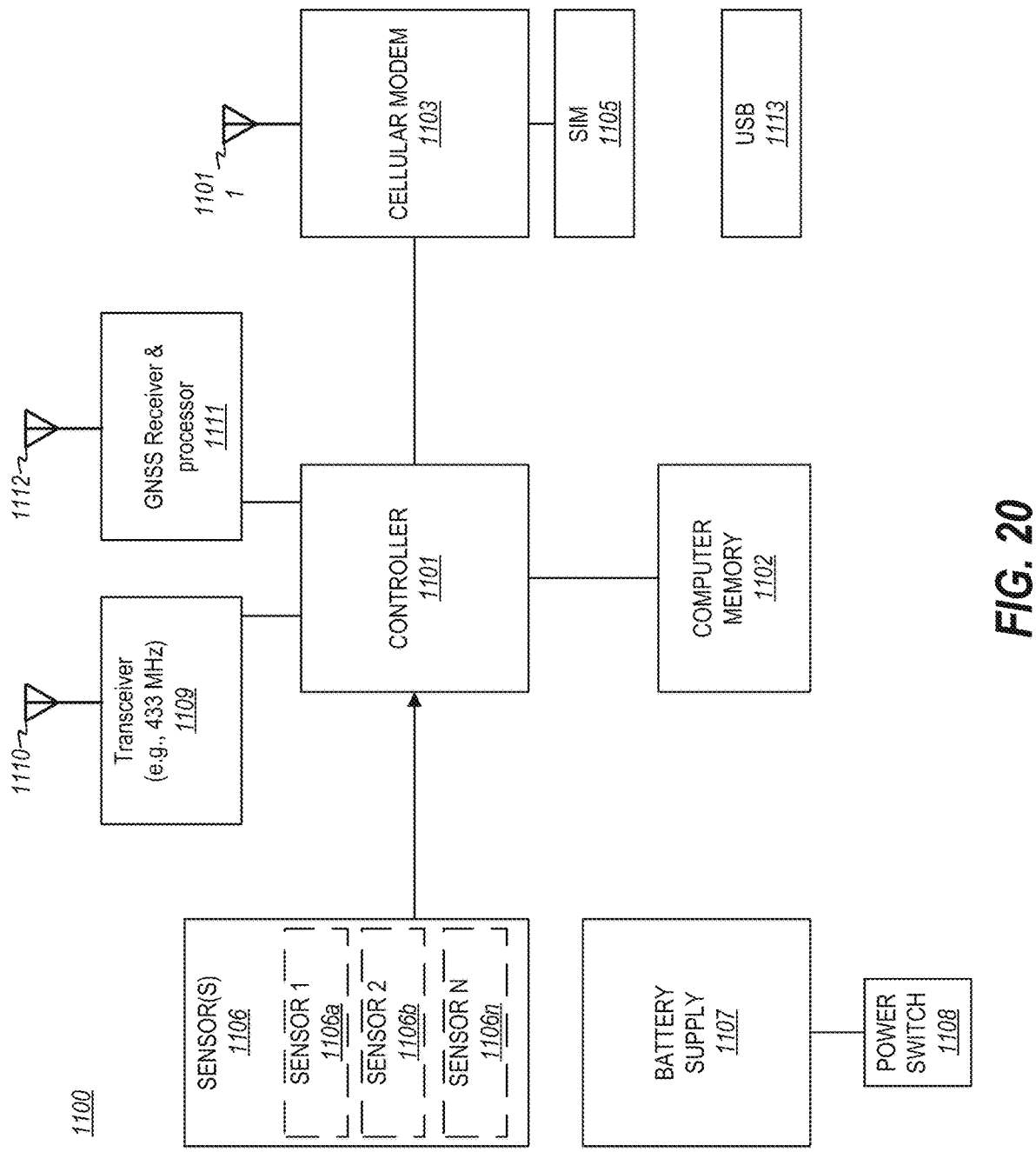
FIG. 20 is a block diagram of an exemplary embodiment of an SMT hub.

FIG. 20 is a block diagram of an SMT hub 1100. In this embodiment, the SMT hub 1100 includes a controller 1101 such as but not limited to a microcontroller, a microprocessor, an FPGA, a CPU, etc., along with computer readable storage memory 1102, a cellular modem 1103 with antenna 1104, a SIM 1105, a battery supply 1107 and a power switch 1108. Additionally, the SMT hub 1100 may include one or more integrated sensors 1106a, 1106b, 1106n (collectively 1106) that sense, and/or sense and process, an environment, to respectively detect a respective predefined condition and to alert the controller 1101 upon detection of such predefined condition. Sensors 1106 may be directly electrically coupled to the controller 1101. For example, each of sensors 1106 may have a corresponding alert output that electrically connects, directly or indirectly through additional circuitry, to one or more interrupt ports of the controller 1101. Corresponding interrupt service routines within the program code of the controller 1101 (which may be stored in memory 1102) implement control logic for processing the alert, decoding the alert (if necessary), determining whether to send an alert message to an external Notification Service (such as Notification Service 123) in cooperation with the cellular modem 1103 over an LPWAN. In an embodiment, the SMT hub 1100 does not include any integrated sensors 1106 but communicates with remote sensors, as described below.

Figure 21:
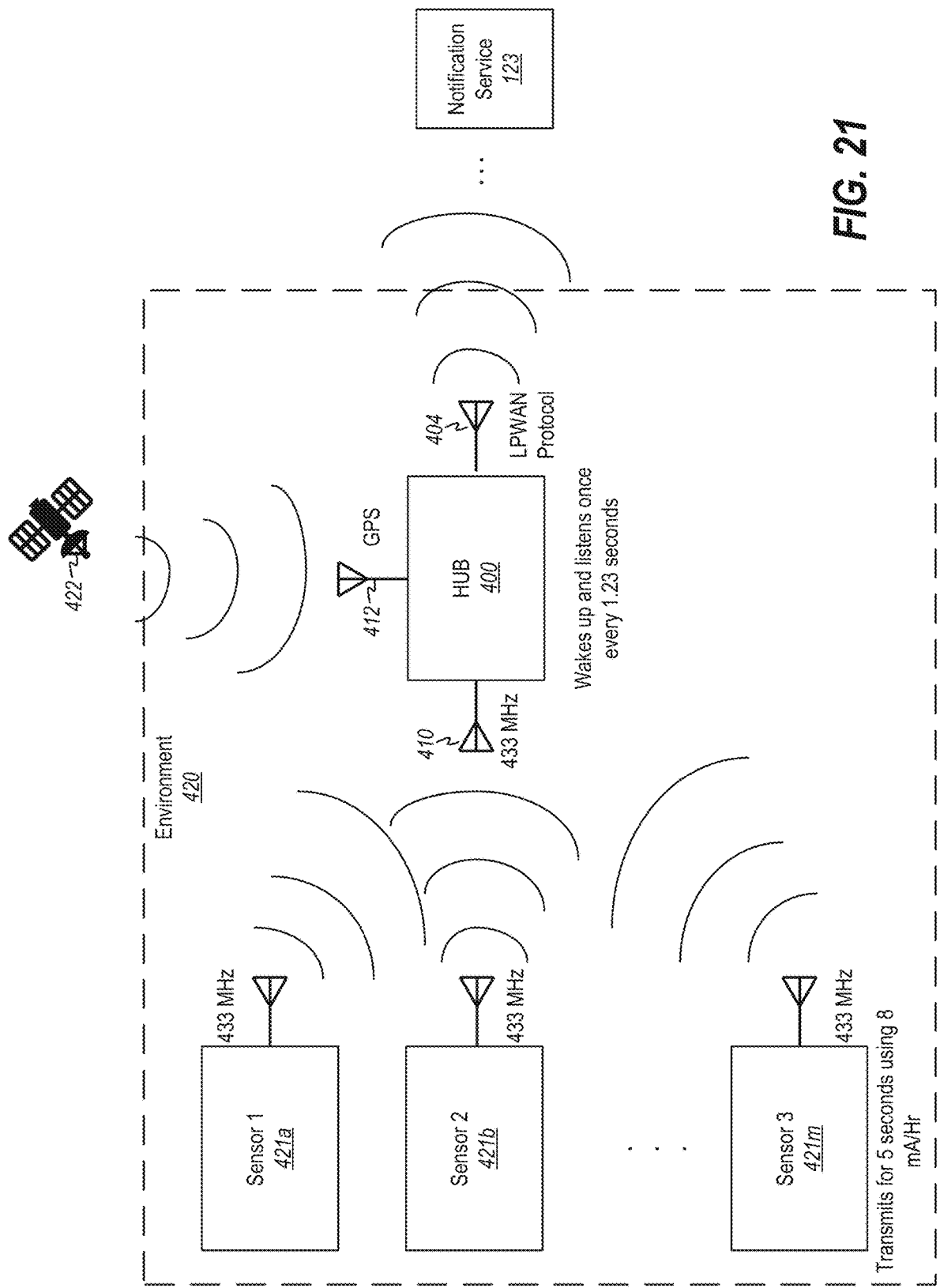
FIG. 21 is a block diagram of a network environment in which an SMT hub operates.

In an embodiment, the SMT hub 1100 includes a local area transceiver 1109, such as a 433 or 914 MHz transceiver, equipped with an antenna 1110. With reference to FIG. 21, in an embodiment where the SMT hub 1100 is equipped with a local area transceiver 1109, the SMT hub transceiver 1109 listens for signals from remote sensors 1121a, 1121b, 1121m (collectively 1121) located in the proximate environment 1120 where the SMT hub 1100 can pick up the local signal(s) transmitted over the local area antenna(s) from the sensor(s) 1121. In an embodiment, the SMT hub local area transceiver 1109 (FIG. 21) is a receiver only, and only receives signals from the remote sensors 1121 and does not communicate out to the remote sensors 1121. In an embodiment, any number of remote sensors 1121 may transmit alerts and the SMT hub may process alerts sent by any number of remote sensors 1121. In this way, the SMT hub 1100 can be configured to operate as a gateway for the remote sensors 1121 (and for other hubs, if desired) to the Notification Service 123 for sending out alert notifications to notification recipients.

In an embodiment, to conserve power, the transceiver 1109 is a low power transceiver that when not active enters a power saving mode (PSM) and "wakes up" periodically (for example, every second or every few seconds) to listen for a message from a remote sensor unit 421. The remote sensor unit 421 may be configured to transmit for a few times longer than the period the transceiver wake period, so that the SMT is guaranteed to be in a wake period at least once during the sensor transmission period. In order to conserve battery life, both the transceiver 1109 of the SMT hub 400 and the sensor unit 421 automatically go into a PSM state when not transmitting or when not in a wake period. Further to conserve power, the transceiver component of the SMT hub 400 and the components of the sensor unit 421 each comprises a low-power electronic component.

Figure 22:
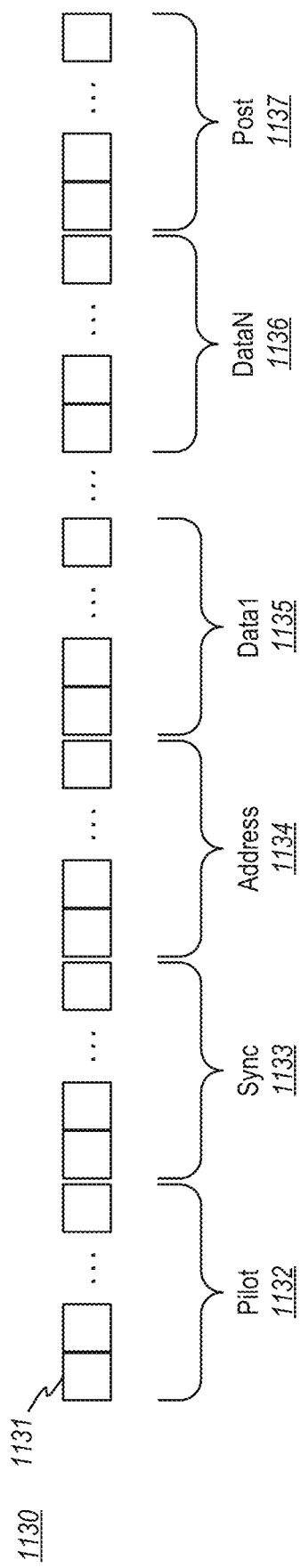
FIG. 22 is a high-level exemplary format of a message that is transmitted by a remote sensor.

FIG. 22 depicts an example high-level format of a message that is transmitted by a remote sensor 1121*a*, 1121*b*, 1121*m* to the SMT hub 1100. As illustrated, the message comprises a plurality of binary bits, and includes a number of bits referred to as a pilot period 1132 which the local transceiver 1109 on the SMT hub 1100 uses to trigger the start of a potential message. The message format 1130 further includes a synchronization period comprising a known pattern of bit values used by the SMT hub 1100 to synchronize the receiver with the incoming data stream. Following the sync period, in an embodiment, the message contains an address period, where the sensor broadcasts an address recognizable by the SMT hub 1100. A number of data periods, containing at least sensor identification data (such as its serial number, the type of the sensor, and a number of status and/or control bits from which the controller 1101 can identify which sensor is sending the message, and what its status is and/or whether it needs to perform any control operations (such as updating firmware, notifying of a low battery condition, etc.). Following the data periods 1134, 1135, 1136, the SMT hub 1100 transmits a Post code which indicates that the communication is complete.

Returning to FIG. 20, in an embodiment, the SMT hub 1100 comprises a Global Navigation Satellite System receiver (and processor) 1111 (such as one capable of acquiring and processing signals from the Global Positioning System (GPS), GLONASS, Galileo, Beidou and other regional satellite navigation systems) to determine location of the SMT hub 1100 using time signals transmitted via satellite radio waves along a line of sight. In an embodiment, the GNSS receiver is integrated into the same integrated circuit chip as the cellular modem 1103. For example, in one embodiment, the cellular modem 1103 and GNSS Receiver 1112 are implemented using a Quectel BG96, as detailed previously. In an embodiment, the controller 1101 may turn on the GNSS receiver periodically to acquire the current position of the SMT hub 1100. In an embodiment, when an alert message is formulated and sent to the Notification Service 123, the controller obtains the current (or most recent) geo-spatial position of the SMT hub 1100 as acquired by the GNSS Receiver and processor 1111, and includes the current (or most recent) location coordinates in the payload of the alert message that it sends to the Notification Service 123. The Notification Service 123 may use the geo-spatial position coordinates to as data input to its control logic. Alternatively, the Notification Service 123 may include the geo-spatial position coordinates in its message to notification recipients.

As previously mentioned, an important consideration in the implementation of the SMT 200 or SMT hub 1100 and other system elements may be the limited power supply available for powering the SMT/SMT hub due to its stand-alone battery power supply 207/1107. In order to maximize the life of the SMT 200 or SMT hub 400 in the field, the SMT/hub may be configured to implement several additional power saving features. In an embodiment, the controller 201/401 is programmed to determine whether, and how often, to send an alert message to the Notification Service when any of its sensors 206/406/421 senses corresponding predefined conditions.

In an embodiment, the sensor(s) 1106 and/or 1121 comprise low-power sensors such as low-power MEMS sensors previously discussed, and the SMT/SMT hub 1100 is placed in proximity to, attached to, embedded in, integrated into, or otherwise associated with an trap 102. The GNSS Receiver and processor 1111 allow the controller 1101 to collect, process and transmit location information from the GNSS to the Notification Service 300 for storage, monitoring and notification to notification recipients. Thus, if a SMT/SMT hub 1100 detects sensed conditions that it is monitoring, the Notification Service 300 can notify designated notification recipients of the following: (1) the monitored condition was sensed at the trap 2.

It will be appreciated that the technologies, in particular the SMT 200, SMT hub 400 and Notification Service 300, may be implemented and used in many other applications. By way of example and not limitation, in an embodiment, the sensor unit may comprise one, or a combination of, the following sensors: an accelerometer, a microphone, a passive infrared (PIR) sensor, a reed switch, a camera, a liquid level sensor, a charge sensor, a load sensor, a voltage sensor, a resistance sensor, a capacitance sensor, a thermo sensor, a temperature sensor, a humidity sensor, a flex sensor, a pressure sensor, a chemical composition sensor, a light sensor, a UV Index sensor, a sound sensor, a wind sensor, a positioning sensor, a moisture sensor, etc. In an embodiment, a system includes a plurality of sensor units positioned in proximity (within receiver range) to the transceiver of a SMT hub. Such SMT hub includes program instructions to listen for sensor event alerts from remote sensor units 1121 within its receiving range, identify the sensor sending a sensor event alert, decode such sensor event alert(s) and send one or more message alert(s) to the Notification Service to alert notification recipients to the occurrence of the sensor event using one of the designated notification delivery methods associated with the SMT/SMT hub.

The the SMT 200, SMT hub 400 and Notification Service 300 may be used in a plurality of other applications besides trapping. In an embodiment, the SMT hub may be physically attached to a door, a window, a rodent or animal trap, a mailbox, a trashcan, a safe, a cabinet, a portable object such as a vehicle, a boat, a bicycle, a tractor, a generator, a beehive, a motor, or any object that one desires to monitor. Vibration caused by movement, tampering, falling, interference, or other interaction with the monitored object will generate a notification message to one or more designated notification that the monitored object has been moved, tampered or interfered with, fallen, or otherwise sensed a monitored condition. The system allows monitoring of objects without requiring an external power supply or frequent battery replacement or recharging. The low power SMT unit 200 can last 5-10 years using 3 conventional AAA or 2 AA batteries based on 2300 network connections (pings) at 2 pings per day.

Another advantage of the systems discussed herein, and in particular with respect to the SMT hub 400 system with external sensors as discussed in connection with FIGS. 20-22 is that it allows end users to set up a monitoring and notification system on a modular basis. That is, an end user can install an SMT hub 400 in an environment, and then place remote sensor units 1121 of the same or different types anywhere within the signal range of the SMT hub 400, and receive alerts if any one of the remote sensor units 1121 alerts the SMT hub 1100. The placement of the sensors 1121 is completely up to the end user, and no sensor 1121 is required to communicate with any other sensor 1121 in the system. They need only transmit an alert using the sensor transceiver protocol that is recognized by the SMT hub 1100, and the SMT hub 1100 will pick up the alert and notify the notification service to notify the notification recipients associated with the SMT hub 1100. The modular monitoring system is easy to install because since the SMT hub 1100 is equipped with a self-contained power source (i.e., a battery or solar panel/inverter) and does not require a WiFi or LAN access port. The SMT hub 1100 and sensors 1121 can be placed anywhere, including remote locations (so long as the LPWAN provides sufficient coverage to allow the SMT hub 1100 to connect to the LPWAN. Modular, Do-It-Yourself simple to install and user-configurable monitoring system design, Always-On, Long-Lasting, self-contained—all these advantages over existing and prior art monitoring and notification systems.

It will further be appreciated that although the preferred embodiment uses an LPWAN over which to transmit alert messages, in other embodiments, the SMT 200 and/or SMT hub 400 may additionally or instead be equipped with a WiFi modem to transmit the messages to the nearest WiFi access port and from there onto the Internet 120 to the Notification Service 300.

Figure 23A:
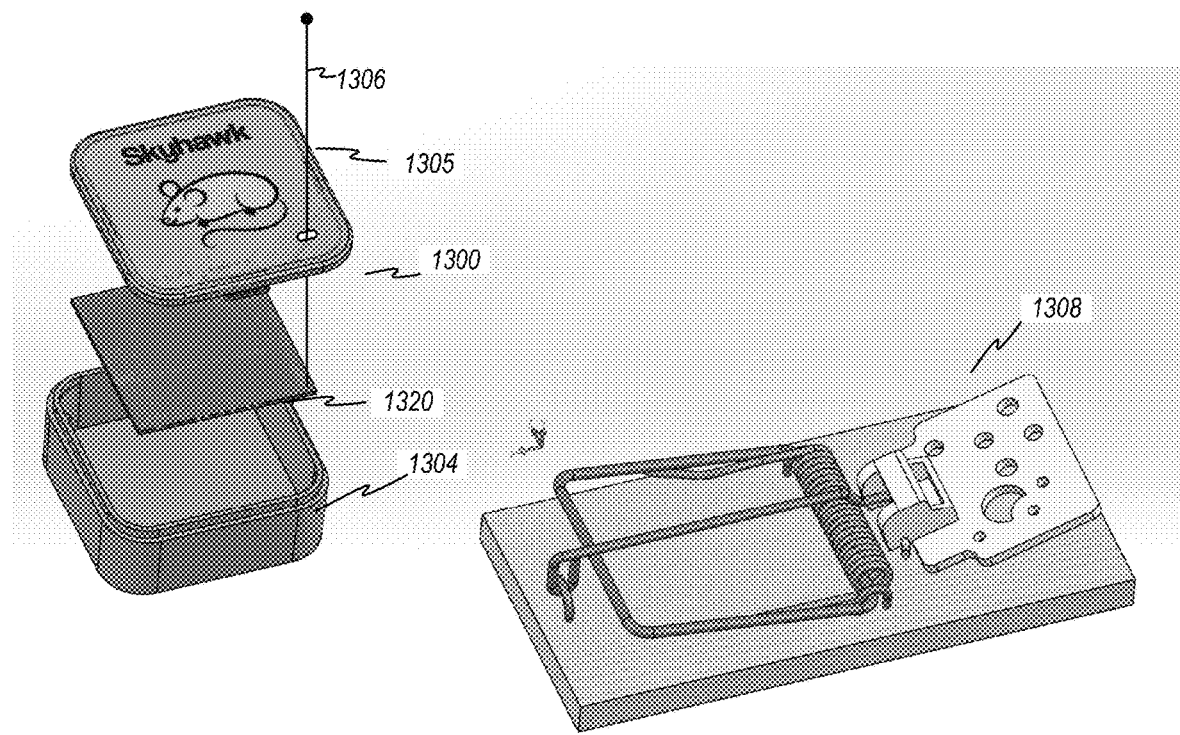
FIG. 23A is an exploded view of a trap monitor.
Figure 23B:
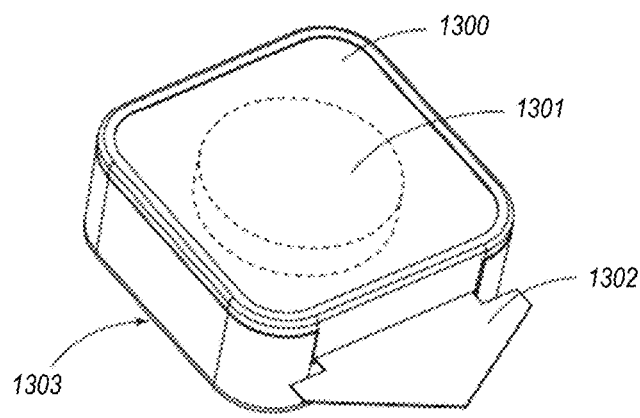
FIG. 23B is a perspective view of the trap monitor of FIG. 23A.

FIG. 23A shows an exploded view, and FIG. 23B shows a front perspective view of an embodiment of a trap monitor 1300. As illustrated in FIG. 23B, when initially shipped, the trap monitor 1300 has a pull-tab 1302 insert that insulates an internal sealed battery 1301 in order to prevent battery discharge from the trap monitor circuitry. The pull-tab 1302 is removed by the user to power on the trap monitor 1300. The trap monitor 1300 is attached, affixed, connected, adhered to or otherwise placed in physical contact or in sensing proximity with a trap to be monitored, for example a mousetrap 1308. In an embodiment, the trap monitor 1300 comprises adhesive tape 1303 with protective backing (not shown) on at least one exterior surface of the smart trap monitor 1300. In such embodiment, the trap monitor 1300 is adhered to the mousetrap 1308 by removing the adhesive backing of the adhesive tape 1303 and placing the exposed tape surface against a surface of the mousetrap 1300. The trap monitor 1300 comprises an SMT 200 or SMT hub 400 as its circuitry. The SMT 200/SMT hub 400 operates as previously described and detects events at the mousetrap, including detection of "snapping" of the trap, detection of the presence of an animal in the trap, etc. An SMT hub 400 can be placed in proximity to a mousetrap 1308, and other sensors 421 can be placed at other mousetraps and communicate with the hub 400, which can notify individuals of events at the mousetraps 1308, in accordance with the foregoing description in connection with FIGS. 20-22.

Interesting information can be collected about the traps and activity connected therewith. For example, the notification service 300 may store the history of the alert notifications from a given SMT 200 or remote sensor 421. The historical information allows data such as number of alerts, number of animals, size and type of animals, weather conditions, and other conditions to determine activity at the site of the trap 2, SMT 2 and/or remote sensors 421. Analysis of such data can reveal areas of high activity, which can assist in identifying where a user of the SMT 200 should focus efforts in engaging with such activity. For example, if the SMT hub 400 is used as a mousetrap monitor, such as trap monitor 1300, if historical data shows that most trap activity events occur at one or two mousetraps out of many mousetraps in an area, then this information can potentially be used to locate points of entry in the area, or to assist in where additional pest control measures may be taken to step up its effectiveness.

The data may further be used to feed visual displays and indicators on those displays. For example, a map may be displayed, with overlay(s) displaying SMT/sensor locations, which may be color-coded to indicate activity level at each SMT/sensor. For example, using a green/yellow/red coding, an SMT or sensor may be depicted using a green color if no activity has been detected during a given time period, and may be yellow if some activity has been detected, and may be red if the SMT/sensor has seen a lot of activity. This allows a viewer of the display to quickly see and locate the SMTs/sensors where the most activity is taking place. Alternatively, the display may include an activity selector, which when selected, displays only the selected activity. For example, in an embodiment, a user can select red, yellow, and/or green, and the map updates to show only those traps/SMTs/sensors that have the selected status.

The data can also be used to learn about the environment of or activity at the trap 2/SMT 200/sensors 421 over time, for example to learn about what bait works for different animals, what time of year certain animals are caught, and so on. The data can also be used for scheduling and routing trapping or pest control technicians. A business with multiple technicians may use the information to prioritize which traps 2 need to be visited based on the activity data generated by multiple trap SMTs 200 in the field, and then assign trap visitation to different technicians, and determine a route for the technical. In an embodiment, the locations of the assigned SMTs are fed to map routing software (such as Googlemaps) which automatically generates an efficient travel route. Preferably, to allow flexibility, once a route is generated, the routing software also allows the technician to add, remove, or modify stops along their own route.

From the foregoing, it will be appreciated that numerous variations and modifications may be effected regarding the monitoring and notification system described herein, without departing from the spirit and scope hereof. It is to be understood that no limitation with respect to the specific apparatuses, method, and systems illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be added to, or removed from the described embodiments.

What is claimed is:

1. A device for electronic monitoring of an animal trap, the device comprising:
   a wireless transceiver electrically coupled to an antenna;
   a plurality of sensors comprising a movement detection sensor and one or more sensors configured to detect one or more conditions of the animal trap, the movement detection sensor comprising a global positioning system (GPS) module configured to receive positioning signals from a GPS and compare a present location of the animal trap to a recent past location of the animal trap to determine whether the animal trap has moved from a previous location, wherein the sensor comprises a non-transitory computer-readable storage medium to store initial, past and present location information of the animal trap, and additional location information acquired by the GPS module over a period of time, wherein the movement detection sensor is configured to generate a movement detection output signal in response to detection of a movement of the animal trap, the one or more conditions comprising at least a triggered (closed) state of the animal trap, trap vibration associated with the animal trap, a presence of an animal in the animal trap, a size and a weight of the animal in the animal trap, a type of the animal in the animal trap, precipitation at the animal trap, high wind at the animal trap, and a tamper activity state of the animal trap where activity is detected at the animal trap that does not amount to trapping of the animal, and the one or more sensors configured to generate one or more sensor output signals in response to the detected one or more conditions, wherein the one or more sensors comprise at least one of: an accelerometer, a microphone, a passive infrared (PIR) sensor, a range sensor, a strain gauge sensor, a reed switch, a Hall effect sensor, a magnetic field sensor, a camera, a charge sensor, a resistance sensor, a capacitance sensor, a temperature sensor, a humidity sensor, a flex sensor, a pressure sensor, a positioning sensor, and a moisture sensor, wherein the plurality of sensors can be configured by user input, wherein the one or more sensors are configured to detect at least one of: an occupied state of the animal trap, an orientation state of the animal trap, and the movement of the animal trap; and a controller electrically coupled to the wireless transceiver and the one or more sensors, the controller configured to receive the one or more sensor output signals and in response to receiving the one or more sensor output signals, the controller is configured to enable a battery saving operating mode of the device, upon which the controller is configured to delay, by a delay interval, generating and transmitting an alert message to a notification service, wherein the alert message comprises an identifier associated with the device and alert information indicative of the one or more sensor output signals;

wherein the delay interval comprises a predetermined time interval by which to delay transmission of the alert message and wherein, when the battery saving operating mode is enabled, the controller is configured to group two or more sensor output signals during the delay interval into a single batch of alert messages in response to a mode control indicative of a selection of a batch mode to store subsequent alert messages generated in view of the two or more sensor output signals, or ignore the two or more sensor output signals during the delay interval in response to the mode control indicative of a selection of an ignore mode, wherein the two or more sensor output signals that are ignored are not transmitted to the notification service;

wherein the battery saving operating mode is enabled to conserve battery power in response to a battery supply having a limited power range due to a limited battery condition, and wherein the battery saving operating mode is disabled in response to an external power source supplying power to the battery supply and the battery supply being in a full power mode, wherein upon receipt of the alert message, the notification service is configured to determine a notification recipient and an electronic delivery service associated with the identifier, and send a notification message to the notification recipient using the electronic delivery service, wherein the notification message includes information in a payload of the notification message indicative of the conditions associated with the one or more sensor output signals, wherein the electronic delivery service comprises at least one of: an email service, an SMS text service, a voicemail delivery service, and an app push notification service, wherein the notification service is configured to determine at least one of the following formats of the electronic delivery service: an email text or an attachment associated with the email service, a text message associated with the SMS text service, an audio file containing human-understandable audio content associated with the voicemail delivery service and at least one of an in-app text, an in-app image containing a human-understandable message, an in-app audio/video clip, an in-app document associated with the app push notification service, wherein the notification message further comprises an identifier associated with the animal trap, a location indicator associated with coordinates of a location of the animal trap, and information indicating a state of the animal trap, and wherein in response to detection of movement by the movement detection sensor, the device is configured to connect through a low power cellular network to the Internet to transmit a movement alert message to the notification service.

2. The device of claim 1, wherein upon receipt of the alert message, the notification service is configured to determine a notification recipient and an electronic delivery service associated with the identifier, and send a notification message to the notification recipient using the electronic delivery service, wherein the notification message includes information indicative of the one or more sensor output signals.

3. The device of claim 1, wherein the wireless transceiver comprises a cellular transceiver.

4. The device of claim 3, wherein the wireless transceiver further comprises a wireless local area network (WLAN) transceiver, and wherein the controller is configured to transmit the alert message via the WLAN transceiver when a cellular network is not available.

5. The device of claim 1, wherein the wireless transceiver comprises one of a 3GPP Long Term Evolution enhanced Machine Type Communication (LTE-eMTC CAT-M1) transceiver, a Narrow-Band Internet of Things (NB-IoT) transceiver, an Extended coverage GSM IoT (EC-GSM-IoT) transceiver, or a Long Range (LoRa) transceiver.

6. The device of claim 1, wherein the controller is configured to operate the wireless transceiver in a heartbeat duty cycle mode, wherein the wireless transceiver is turned off except at one of a heartbeat interval and when one or more sensor output signals are generated, thereby reducing a power draw from one or more batteries of the device.

7. The device of claim 1, wherein a user of the animal trap can activate a pause parameter of the device via an application stored on a user equipment of the user, and wherein, when the pause parameter is activated, the controller is configured to either ignore the one or more sensor output signals or store the one or more sensor output signals.

8. The device of claim 1, wherein the notification service comprises a remote computing and storage resource configured to communicate with an application stored on a user equipment associated with a user of the animal trap.

9. A method for electronically monitoring an animal trap, the method comprising:

detecting, by a plurality of sensors comprising a movement detection sensor and one or more sensors, one or more conditions of the animal trap and, in response to the detected one or more conditions, providing one or more sensor output signals, generated by the one or more sensors, to a controller electrically coupled to the one or more sensors, the one or more conditions comprising at least a triggered (closed) state of the animal trap, trap vibration associated with the animal trap, a presence of an animal in the animal trap, a size and a weight of the animal in the animal trap, a type of the animal in the animal trap, precipitation at the animal trap, high wind at the animal trap, and a tamper activity state of the animal trap where activity is detected at the animal trap that does not amount to trapping of the animal, and the movement detection sensor comprising a global positioning system (GPS) module configured to receive positioning signals from a GPS and compare a present location of the animal trap to a recent past location of the animal trap to determine whether the animal trap has moved from a previous location, wherein the sensor comprises a non-transitory computer-readable storage medium to store initial, past and present location information of the animal trap, and additional location information acquired by the GPS module over a period of time, wherein the movement detection sensor is configured to generate a movement detection output signal in response to detection of a movement of the animal trap; and enabling, by the controller, a battery saving operating mode, during which the controller (i) delays, by a delay interval, generating and transmitting an alert message to a notification service, wherein the alert message comprises an identifier associated with the animal trap and alert information indicative of the one or more sensor output signals, and (ii) groups two or more sensor output signals during the delay interval into a single batch of alert messages in response to a mode control indicative of a selection of a batch mode to store subsequent alert messages generated in view of the two or more sensor output signals, or ignore the two or more sensor output signals during the delay interval in response to the mode control indicative of a selection of an ignore mode, wherein the two or more sensor output signals that are ignored are not transmitted to the notification service;

determining, by the notification service in response to receiving the alert message, a notification recipient and an electronic delivery service associated with the identifier;

sending a notification message to the notification recipient using the electronic delivery service, wherein the notification message includes information in a payload of the notification message indicative of the conditions associated with the one or more sensor output signals, wherein the electronic delivery service comprises at least one of: an email service, an SMS text service, a voicemail delivery service, and an app push notification service, wherein the notification service is configured to determine at least one of the following formats of the electronic delivery service: an email text or an attachment associated with the email service, a text message associated with the SMS text service, an audio file containing human-understandable audio content associated with the voicemail delivery service and at least one of an in-app text, an in-app image containing a human-understandable message, an in-app audio/video clip, an in-app document associated with the app push notification service, wherein the notification message further comprises an identifier associated with the animal trap, a location indicator associated with coordinates of a location of the animal trap, and information indicating a state of the animal trap, wherein in response to detection of movement by the movement detection sensor, the device is configured to connect through a low power cellular network to the Internet to transmit a movement alert message to the notification service, wherein the delay interval comprises a predetermined time interval by which to delay transmission of the alert message.

10. The method of claim 9, further comprising:

operating, by the controller, a wireless transceiver in a heartbeat duty cycle mode, wherein the wireless transceiver is turned off except at one of a heartbeat interval and when one or more sensor output signals are generated, thereby reducing a power draw from one or more batteries of the device.

11. The method of claim 9, wherein a wireless transceiver comprises a first transceiver, the first transceiver comprising one of a 3GPP Long Term Evolution enhanced Machine Type Communication (LTE-eMTC CAT-M1) transceiver, a Narrow-Band Internet of Things (NB-IoT) transceiver, an Extended coverage GSM IoT (EC-GSM-IoT) transceiver, or a Long Range (LoRa) transceiver, and wherein the wireless transceiver comprises a second transceiver, the second transceiver comprising a wireless local area network (WLAN) transceiver, the method further comprising:

transmitting, by the controller, the alert message via the WLAN transceiver when a cellular network is not available.

* * * * *